US007761513B2

(12) United States Patent
Kikkoji et al.

(10) Patent No.: US 7,761,513 B2
(45) Date of Patent: Jul. 20, 2010

(54) INFORMATION RECORDING DEVICE, INFORMATION RECORDING METHOD, AND INFORMATION RECORDING PROGRAM

(75) Inventors: Hiroyuki Kikkoji, Tokyo (JP); Nozomu Okuzawa, Tokyo (JP); Susumu Yamahara, Tokyo (JP); Shinsuke Yamashita, Kanagawa (JP); Jun Moriya, Tokyo (JP); Yasuhiro Murase, Tokyo (JP)

(73) Assignee: Sony Corporation, Tokyo (JP)

(*) Notice: Subject to any disclaimer, the term of this patent is extended or adjusted under 35 U.S.C. 154(b) by 888 days.

(21) Appl. No.: 10/557,193

(22) PCT Filed: May 18, 2004

(86) PCT No.: PCT/JP2004/007025

§ 371 (c)(1), (2), (4) Date: Nov. 17, 2005

(87) PCT Pub. No.: WO2005/006611

PCT Pub. Date: Jan. 20, 2005

(65) Prior Publication Data

US 2007/0073649 A1 Mar. 29, 2007

(30) Foreign Application Priority Data

| | | | |
|---|---|---|---|
| Jul. 14, 2003 | (JP) | ............................. | 2003-274302 |
| Aug. 11, 2003 | (JP) | ............................. | 2003-291741 |
| Sep. 4, 2003 | (JP) | ............................. | 2003-313167 |
| Sep. 30, 2003 | (JP) | ............................. | 2003-341036 |

(51) Int. Cl.

| | |
|---|---|
| ***G06F 15/16*** | (2006.01) |
| ***G06F 15/173*** | (2006.01) |
| ***G06F 21/00*** | (2006.01) |

(52) U.S. Cl. .......................... 709/205; 709/225; 705/51

(58) Field of Classification Search ................. 709/205, 709/225; 705/51
See application file for complete search history.

(56) References Cited

U.S. PATENT DOCUMENTS

2003/0028796 A1 2/2003 Roberts et al.

(Continued)

FOREIGN PATENT DOCUMENTS

JP 08-115333 5/1996

(Continued)

OTHER PUBLICATIONS

U.S. Appl. No. 10/526,902, filed Aug. 16, 2005, Yamashita et al.

(Continued)

*Primary Examiner*—George C Neurauter, Jr.
*Assistant Examiner*—Anish Sikri
(74) *Attorney, Agent, or Firm*—Oblon, Spivak, McClelland, Maier & Neustadt, L.L.P.

(57) ABSTRACT

Information items related to a plurality of musical pieces designated can be stored at a time. A storage means 1*a* can hold the information items related to contents. A receiving means 1*b* receives information items related to a plurality of contents broadcast. A temporary storage means 1*c* stores the information items 4 related to the contents, for some time. An instructing means 1*d* instructs that the related information items stored in the temporary storage means 1*c* be recorded in the storage means 1*a*. When instructed by the instructing means 1*d*, the recording means 1*e* records the related information items 5*a* stored in the temporary storage means 1*c*, as one set 5, in the storage means 1*a*. At the same time, the recording means 1*e* records in the storage means 1*a* the name of this set, in association with the set 5. The related information items can therefore be recorded in accordance with a single instruction.

14 Claims, 39 Drawing Sheets

U.S. PATENT DOCUMENTS

| | | | | |
|---|---|---|---|---|
| 2003/0074448 | A1* | 4/2003 | Kinebuchi et al. | 709/225 |
| 2003/0135513 | A1 | 7/2003 | Quinn et al. | |
| 2004/0167856 | A1* | 8/2004 | Shibasaki et al. | 705/51 |
| 2005/0060701 | A1 | 3/2005 | Murase | |
| 2005/0091679 | A1 | 4/2005 | Tanaka et al. | |

FOREIGN PATENT DOCUMENTS

| | | |
|---|---|---|
| JP | 9-121197 | 5/1997 |
| JP | 10-241294 | 9/1998 |
| JP | 10-243052 | 9/1998 |
| JP | 11-122199 | 4/1999 |
| JP | 2000-222360 | 8/2000 |
| JP | 2002-135671 | 5/2002 |
| JP | 2002-262224 | 9/2002 |
| JP | 2002-344909 | 11/2002 |
| JP | 2002-358283 | 12/2002 |
| JP | 2003-50816 | 2/2003 |
| JP | 2003-51179 | 2/2003 |
| JP | 2003-067661 | 3/2003 |
| JP | 2003-203467 | 7/2003 |
| JP | 2004-537760 | 12/2004 |
| JP | 2005-526340 | 9/2005 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murse et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed, Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.
"Instruction manual for MAHPA, iTunes 3 application edition", MAC Power, ASCII Co., Ltd., vol. 13, No. 12, Dec. 1, 2002, pp. 34-49.
Masakazu Honda, "[according to the course], Let's make an AV server", DOS/V magazine, Softbank publishing Co., Ltd., vol. 12, No. 1, Jan. 1, 2003, pp. 152-157.

* cited by examiner

50

| ITEMS | CONTENT |
| --- | --- |
| TITLE OF MUSICAL PIECE | BLUE SKY AFTER RAIN |
| ARTIST'S NAME | THE FALCONS |
| CLIPPING TIME | 2003/3/8 19:20 |
| CD NUMBER | No.01234567 |
| CLIPPING SITE | MD |
| ⋮ | ⋮ |

FIG. 13

INFORMATION RECORDING DEVICE, INFORMATION RECORDING METHOD, AND INFORMATION RECORDING PROGRAM

TECHNICAL FIELD

The present invention relates to an information-recording apparatus, an information-recording method and an information-recording program, each for acquiring music data via a network. More particularly, the invention relates to an information-recording apparatus, an information-recording method and an information-recording program, which can store related information in a secondary storage device.

BACKGROUND ART

In recent years, various content services performed via the Internet have come started. Among the content services is a service of distributing the information of programs that radio stations broadcast on terrestrial waves. The user of a terminal apparatus can use the program information thus distributed so that he or she may more readily enjoy listening to music on the terminal apparatus.

For example, a signal to which the program type (PTY) of a program being broadcast must be demodulated by a receiver. As such a receiver, a digital-audio broadcast receiver has been developed (see Patent Document 1). This receiver automatically detects the PTY of any program that the user may frequently selects. Thus, the receiver can automatically and easily select the program, not bothering the user to set the PTY.

The digital-audio broadcast receiver has a demodulating unit that demodulates any signal received, into an audio signal and PTY. The digital-audio broadcast receiver saves the PTY code in a memory when the user pushes a button. The digital-audio broadcast receiver counts the number of times each PTY code is selected, and stores the count into the memory. The digital-audio broadcast receiver can determine which program the user will select frequently, from the number of times the PTY code has been selected.

However, the digital-audio broadcast receiver described in Patent Document 1 cannot display the information items about the programs broadcast in the past, in the form of a list. This is because the receiver displays each program information item only once the moment it receives the program information item. In view of this inconvenience, another type of a digital-audio broadcast receiver has been developed (see Patent Document 2). This receiver automatically stores the information (hereinafter referred to as "related information") about the music the user is listening to. The receiver records the related information if the user keeps listening to the music longer than a preset time.

Patent Document 1: Jpn. Pat. Appln. Laid-open Publication No. 8-330911

Patent Document 2: Jpn. Pat. Appln. Laid-Open Publication No. 11-122199

At present, various services concerning music are provided in the Internet. Among these services are the distribution of music data that users want and the acceptance of purchase orders for music compact discs (CDs) from users. To use such services, a user must operate a terminal apparatus to designate the music or CD title he or she wants.

It is proposed that any consumer electronics (CE) apparatus connected to the Internet should store information related to the music being played back, such as the title of the music. If the CE apparatus stores the related information, the user only needs to designate this information to receive the service in connection with the music.

The conventional CE apparatus stores information items, each concerning a musical piece that has been FM-broadcast and enjoyed by the user. This may be inconvenient to the user in some cases. That is, the user must listen to the program to the very end thereof. Otherwise, the information related to all musical pieces broadcast in the program cannot be stored in the CE apparatus.

DISCLOSURE OF THE INVENTION

This invention has been made in view of the foregoing. An object of the invention is to provide an information-recording apparatus, an information-recording method and an information-recording program, each able to save, at a time, the information related to a plurality of musical pieces that the user has designated.

To achieve the object, the present invention provides an information-recording apparatus characterized by comprising: a receiving means for receiving information related to a plurality of contents broadcast; a temporary storage means for temporarily storing information items related to the contents; a storage means for storing any information items; an instructing means for instructing that the information items temporarily stored in the temporary storage means be recorded in the storage means; a recording means for recording the information items stored in the temporary storage means, as a set, and the name of the set in association with the set, in the storage means, in response to an instruction made by the instructing means.

In the information-recording apparatus, the related information items stored in the temporary storage means are recorded, as a set, in the storage means when an instruction is issued to make the storage means store the information items related to contents broadcast. Then, the name of the set is recorded in the storage means, in association with the set thus recorded in the storage means.

To achieve the object described above, this invention provides an information-recording apparatus characterized by comprising a reproducing means for reproducing the contents from a recording medium loaded; a receiving means for receiving the information items related to the contents reproduced by the reproducing means; a storage means for storing any information items; a temporary storage means for temporarily storing information items related to the contents; an instructing means for instructing that the information items corresponding to the contents recorded in a recording medium be recorded in the storage means; and a recording means for recording the information items stored in the temporary storage means, as a set, and the name of the set in association with the set, in the storage means, in response to an instruction made by the instructing means.

In this information-recording apparatus, the related information items stored in the temporary storage means are recorded, as a set, in the storage means when an instruction is issued to make the storage means store the information items recorded in the recording medium. Then, the name of the set is recorded in the storage means, in association with the set thus recorded in the storage means.

To achieve the object described above, the present invention provides an information-recording method characterized by comprising: receiving information related to a plurality of contents broadcast; temporarily storing information items related to the contents, in the temporary storage means; instructing that the information items temporarily stored in the temporary storage means be recorded in the storage means for storing any information items; and recording the information items stored in the temporary storage means, as a set, and the name of the set in association with the set, in the storage means, in response to an instruction made by the instructing means.

In the information-recording method, the related information items stored in the temporary storage means are recorded, as a set, in the storage means when an instruction is issued to make the storage means store the information items related to contents. Then, the name of the set is recorded in the storage means, in association with the set thus recorded in the storage means.

To achieve the object described above, the present invention provides an information-recording method characterized by comprising reproducing contents from a recording medium loaded; receiving the information items related to the contents reproduced; recording the receives information items related to contents, as a set, and the name of the set in association with the set, in the storage means.

In this method, the related information items related to contents and stored in the recording medium are recorded, as a set, in the storage means. Then, the name of the set is recorded in the storage means, in association with the set thus recorded in the storage means.

To achieve the object described above, the present invention provides an information-recording program characterized in that it causes a computer to perform the functions of: a receiving means for receiving information related to a plurality of contents broadcast; a temporary storage means for temporarily storing information items related to the contents; a storage means for storing any information items; an instructing means for instructing that the information items temporarily stored in the temporary storage means be recorded in the storage means; a recording means for recording the information items stored in the temporary storage means, as a set, and the name of the set in association with the set, in the storage means, in response to an instruction made by the instructing means.

When a computer executes this information-recording program, it records the related information items stored in the temporary storage means, as one set, in the storage means if it is instructed that the information items related to a plurality of contents broadcast be recorded in the storage means. Then, the name of the set is recorded in the storage means, in association with the set thus recorded in the storage means.

As explained above, a plurality of related information items are stored as a set, by giving one instruction. It is therefore easy to instruct that information items related to a plurality of contents be stored.

BRIEF DESCRIPTION OF DRAWINGS

FIG. 13 is a diagram depicting the data configuration of related information clipped.

BEST MODE FOR CARRYING OUT THE INVENTION

Embodiments of the present invention will be described, with reference to the accompanying drawings.

(1) Fundamental Concept of the Invention

The concept of this invention will first be explained. Then, the embodiments of the invention will be described in detail.

Figure 1:
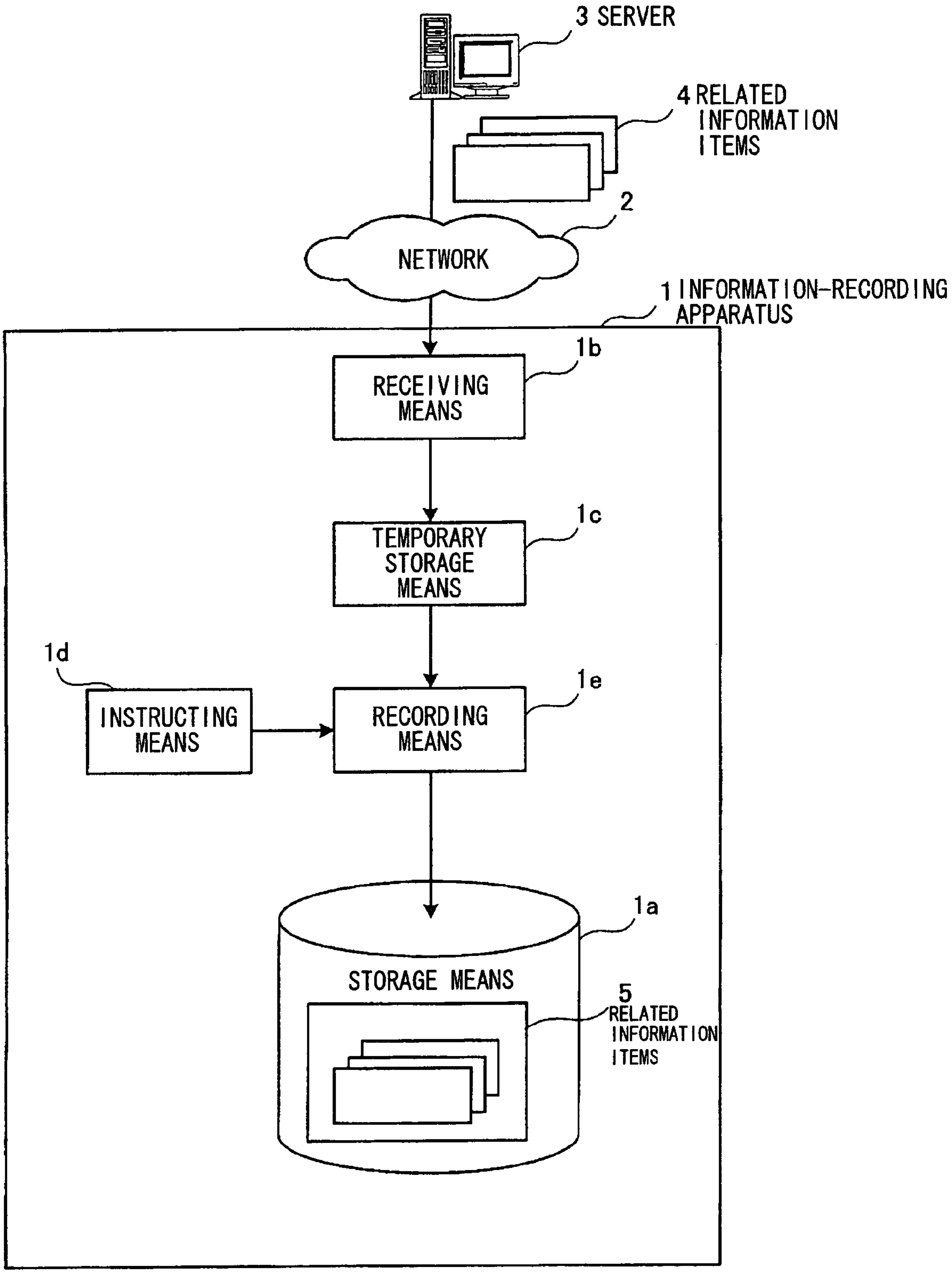
FIG. 1 is a diagram representing the concept of this invention, which is applied to embodiments.

FIG. 1 is a diagram representing the concept of the invention, which is applied to the embodiments. An information-recording apparatus 1 according to the invention has a storage means 1*a*, a receiving means 1*b*, a temporary storage means 1*c*, an instructing means 1*d*, and a recording means 1*e*. The information-recording apparatus 1 is connected to a server 3 via a network 2. The server 3 can provide related information about the contents broadcast by FM stations and TV stations and also related information about the contents recorded in recording media such as CDs. The "related information" is information showing the particulars of a content, such as title, artist and the like.

The storage means 1*a* stores the related information items about contents and performs management on the related information items. The storage means 1*a* is, for example, a storage device that can keep storing information items even after the power supply is disconnected from it.

The receiving means 1*b* receives related information items 4 about a plurality of contents. In the system of FIG. 1, the receiving means 1*b* acquires related information items 4 from the server 3 that is connected to the receiving means 1*b* via the network 30. The related information items 4 that the receiving means 1*b* has acquired are transferred to the temporary storage means 1*c*.

The temporary storage means 1*c* temporarily stores the related information items 4 about the contents. The temporary storage means 1*c* can be, for example, a volatile semiconductor memory that can be used as a buffer. The related information items 4 stored in the temporary storage means 1*c* can be displayed on a display screen.

The instructing means 1*d* instructs that the related information items stored in the temporary storage means 1*c* be recorded in the storage means 1*a*. Assume that a user operates his or her terminal apparatus, selecting a related information item. Then, the instructing means 1*d* instructs that the recording means 1*e* should record the related information item, thus selected.

In accordance with the instruction given by the instructing means 1*d*, the recording means 1*e* records the related information items 4 stored in the temporary storage means 1*c*, as one set 5, into the storage means 1*a*. At the same time, the recording means 1*e* records in the storage means 1*a* the name of the set, in association with the set 5.

In this information-recording apparatus 1, the receiving means 1*b* receives related information items 4 about contents, and the temporary storage means 1*c* stores the related information items 4 for some time. When the user instructs that the related information items 4 about the contents broadcast be stored in the storage means 1*a*, the related information items 4 stored in the temporary storage means 1*c* are recorded, as one set 5, in the storage means 1*a*. The name of the set is stored in the storage means 1*a*, too, in association with the set 5 thus recorded.

Thus, in the information-recording apparatus 1, a plurality of related information items 4 about the contents being broadcast can be recorded as one set 5 in the storage means 1*a*, in accordance with a single instruction. With this invention, it is therefore easy to instruct that related information be stored. The information-recording apparatus 1 is therefore easy for the user to operate.

In the information-recording apparatus 1, not only the related information about any content being broadcast, but also the related information items about the contents recorded in a recording medium such as a CD can be recorded, as one set, in the storage means 1*a*.

The name of any set is one that represents the characterizing feature of the related information items recorded. The related information items recorded may pertain to, for example, a plurality of contents in a program broadcast. In this case, the name of the program is recorded as the name of the set. If the related information items recorded pertain to contents broadcast in a specific period, the identification information for identifying the broadcast station and the information on the broadcast period are recorded as the name of the set.

(2) First Embodiment

Among the contents broadcast are musical pieces. The related information about each musical piece includes the title of the musical piece, the name of the artist who plays the music, and the like. An embodiment of the invention will be described in detail, which is a terminal apparatus that incorporates the functions of the information-recording apparatus 1 of FIG. 1, which is connected to the network, and which records related information.

In the following description, the process of saving the related information about musical pieces or a set of musical pieces will be referred to as "clip."

Figure 2:
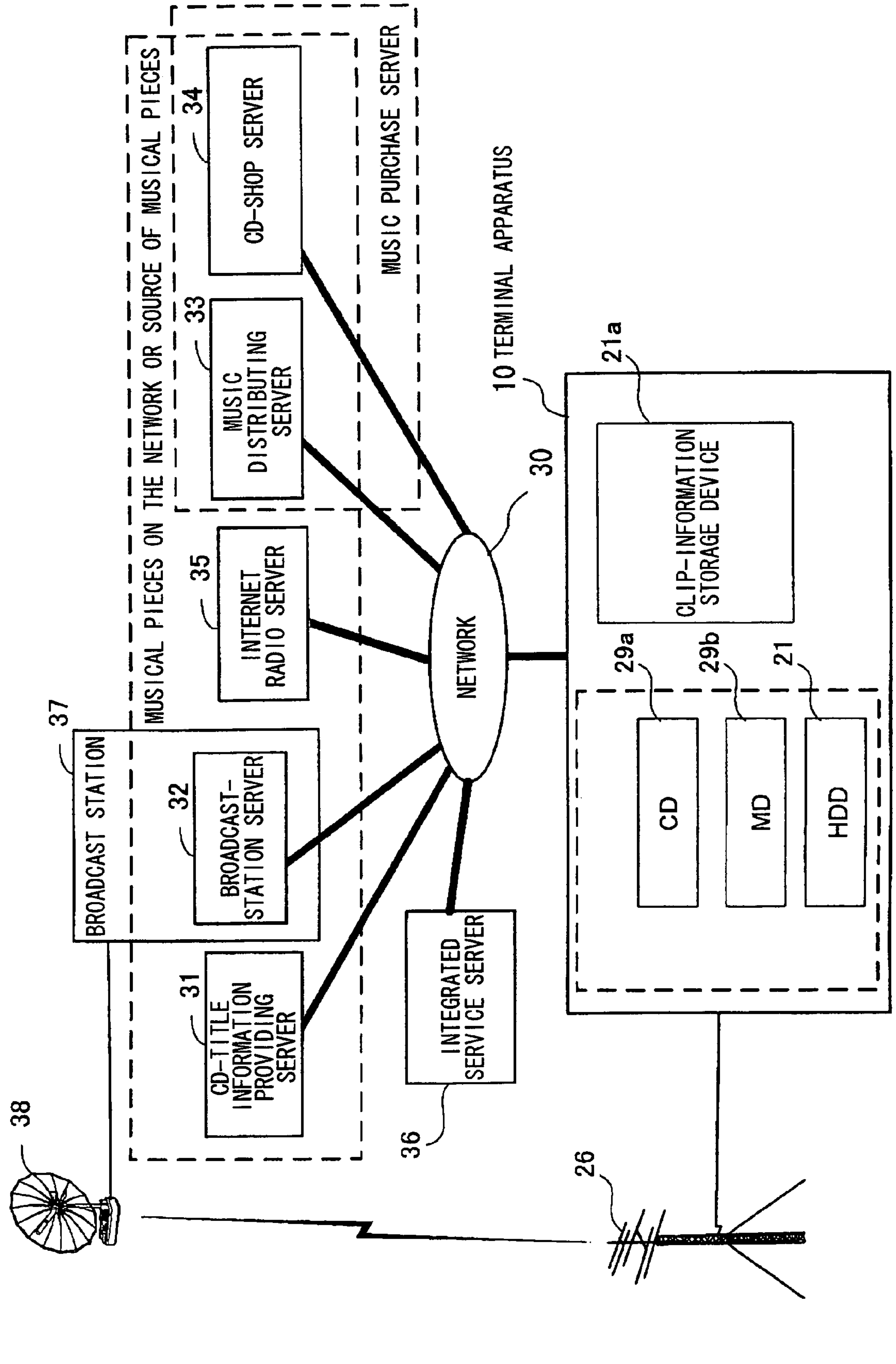
FIG. 2 is a diagram of a network system according to a first embodiment of the invention.

FIG. 2 is a diagram depicting a network system relating to the first embodiment of this invention. The terminal apparatus 10 is connected to various servers via a network 30. The network 30 is, for example, the Internet. The servers are a CD-title information providing server 31, a broadcast-station server 32, a music distributing server 33, a CD-shop server 34, an Internet radio server 35, an integrated service server 36, and the like.

The CD-title information providing server 31 distributes the information about the musical pieces recorded in CDs that are commercially available.

The broadcast-station server 32 is a server that is managed by a broadcast station 37 that broadcasts FM programs and TV programs. The broadcast station 37 broadcasts wirelessly through an antenna 38. The server 32 performs the service of providing the information related to musical pieces to be broadcast.

The broadcast-station server 32 provides the related information in, broadly speaking, two modes. The first mode is "now on-air," in which the server 32 provides the information about the musical piece being broadcast at present. In the second mode, the server 32 provides the list of the musical pieces (on-air list) already broadcast at the request of the terminal apparatus 10. (The on-air list contains information about each musical piece that has been broadcast). The broadcast-station server 32 provides information about musical pieces broadcast on a specified program and information about musical pieces broadcast in a specified period.

The music distributing server 33 distributes digital data representing musical pieces (music data). It provides the music data to the terminal apparatus 10 only if the user has taken procedures to buy the musical pieces. The server 33 can provide the information about the musical pieces that are to be distributed.

The CD-shop server 34 receives the order the user makes to buy CDs through data communication. The server 34 can distribute promotion audio data and provide the information about the musical pieces recorded in the CDs that the CD shops sell.

The Internet radio server 35 is a server that provides music programs via a global network such as the Internet.

The integrated service server 36 functions as a portal site where services are given via the network 30. In other words, the server 36 conveys services. For example, the integrated service server 36 distributes the information representing the sources of the musical pieces being broadcast, to the terminal apparatus 10. This information is, for example, URL (Uniform Resource Locator).

Thus, a plurality of servers perform the service of providing the information about music pieces or a set of music pieces that can be distributed on the network 30. That is, each server works as a source of the music pieces or a set of musical pieces on the network 30.

The music distributing server 33 and the CD-shop server 34 are musical pieces purchasable servers. If the user operates the terminal apparatus 10, accessing the musical pieces purchasable server, he or she can buy musical pieces or a set of musical pieces. The user of the terminal apparatus 10 may take procedures to the music distributing server 33 in order to buy musical pieces. In this case, the music data can be downloaded from the server 33 into the terminal apparatus 10. The user may also take procedures to the CD-shop server 34 in order to buy musical pieces. Then, the user can have the CD delivered to his or her home.

The terminal apparatus 10 has three recording media, i.e., a CD 29*a*, an MD (Mini Disc) 29*b* and a hard disk drive HDD) 21. These recording media hold musical pieces or a set of musical pieces, which are distributed by a local source. The CD 29*a* and the MD 29*b* are portable recording media and can easily be removed from the terminal apparatus 10. The type of the local source prepared for the terminal apparatus 10 depends on the type and use of the terminal apparatus 10. The terminal apparatus 10 can receive contents broadcast via an antenna 26.

The musical pieces or the set of musical sources, which is shown in FIG. 2, is nothing more than an example. Whichever media can function as a local source of musical pieces or a set of musical pieces by recording musical pieces or a set of musical pieces on the recording medium, only if they are incorporated in the terminal apparatus 10.

The terminal apparatus 10 has a clipped-information storage device 21*a*. The device 21*a* can store any related information that has been clipped. The clipped-information storage device 21*a* is the secondary storage device to the terminal apparatus 10. It may be a part of the storage region of, for example, the HDD 21. The terminal apparatus 10 can clip not only musical pieces, but also a set of musical pieces. Thus, the terminal apparatus 10 can clip an FM program or CD album that contains many musical pieces interesting to the user, through a single clipping operation and hence the information related to the set of musical pieces interesting to the user can be recorded.

Figure 3:
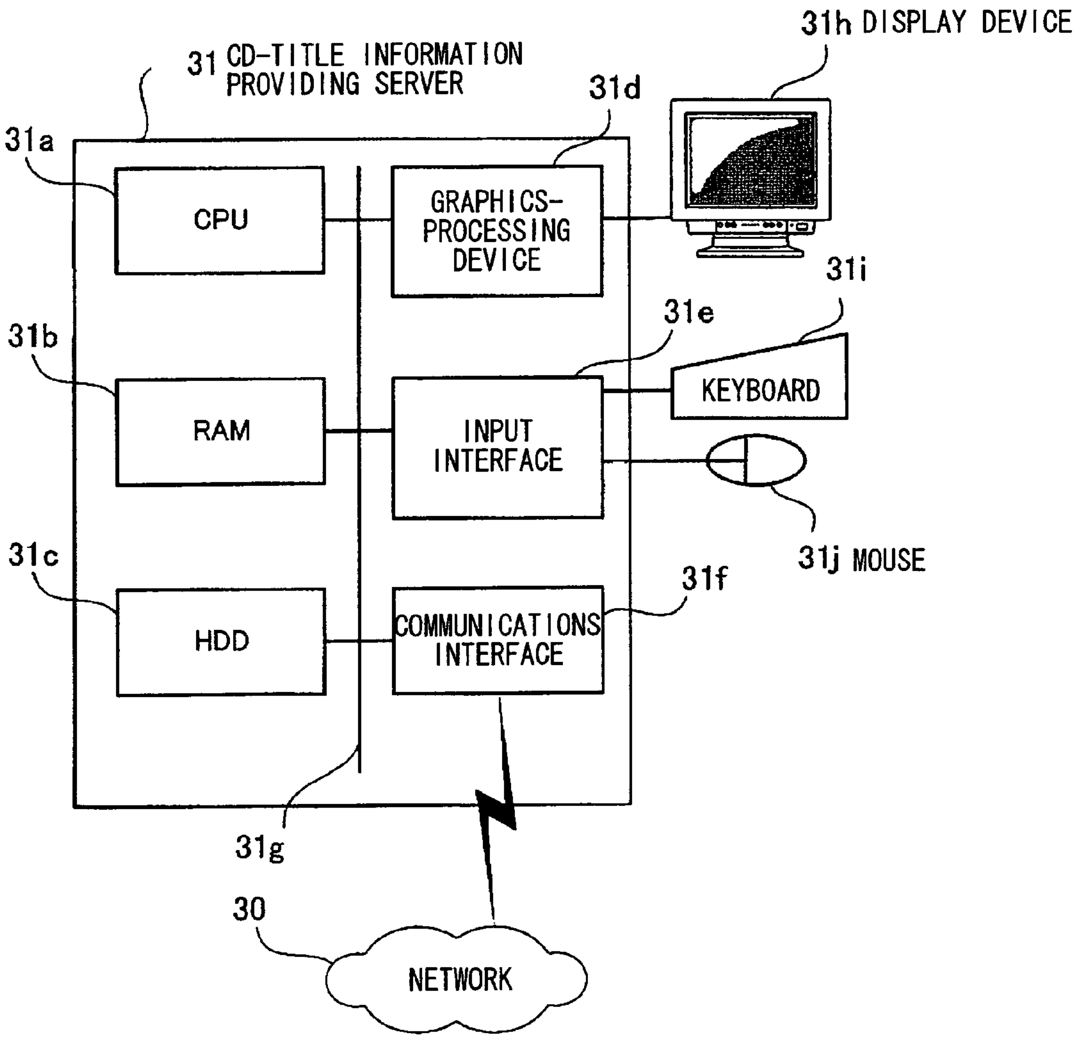
FIG. 3 is a block diagram illustrating the hardware configuration of the server that provides CD-title information related service.

FIG. 3 illustrates the hardware configuration of the CD-title information providing server 31. A CPU (Central Processing Unit) 31*a*, controls the entire CD-title information providing server. The bus 31*g* connects the CPU 31*a* to a RAM (Random Access Memory) 31*b*, a Hard Disc Drive (HDD) 31*c*, a graphics-processing device 31*d*, an input interface 31*e* and a communication interface 31*f*.

The RAM 31*b* temporarily stores the OS (Operating System) program and at least a part of the application program. The RAM 31*b* stores various data that the CPU 31*a* needs to use to perform its functions. The HDD 31*c* stores the OS and application programs. The HDD 31*c* stores the information related to CDs, which is to be supplied to the terminal apparatus 10.

A display device 31*h* is connected to the graphics-processing device 31*d*. The graphics-processing device 31*d* makes the display device 31*h* to display an image in accordance with the instruction sent from the CPU 31*a*. A keyboard 31*i* and a mouse 31*j* are connected to the input interface 31*e*. The input interface 31*e* receives signals from the keyboard 31*i* and mouse 31*j* and supplies the signals to the CPU 31*a* through the bus 31*g*.

The communications interface 31*f* is connected to the network 30. The communications interface 31*f* transmits and receives data to and from the other computers via the network 30.

The hardware configuration described above can implement the processing functions of the present embodiment. Note that FIG. 3 shows mainly the hardware configuration of the CD-title information providing server 31. Nonetheless, any other server can have a similar hardware configuration.

The terminal apparatus 10 used in this embodiment can function as an audio apparatus, too, which can play back musical pieces.

Figure 4:
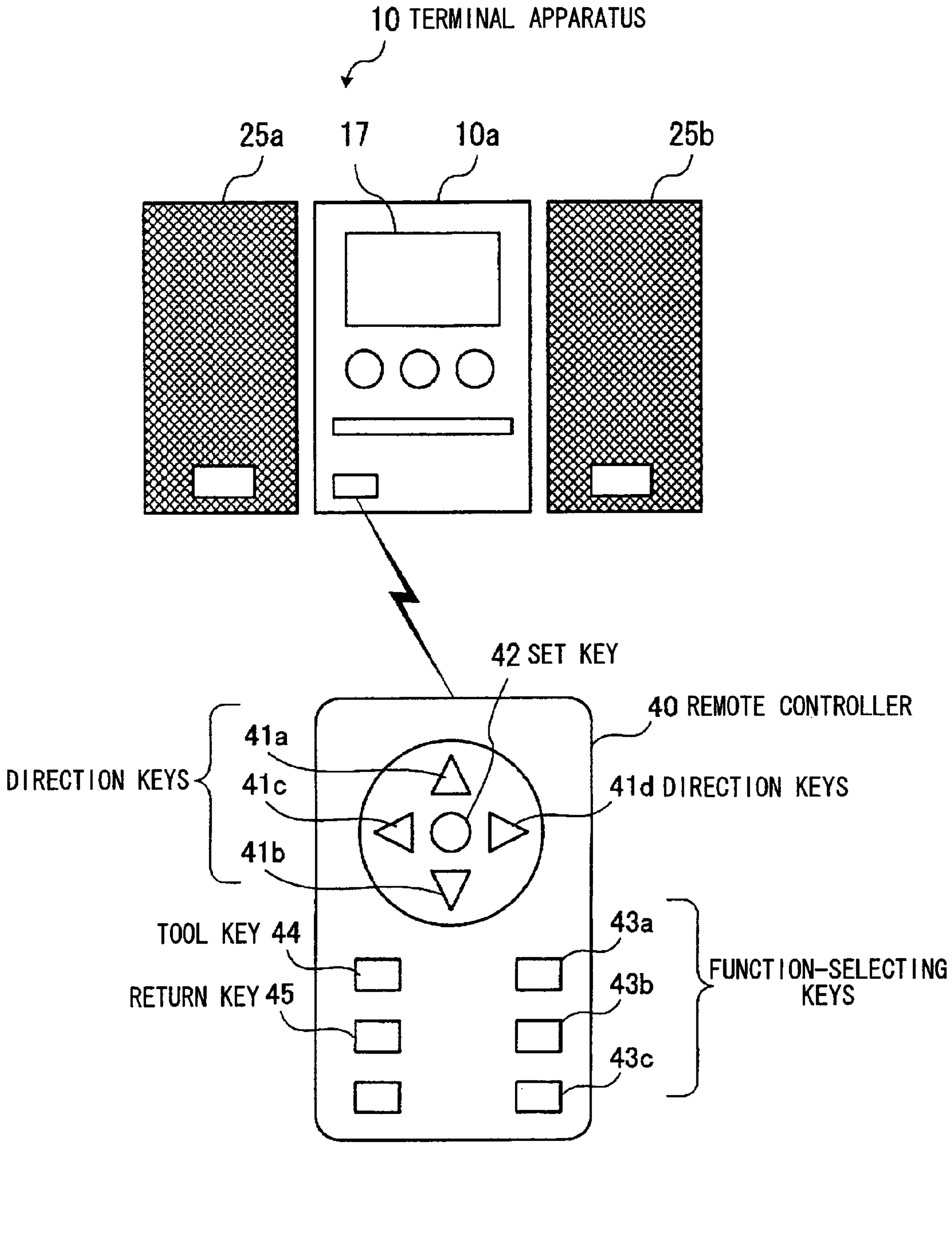
FIG. 4 is a diagram depicting the outer appearance of a terminal apparatus.

FIG. 4 is a diagram illustrating the outer appearance of the terminal apparatus. As FIG. 4 shows, the terminal apparatus 10 according to this embodiment looks like an audio system of the ordinary type. The terminal apparatus 10 has a main unit 10*a*, speakers 25*a* and 25*b*, and a remote controller 40. The main unit 10*a* can perform the function of playing back CDs and DVDs (Digital Versatile Discs), the function of recording data on and reproducing data from MDs, and the function of receiving FM programs and TV programs. The main unit 10*a* generates audio signals, which are supplied to the speakers 25*a* and 25*b*. The speakers 25*a* and 25*b* generate sound from the audio signals.

The main unit 10*a* incorporates the display device 17. The display device 17 can display the information about the musical piece being played back or the related information clipped and stored.

The remote controller 40 is an input device. When operated, the controller 40 remote-controls the main unit 10*a*. The remote controller 40 has a plurality of operation keys. When the user depresses the operation keys, the remote controller 40 transmits signals corresponding to the depressed key to the main unit 10*a* by a radio communication means, for example, by means of infrared ray.

Among the operation keys are directions keys 41*a* to 41*d*, a set key 42, function-selecting keys 43*a* to 43*c*, a tool key 44 and a return key 45.

The direction keys 41*a* to 41*d* are used to move the cursor on the screen of the display device 17 and to move a position where focusing should be achieved. The four direction keys 41*a* to 41*d* designate the upward, downward, leftward and rightward directions, respectively. When the keys 41*a* to 41*d* are depressed, the cursor or the like moves in the directions corresponding to the depressed key.

When pushed, the set key 42 sets the information the display device 17 is displaying.

The function-selecting keys 43*a* to 43*c* are used to select functions. The three function-selecting keys 43*a* to 43*c* are allocated to the integrated-service use function, the tuner function and the local-content managing function, respectively. When any one of the function-selecting keys 43*a* to 43*c* is depressed, the main unit 10*a* is set to the operating mode associated with the function-selecting key depressed.

The tool key 44 is a button, which is pushed to cause the display device 17 to display a tool menu. The tool menu includes commands related to the contents displayed on the display device 17, too. The user can select any command displayed, to make the terminal apparatus 10 perform the process designated by the command. Assume that the user operates the direction keys 41*a* to 41*d*, selects a command and then depresses the set key 42. Then, the terminal apparatus 10 carries out the process that the selected command designates.

The return key 45 is a button, which is pushed to change the information displayed on the display device 17, back to the information previously displayed.

The remote controller 40 can have other operation keys, in addition to those illustrated in FIG. 4. For example, there are a volume control key, a playback key for playing back a CD or the like, a stop key, and the like.

The internal structure of the terminal apparatus 10 will be described.

Figure 5:
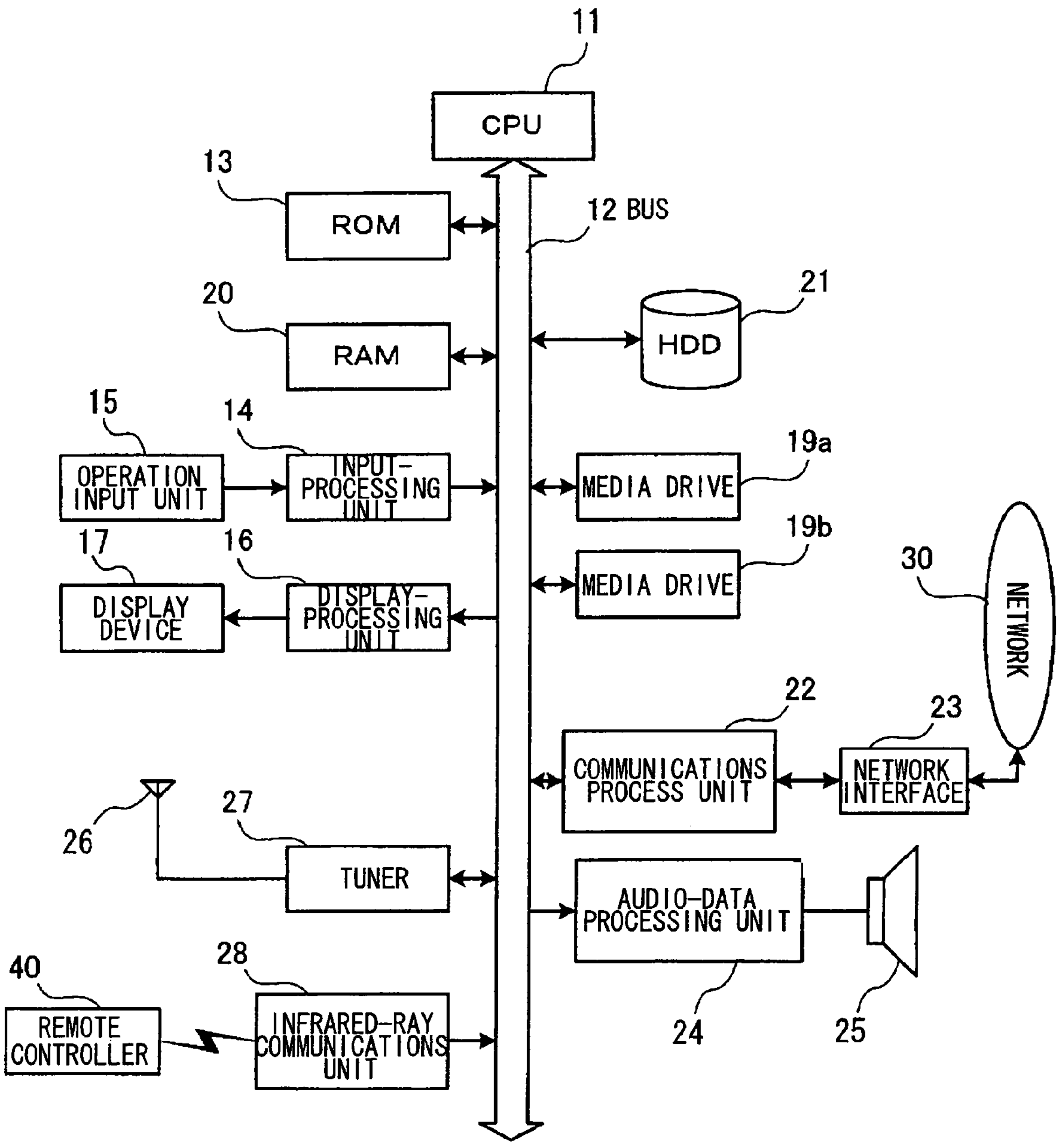
FIG. 5 is a block diagram illustrating the hardware configuration of the terminal apparatus.

FIG. 5 is a block diagram showing the hardware configuration of the terminal apparatus 10. So configured as shown in FIG. 5, the terminal apparatus 10 can manage, record and reproduce various sources, such as musical pieces.

The CPU 11 controls the terminal apparatus 10 entirely and performs various operations, in accordance with the program activated. For example, the CPU 11 carries out the communication via the network 30, receives and gives information from and to the user, reproduces and clips contents from media, stores contents into the HDD 21, manages the contents stored in the HDD 21, and retrieves information via the network 30 in accordance with clipping information or similar information. The terminal apparatus 10 can record and play back the audio content data and moving-picture content data. The CPU 11 exchanges control signals and data with the other circuits through the bus 12.

A ROM (Read Only Memory) 13 stores the operation programs that the CPU 11 should execute, a program loader, various operation coefficients, parameters for use in executing the programs, and the like. A RAM 20 may store the programs the CPU 11 should execute. The RAM 20 can be used as a data region and a task region, which the CPU 11 needs when it executes various processes.

An operation input unit 15 has operation keys and various input devices, which are provided on the housing of the terminal apparatus 10. The input device includes a jog dial and a touch panel. The operation input unit 15 may have a keyboard and a mouse, which serve as GUIs (Graphical User Interfaces). The information input at the operation input unit 15 is supplied to the input-processing unit 14. The unit 14 performs a specific process on the information, generating an operation command. The command is supplied to the CPU 11. In response to the operation command, the CPU 11 carries out a required operation or control that the apparatus 10 may operate in accordance with the command input to it.

As for the display device 17, a display device, for example, a liquid crystal display is connected. It can display various kinds of information. When the CPU 11 supplies display information to the display-processing unit 16 in accordance with various operating states, input states and communications states. The display-processing unit 16 makes the display device 17 perform a display operation on the basis of the display data supplied from the CPU 11. The display device 17 displays the contents of the related information distributed from the servers or the contents of the information clipped. If musical pieces are retrieved via the network 30, the display device 17 will display the results of the retrieval.

The media drives 19*a* and 19*b* can record and reproduce contents, such as musical pieces, on and from a portable recording medium. (They can only reproduce contents from a recording medium, depending upon the type of the medium.) The media drives 19*a* and 19*b* can record and reproduce information on and from different types of recording media, not on and from the same type of a recording medium. For instance, the media drive 19*a* reproduces information from CDs and DVDS, while the media drive 19*b* records and reproduces information on and from MDs.

The portable recording media in which contents such as musical pieces are recorded are not limited to optical recording media such as CDs, DVDS, and the like. For example, as for the recording media, it is possible to use a recording medium constituted by a semiconductor memory such as a flash memory-storing contents. In this case, a flash memory reader/writer is connected to the bus 12.

The user may insert a recording medium (e.g., CD, DVD, MD, or the like) in which arbitrary contents are recorded into the media drive 19*a* or 19*b* and operates the remote controller 40. Then, the user can enjoy listening to music. Assume that the user operates the remote controller 40, instructing that the media drive 19*a* should reproduce the contents. Then, the CPU 11 instructs the media drive 19*a* to reproduce the contents. Thus, the media drive 19*a* accesses and reads the designated contents from the inserted recording medium.

The contents thus read may be audio contents. In this case, the CPU 11 first decodes, if necessary, the audio contents and then transfers the contents to the audio-data processing unit 24. The audio-data processing unit 24 performs sound-field process, sound-volume adjustment, D/A conversion, amplification and the like on the audio data. The audio data, thus processed, is output from the speaker unit 25. The speaker unit 25 comprises the speakers 25*a* and 25*b* that are shown in FIG. 4. Thus, the speaker unit 25 can output stereophonic sound.

The CPU 11 can make the HDD 21 accumulate the contents reproduced by the media drives 19*a* and 19*b*, in the form of an audio-data file. The audio-data file may take the CD format. If this is the case, the contents are digital audio data obtained through 16-bit quantization at the sampling frequency of 44.1 KHz. Alternatively, the audio-data file may take the compressed audio-data format in order to save the storage capacity of the HDD 21. In this case, the compressing scheme is not limited to a particular one. ATRAC (Advanced Transform Acoustic Coding, trademark), MP3 (MPEG Audio Layer-3), or the like can be employed.

The tuner 27 is, for example, an AM-FM radio tuner. When controlled by the CPU 11, the tuner 27 decodes the broadcast signal that the antenna 26 has received. Needless to say, the tuner 27 can be a television tuner, a broadcast-satellite tuner, a digital-broadcast tuner, or the like. The broadcast audio signal thus decoded undergoes a specific process in the audio-data processing unit 24. The broadcast audio signal is output from the speaker unit 25 as broadcast audio.

When controlled by the CPU 11, a communications process unit 22 encodes the data to be transmitted and decodes the data received. The network interface 23 transmits the data encoded by the communications process unit 22 to predetermined external apparatuses via the network 30. The network interface 23 also transmits signals transmitted from the external apparatuses via the network 30 to the communications process unit 22. The communications process unit 22 transfers the information it has received, to the CPU 11. The information the terminal apparatus 10 receives through the network 30 includes, for example, the information related to the FM programs being broadcast and the titles of the musical pieces contained in a CD or the like.

The infrared-ray communications unit 28 achieves communications by a wireless communication means such as infrared ray, with the remote controller 40. The infrared-ray communications unit 28 performs a particular process on the signal sent from the remote controller 40, sends it as an operation command to the CPU 11. In response to the operation command, the CPU 11 performs a required operation or control so that the apparatus 10 may operate in accordance with the command input to it.

The configuration of the terminal apparatus 10 is not limited to the one illustrated in FIG. 5. The apparatus 10 can have various configurations. For example, the apparatus 10 may have an interface that accomplishes communication with the peripheral apparatuses. The interface may be an USB (Universal Serial Bus) interface, an IEEE 1394 interface, a Bluetooth interface, or the like. In the terminal apparatus 10, the HDD 21 can store the contents of the audio data downloaded by the network interface 23 via the network 30, and the contents of the audio data transferred through the interface such as the USB interface, IEEE 1394 interface or the like. The terminal apparatus 10 may have a terminal for connecting a microphone or an external headphone, a video-output terminal for use in reproducing data from a DVD, a line-connecting terminal, an optical digital connection terminal, and the like. Further, the terminal apparatus 10 may have a PCMCIA slot, memory-card slots, and the like. Hence, the terminal apparatus 10 can exchange data with external information-processing apparatuses and audio apparatuses.

The program modules incorporated in the system according to the present embodiment will be described. The program modules describe the various processes that the terminal apparatus 10 can carry out. That is, the terminal apparatus 10 can perform the processes in accordance with the program modules, respectively. Hereinafter, the functions that the apparatus 10 performs in accordance with the program modules shall be distinguished by using the names of the program modules.

Figure 6:
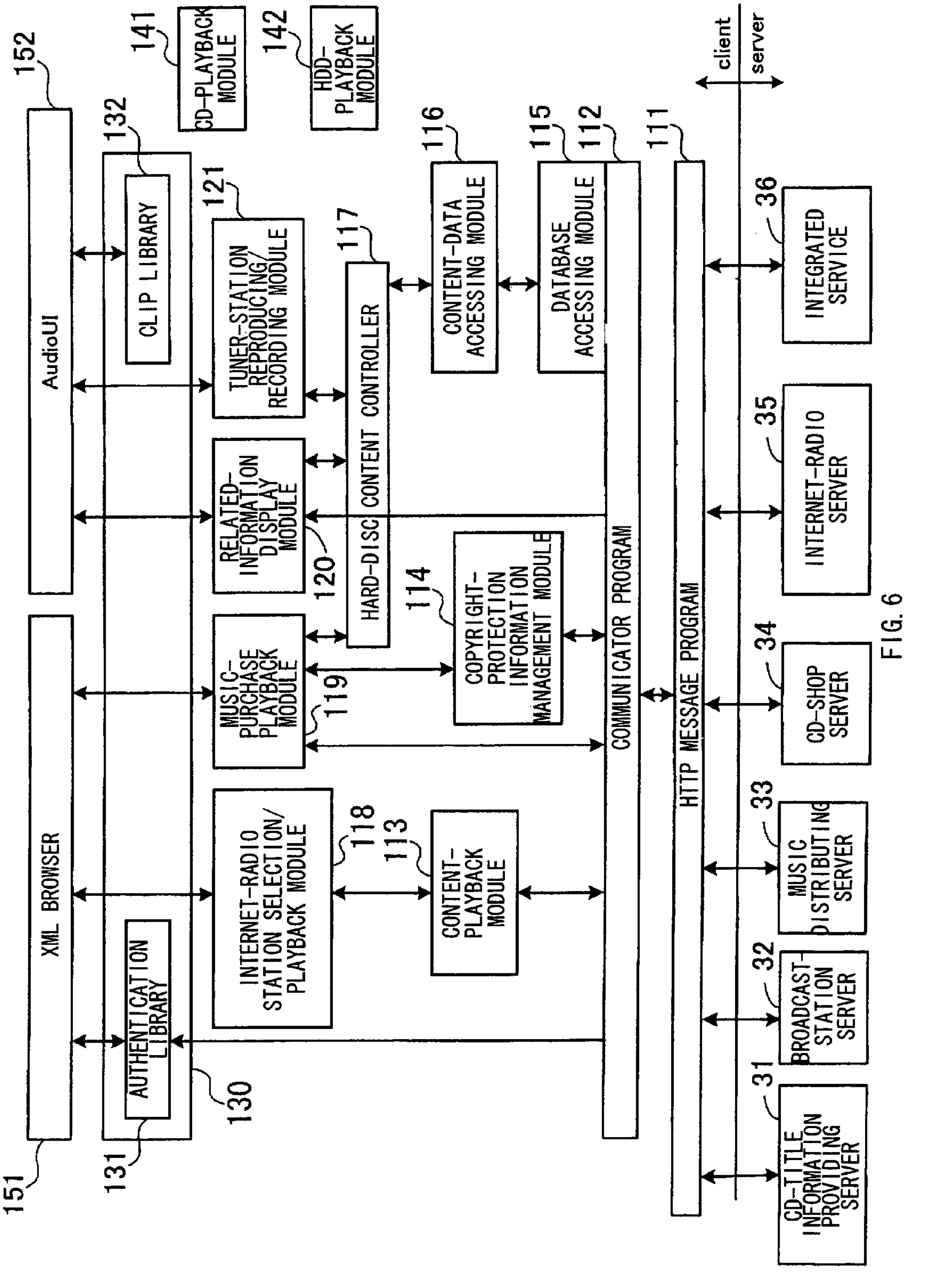
FIG. 6 is a diagram showing the program configuration of the system according to the invention.

FIG. 6 is a diagram showing the program modules that describe the processes the terminal apparatus 10 can perform. As seen from FIG. 6, the program modules for the terminal apparatus 10 are designed to work on the OS. Using the program modules, the terminal apparatus 10 can perform communication with the CD-title information providing server 31, the broadcast-station server 32, the music distributing server 33, the CD-shop server 34 for selling CDs, the integrated service server 36, the Internet radio server 35, and some other servers.

An HTTP (Hyper Text Transfer Protocol) message program 111 accomplishes HTTP communication between the terminal apparatus 10 and the various servers, such as the CD-title information providing server 31, the broadcast-station server 32, the CD-shop server 34, the integrated service server 36, and some other servers. The communicator program 112 is a communications module that performs communication with the integrated service server 36, etc.

A content-playback module 113 and a copyright protection information management module 114 are provided as higher-order modules (functioning like a user interface) to the communicator program 112. The content-playback module 113 interprets and reproduces the codec of contents. The copyright protection information management module 114 manages the information concerning the protection of copyright. An Internet-radio station selection/playback module 118 is provided as a higher-order module to the content-playback module 113. The module 118 selects an Internet-radio station and reproduces the data broadcast by the Internet-radio station selected. A music-purchase playback module 119 is provided as a higher-order module to copyright protection information management module 114. The module 119 is used to buy musical pieces and can reproduce the musical pieces bought.

As higher order modules to the Internet-radio station selection/playback module 118 and music-purchase playback module 119, an XML (extensible Markup Language) browser 151 is provided. The XML browser 151 interprets the XML files sent from various servers and causes the display device 17 to display information. The XML browser 151 interprets the content the user inputs by operating the terminal apparatus 10 while the apparatus 10 remains in the integrated-service using mode. A process request corresponding to the input content is transferred from the XML browser 151 to other modules. For example, a musical piece selected by the user is purchased by the music-purchase playback module 119 via the XML browser 151 and is written into the HDD 21 via a hard-disc content controller 117.

An authentication library 131 of a library 130 is connected to the communicator program 112. The authentication library 131 authenticates the integrated service server 35 and the other servers.

There are three other higher-order modules to the communicator program 112. They are a database accessing module 115, a content-data accessing module 116, and the hard-disc content controller 117. The database accessing module 115 can access the various databases provided in the HDD 21. The content-data accessing module 116 accesses the contents stored in the HDD 21. The hard-disc content controller 117 manages the contents stored in the HDD 21.

There are higher-order modules to the hard-disc content controller 117. They are a related-information displaying module 120, a tuner-station reproducing/recording module 121 and the music-purchase playback module 119. The related-information displaying module 120 makes the display device 17 display the titles of the musical pieces broadcast by a broadcast station 37 and the names of the artists who play the musical pieces. The tuner-station reproducing/recording module 121 selects the broadcast station 37 and causes the HDD 21 to record the contents of the musical pieces broadcast by the broadcast station 37 selected.

For example, the musical pieces received from the broadcast station 37 selected, via an audio-user interface (AuiodUI) 152, is written into the HDD 21 trough the content-data accessing module 116.

The related-information displaying module 120 receives the titles of the musical pieces being broadcast from the broadcast station 37 and the names of the artists as related information by the tuner-station reproducing/recording module 121 via the HTTP message program 111 from the CD-title information providing server 31, the broadcast-station server 32 and the like. The module 120 supplies this information via the audio-user interface 152 to the display device 17, which displays the tiles of the musical pieces and the names of the artists.

The related information that the display device 17 receives via the audio-user interface 152 and displays can be temporarily stored in clip library 132 of a library 130. The related information can be stored into the HDD 21 through the database accessing module 115.

The terminal apparatus 10 further includes two program modules, i.e., CD-playback module 141 and HDD-playback module 142. The CD-playback module 141 reproduces data from CD, and the HDD-playback module 142 reproduces data from HDD 21. The CD-playback module 141 and HDD-playback module 142 output the reproduction result from CD and HDD via the audio-data processing unit 24 and the speaker unit 25.

In the terminal apparatus 10 thus configured, the related information acquired from servers can be clipped. At the same time, a process can be performed to retrieve and buy musical pieces.

The sequence of acquiring the information related to musical pieces the broadcast station 37 has broadcast will be explained. In this embodiment, the broadcast-station server 32 provides the information related to the musical pieces broadcast. Nevertheless, another server may be used to provide the information about the programs of the broadcast stations, at the request of the broadcast stations.

Figure 7:
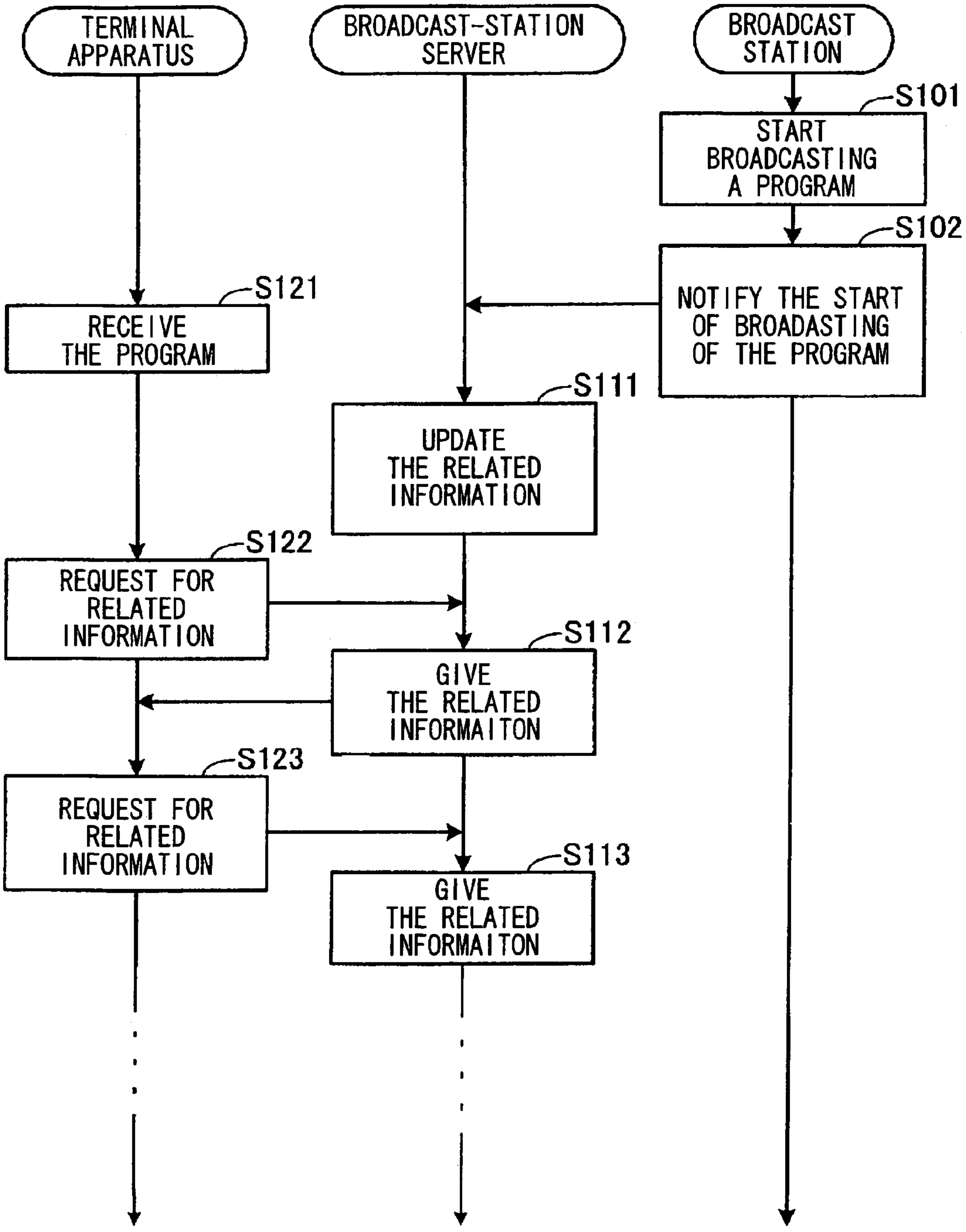
FIG. 7 is a chart showing the sequence of acquiring the information related to the musical piece being broadcast.

FIG. 7 is a chart showing the sequence of acquiring the information related to a musical piece being broadcast. Assume that the broadcast station 37 is broadcasting programs one after another in accordance with a broadcasting schedule. The steps shown in FIG. 7 will be described.

[Step S101]

The broadcast station 37 starts broadcasting a program.

[Step S102]

When the broadcast station 37 starts broadcasting the program, it notifies the broadcast-station server 32 that the broadcasting of musical pieces has been started. This notification may be automatically given from the broadcasting device to the broadcast-station server 32. Alternatively, a staff member of the broadcast station 37 may perform an operation to give the notification to the broadcast-station server 32.

[Step S111]

In the broadcast-station server 32, the HDD 21 stores, in the form of databases, the information related to musical pieces, i.e., the titles of the musical pieces, the names of the artists who play the musical pieces, the title of the CDs storing the musical pieces, the numbers of the CDs, and the like. To give the terminal apparatus 10 the information related to any musical piece notified by the broadcast station 37, the broadcast-station server 32 updates the related information it has been holding, to the information related to the musical piece notified. The broadcast-station server 32 goes to the next step, i.e., Step S112.

[Step S121]

The terminal apparatus 10 receives the program that the broadcast station 37 broadcasts in Step S101. It receives a musical piece broadcast in the program, too. The terminal apparatus 10 goes to the next step, i.e., Step S112.

[Step S122]

The terminal apparatus 10 transmits to the broadcast-station server 32 a request for the information related to the musical piece, i.e., the title of the musical piece, the name of the artist who plays the musical piece, and the like, repeatedly at preset intervals (e.g., 30 seconds). That is, the terminal apparatus 10 carries out poling to acquire the information related to the musical piece being received. The terminal apparatus 10 then goes to the next step, i.e., Step S123.

[Step S112]

At this time, the broadcast-station server 32 transmits the information related to the musical piece it has now hold, in response to the request made by the terminal apparatus 10, to the terminal apparatus 10 via the network 30. The broadcast-station server 32 then goes to the next step, i.e., Step S113.

In the terminal apparatus 10, the display device 17 can display the information related to the musical piece, which has been transmitted from the broadcast-station server 32. As a result, the terminal apparatus 10 can make the user recognize the title of the musical piece broadcast in the program, the name of the artist who plays the musical piece, and the like, as the related information.

In the present embodiment, the related information contains CD number, broadcast-station identification information and medium identification information, in addition to the title of the musical piece, the name of the artist and the like. The broadcast-station identification information identifies the broadcast station 37 that has broadcast the musical piece. The medium identification information identifies the recording media in which the musical piece is recorded.

[Step S123]

Upon lapse of 30 seconds, the terminal apparatus 10 again transmit a request for related information, to the broadcast-station server 32.

[Step S113]

The broadcast-station server 32 provides the information related to the musical piece, for the second time, to the terminal apparatus 10 via the network 30.

The terminal apparatus 10 therefore acquires the information related to the same musical piece unless the information is updated to the information related to the next musical piece to be broadcast. Hence, the display device 17 keeps displaying the information related to the same musical piece, until the related information is updated.

Thereafter, the terminal apparatus 10 can clip the information related to the musical piece provided by the broadcast-station server 32. Once the terminal apparatus 10 has clipped the information, it can acquire and clip the information related to any other musical pieces, too. The related information items, thus clipped, constitute a database in the HDD 21. This database functions as clipped-information storage device 21*a*.

The sequence in which the terminal apparatus 10 acquires the information related to a musical piece recorded in a desired CD, from the CD-title information providing server 31 provided in the broadcast-station server 32, will be explained.

Figure 8:
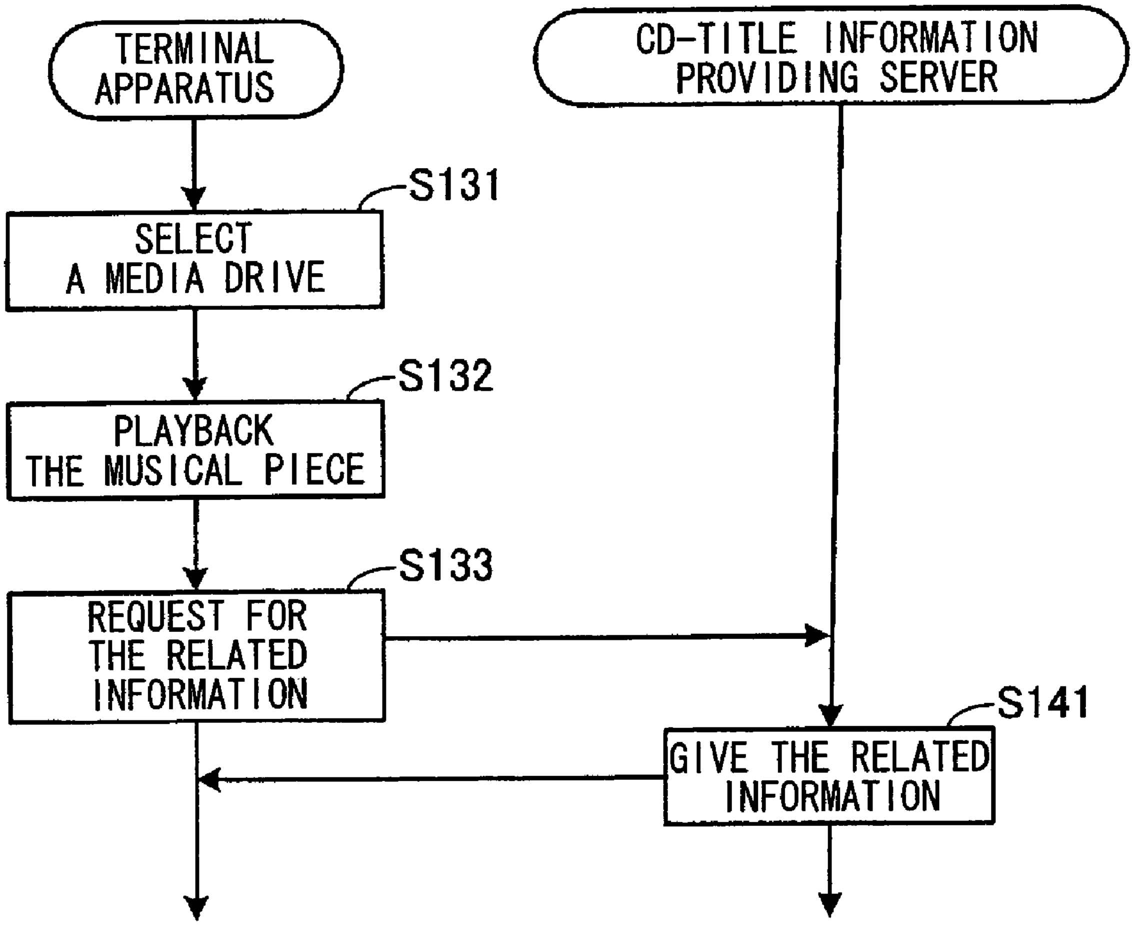
FIG. 8 is a chart illustrating the sequence of acquiring the information related to the musical piece being broadcast.

FIG. 8 is a chart illustrating the sequence of acquiring the information related to a musical piece recorded in a CD. The steps shown in FIG. 8 will be described.

[Step S131]

In response to the input operation of the user, the terminal apparatus 10 selects the media drive that should perform playback. For example, the user may push one of the function keys 43*a* to 43*c* provided on the remote controller 40, which corresponds to the media from which information should be reproduced. Assume that the user pushes the function-selecting key corresponding to CDs. Then, the terminal apparatus 10 is set to the operation mode of playing back a CD.

[Step S132]

In response to the input operation of the user, the terminal apparatus 10 playbacks the musical piece recorded in the recording medium (i.e., CD) set in the selected media drive.

[Step S133]

The terminal apparatus 10 requests the CD-title information providing server 31 for the information related to the musical piece recorded in the CD and played back by the media drives 19*a* and 19*b*.

[Step S141]

The CD-title information providing server 31 retrieves the information related to the CD and requested for by the terminal apparatus 10, from the database that has been already constituted. The information thus retrieved is given to the terminal apparatus 10. The request for the acquisition of information contains the retrieval key information that has been generated from the table of contents (TOC) data that is CD-management information. The CD-title information providing server 31 retrieves the CD-related information from the database in accordance with this retrieval key information. The retrieval key information is not limited to this one. It may be generated from musical piece or moving picture/image data that is recorded in the CD.

The related information provided by the CD-title information server 31 contains the CD number and medium identification information for the CD, in addition to the title of the musical piece and the name of the artist. There are various medium identification information that identify a CD, a DVD, a memory stick (trademark), and the like.

Thereafter, the terminal apparatus 10 acquires the information related to the CD, from the CD-title information providing server 31, and then clip this information. The related information thus clipped constitutes a database in the HDD 21 of the terminal apparatus 10. This database functions as clipped-information storage device 21*a*.

When the terminal apparatus 10 makes a retrieval request to the server, the server may give back a musical-piece set. In this case, the display device 17 of the terminal apparatus 10 displays the musical-piece set. Thus, the information items related to all musical pieces included in the musical-piece set can be clipped. The sequence of acquiring the related information and clipping the same, that the user performs, will be explained with reference to FIGS. 9 to 11.

Figure 9:
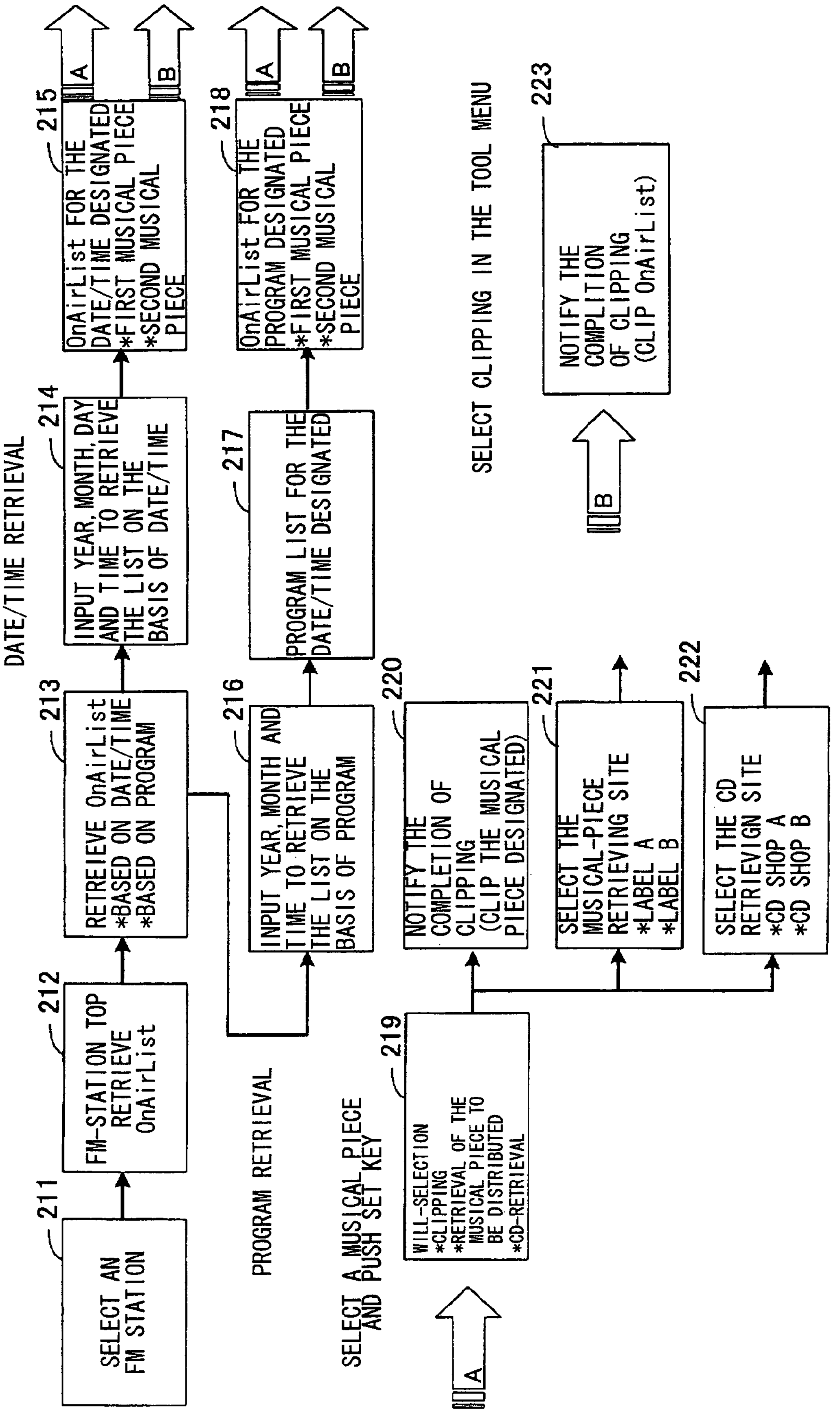
FIG. 9 is a chart showing the sequence of acquiring related information at the time of utilizing an integrated service.

FIG. 9 is a chart showing the sequence of acquiring related information at the time of utilizing an integrated service. In the integrated service, a list of musical pieces or a musical-piece set that corresponds to the retrieval key can be retrieved from various servers. In the instance shown in FIG. 9, the terminal apparatus 10 acquires the information related to a musical piece broadcast at the broadcast station 37.

First, the display device 17 displays an FM-station selecting menu 211. The user selects a desired one of the FM broadcast stations shown in the FM-station selecting menu 211. Then, the terminal apparatus 10 accesses the server of the FM broadcast station selected and acquires the main web page. Assume that the terminal apparatus 10 accesses the broadcast-station server 32 when the user selects the broadcast station 37.

When the FM station is selected, the display device 17 of the terminal apparatus 10 displays an FM-main menu 212. The user selects retrieval of an on-air list, among the items shown in the FM-main menu 212. Then, the terminal apparatus 10 acquires the web page that corresponds to the item selected by the user, from the broadcast-station server 32.

If the on-air list is selected, the terminal apparatus 10 changes the menu display by the display device 17 to a retrieval-method selecting menu 213. The user selects the date/time-based retrieval or the program-based retrieval on the retrieval-method selecting menu 213. Then, the terminal apparatus 10 acquires the web page corresponding to the retrieval mode selected, from the broadcast-station server 32.

If the date/time-based retrieval is selected, the terminal apparatus 10 makes the display device 17 display a retrieval date/time-input menu 214. The user inputs a desired retrieval date/time in the retrieval date/time-input menu 214. Note that retrieval date/time is a period of some length. When the user inputs a retrieval date/time, the terminal apparatus 10 transmits a retrieval request that contains a retrieval key, i.e., the input retrieval date/time, to the broadcast-station server 32. Then, the broadcast-station server 32 transmits the information related to the musical pieces broadcast during the period defined by the retrieval date/time as result information.

When the retrieval date/time is input, the terminal apparatus 10 switches the menu displayed on the display device 17, to a retrieval-result menu 215. The retrieval-result menu 215 shows a list of musical pieces. The user pushes the set key 42 or the tool key 44, causing the display device 17 to display the tool menu. Then, the user can select the clip command shown in the tool menu.

If the user selects one of the musical pieces shown in the retrieval-result menu 215 and then pushes the set key 42, the terminal apparatus 10 causes the display device 17 to display a will-selecting menu 219. If the user selects the clip command, the terminal apparatus 10 clips the information items related to all musical pieces shown in the retrieval-result menu 215. Then, the terminal apparatus 10 causes the display device 17 to display a clipping-end notification menu 223.

The user may select the program retrieval in the retrieval-method selecting menu 213. If this is the case, the terminal apparatus 10 causes the display device 17 to display a program-broadcasting date/time input menu 216. The user inputs the date/time of the program in the program-broadcasting date/time input menu 216. The date/time of the program is designated as a period of some length. The terminal apparatus 10 sends a retrieval request to the broadcast-station server 32. The retrieval request contains the input date/time of broadcasting the program, which is used as a retrieval key. Then, the broadcast-station server 32 sends to the terminal apparatus 10 the list of programs broadcast during the period designated by the date/time of the program and the information related to the musical pieces broadcast in each of the programs as result information.

When the date/time of broadcasting the program is input, the terminal apparatus 10 causes the display device 17 to display a program-list menu 217 for the date/time selected. When the user selects a program, the menu displayed by the display device 17 is switched to a retrieval-result menu 218.

The retrieval-result menu 218 displays a list of musical pieces. The user selects one of the musical pieces and then pushes the set key 42 or the tool key 44, causing the display device 17 to display a tool menu. The user can therefore select the clip command.

If the user selects one of the musical pieces shown in the retrieval-result menu 218 and pushes the set key 42, the terminal apparatus 10 causes the display device 17 to display the will-selecting menu 219. If the user selects the clip command, the terminal apparatus 10 clips the information items related to all musical pieces shown in the retrieval-result menu 218. Then, the terminal apparatus 10 causes the display device 17 to display a clipping-end notification menu 223.

The will-selecting menu 219 shows a process menu of processes that can be performed on the musical piece selected. The process menu shows, for example, "Clip," "Retrieval of musical piece for distribution," and "CD retrieval" as is illustrated in FIG. 9. The user can select one of the processes shown in the process menu.

If the user selects "Clip" shown in the will-selecting menu 219, the terminal apparatus 10 clips the information related to the musical piece selected. The terminal apparatus 10 then causes the display device 17 to display a clipping-end notifying menu 220.

If the user selects "Retrieval of musical piece for distribution" shown in the will-selecting menu 219, the terminal apparatus 10 makes the display device 17 display a music-retrieving-site selecting menu 221. Thereafter, the user can select one of the sites shown in the music-retrieving-site selecting menu 221. Thus, the user can retrieve the musical piece that should be distributed.

If the user selects "CD retrieval" shown in the will-selecting menu 219, the terminal apparatus 10 causes the display device 17 to display a CD-retrieving-site selecting menu 222. Then, the user can select one of the sites shown in the CD-retrieving-site selecting menu 222. The user can therefore retrieve a desired CD.

The terminal apparatus 10 can utilize the integrated service, obtaining the information related to any musical piece desired and clipping the musical piece, as described above.

The sequence of operations that the user performs to clip the information related to any musical piece while a radio program is being received will be described below.

Figure 10:
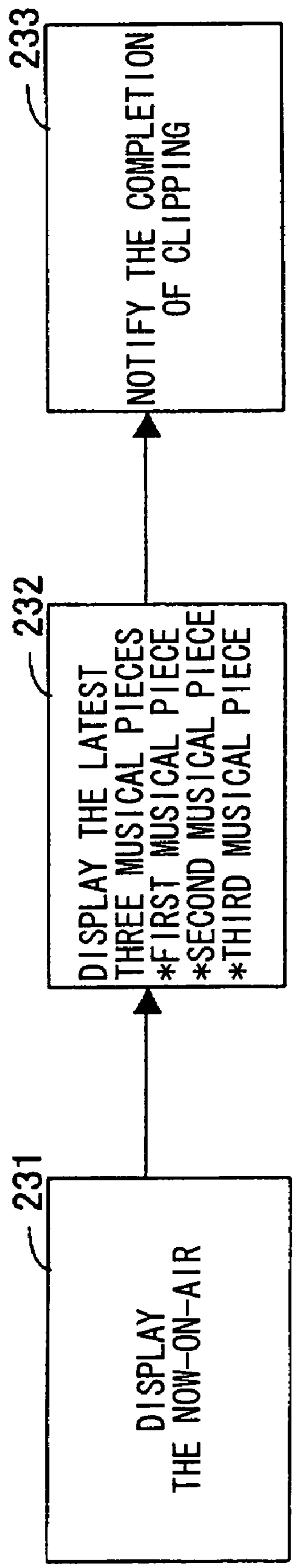
FIG. 10 is a chart depicting the sequence of acquiring related information at the time of receiving a broadcast program.

FIG. 10 is a chart depicting the sequence of acquiring related information at the time of receiving a radio program. While an FM-broadcast program is being received, the display device 17 displays an now-on-air menu 231. The now-on-air menu 231 shows the titles and the like of musical pieces being broadcast at present.

If the user pushes the took key 44, the terminal apparatus 10 displays a tool menu. When the user selects "Clip" shown in the tool menu, the terminal apparatus 10 makes the display device 17 display a recent-music-list menu 232. The recent-music-list menu 232 shows a number of musical pieces recently broadcast. (For example, three musical pieces are shown, as illustrated in FIG. 10.)

If the user selects one of the musical pieces shown in the recent-music-list menu 232 and depresses the set key 42, the terminal apparatus 10 clips the information related to the musical piece selected. Then, the terminal apparatus 10 causes the display device 17 to display a clipping-end notifying menu 233.

Thus, the terminal apparatus 10 acquires the information related to the musical piece being broadcast at present and clips this information.

The sequence of operations that the user performs to clip the information related to a musical piece being played back from a CD will be described below.

Figure 11:
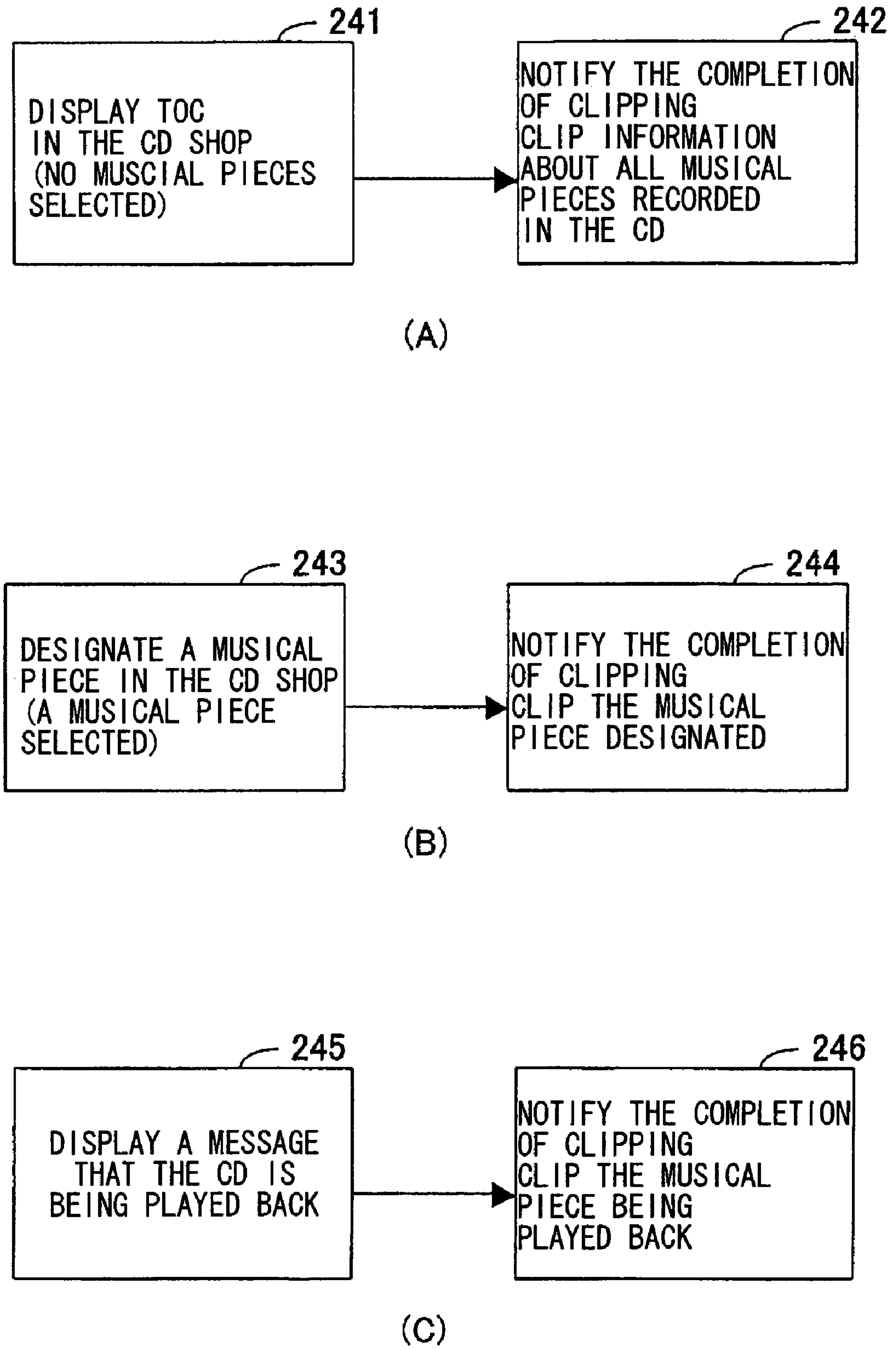
FIG. 11 are charts illustrating the sequence of acquiring related information while a CD is being played back, FIG. 11(A) showing the clipping performed while a table of contents (TOC) is being displayed when the CD is stopped, FIG. 11(B) showing the clipping performed while a TOC is being displayed when the CD is stopped, and FIG. 11(C) showing the clipping when the CD is played back.

FIGS. 11 are charts illustrating the sequence of acquiring related information while a CD is being played back. FIG. 11(A) shows the clipping performed while a table of contents (TOC) is being displayed when the CD is stopped. FIG. 11(B) depicts the clipping performed while a TOC is being displayed when the CD is stopped. FIG. 11(C) shows the clipping performed while a TOC is being displayed when the CD is played back.

As FIG. 11(A) shows, the terminal apparatus 10 makes the display device 17 display a TOC-displaying menu 243 while the CD remains to be played back and musical pieces remain to be selected. If the user pushes the tool key 44, the terminal apparatus 10 displays the tool menu. When "Clip" is selected on the tool menu, the terminal apparatus 10 clips the information items related to all musical pieces recorded in the CD, as a set of musical pieces. Then, the terminal apparatus 10 causes the display device 17 to display a clipping-end notifying menu 242.

As FIG. 11(B) shows, the terminal apparatus 10 has stopped playing back the CD. As long as a specific musical piece remains selected, the terminal apparatus 10 makes the display device 17 display the music-information displaying menu 243. The terminal apparatus 10 displays the tool menu when the user pushes the tool key 44. When the user selects the clip shown in the tool menu, the terminal apparatus 10 clips the information related to the musical piece now selected. The terminal apparatus 10 then causes the display device 17 to display a clipping-end notifying menu 244.

As FIG. 11(C) depicts, the terminal apparatus 10 makes the display device 17 display a music-information displaying menu 245, while playing back the CD. When the user pushes the tool key 44, the terminal apparatus 10 displays the tool menu. If the user select "clip" shown in the tool menu, the terminal apparatus 10 clips the information related to the musical piece being played back. Then, the terminal apparatus 10 causes the display device 17 to display a clip-end notifying menu 246.

The terminal apparatus 10 can thus acquire related information from various servers. The terminal apparatus 10 makes the display device 17 display the related information acquired. The user selects a musical piece from the musical pieces or the set of musical pieces, displayed by the device 17, which he or she wants to clip, retrieve or buy. Then, the user can make the terminal apparatus 10 perform the desired process.

Figure 12:
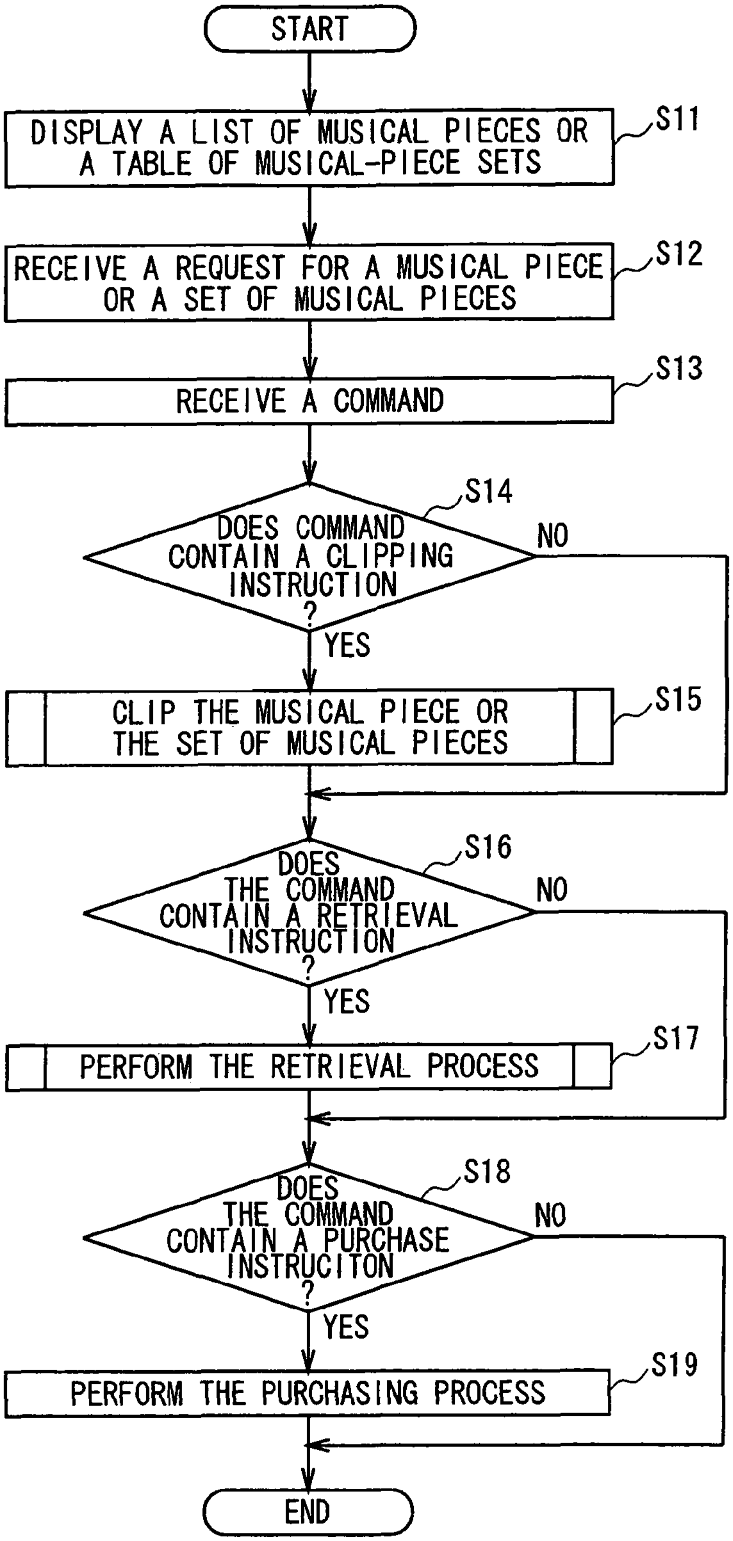
FIG. 12 is a flowchart illustrating the sequence of performing a process in accordance with the related information designated.

FIG. 12 is a flowchart illustrating the sequence of performing a process in accordance with the related information designated. The steps shown in FIG. 12 will be described.

[Step S11]

On acquiring the related information, the terminal apparatus 10 displays a list of musical pieces acquired, or a table of musical-piece sets. The list of musical pieces is a list of the musical pieces that are FM-broadcast now. (For example, it may be a list of the musical pieces being broadcast and several musical pieces (e.g., 7 pieces) broadcast immediately before.) In some cases, the display device 17 may display a list of the musical pieces recorded in the CD or MD that is being played back. The table of musical-piece sets displayed by the display device 17 is, for example, a list of programs of an FM broadcast station.

The terminal apparatus 10 may acquire the related information from a server such as the CD-title information providing server 31. Alternatively, it may acquire the information about CD TEXT, as related information, from a CD or MD. Wherever the related, information comes, the terminal apparatus 10 can clip the related information.

[Step S12]

The terminal apparatus 10 receives a request for the musical piece or a set of musical pieces, which the user has selected.

[Step S13]

The terminal apparatus 10 receives a command that the user has input. The command may be a clipping command, a retrieval command, a purchase command, or a command designating two or more of these processes, which are to be performed simultaneously.

[Step S14]

The terminal apparatus 10 determines whether the command designated by the user contains a clipping instruction. If the command contains a clipping instruction, the terminal apparatus 10 goes to Step S15. If the command does not contain a clipping instruction, the terminal apparatus 10 goes to Step S16.

[Step S15]

The terminal apparatus 10 performs the process of clipping the musical piece or set of musical pieces, which has been designated in Step S12. If the clipping instruction designates a set of musical pieces, the terminal apparatus 10 clips the information related to all musical pieces of the set. If the clipping instruction designates only one musical piece, the terminal apparatus 10 clips the information related to this musical piece.

[Step S16]

The terminal apparatus 10 determines whether the command given by the user contains a retrieval instruction or not. If the command contains a retrieval instruction, the terminal apparatus 10 advances to Step S17. If the command does not contain a retrieval instruction, the terminal apparatus 10 advances to Step S18.

[Step S17]

The terminal apparatus 10 carries out a retrieval process. More specifically, the terminal apparatus 10 receives an instruction from the user, for retrieving the related information. The user can operate the remote controller 40 or the like, to designate a method of retrieving the related information. The user can also input a retrieval instruction, which designates a CD number. Further, the user can input a retrieval instruction which designates the name and broadcast date of the program of the FM broadcast station.

In response to the retrieval instruction of the related information, the terminal apparatus 10 retrieves the related information. The terminal apparatus 10 may receive a retrieval instruction that designates a CD number. In this case, the terminal apparatus 10 transmits a retrieval request to the CD-title information providing server 31. The retrieval request has a retrieval key that is the CD number. The terminal apparatus 10 may receive a retrieval instruction that designates the name and broadcast date of the program of the FM broadcast station. If this is the case, the terminal apparatus 10 transmits a retrieval request to the broadcast-station server 32 of the designated FM broadcast station. This retrieval request has a retrieval key that is the name and broadcast date of the program.

On receiving the retrieval results from the server to which the retrieval request has been transmitted, the terminal apparatus 10 determines whether or not the retrieval results contain the related information. If the retrieval results do not contain the related information (that is, if no related information accords with the retrieval request), the terminal apparatus 10 changes the retrieval key to another and automatically performs a re-retrieval in accordance with the other retrieval key. The terminal apparatus 10 may not acquire the related information when the CD number is used as retrieval key. In this case, the retrieval key is switched to the artist's name and the re-retrieval is performed. If the terminal apparatus 10 acquires the related information as retrieval result, it displays the acquired related information.

[Step S18]

The terminal apparatus 10 determines whether the command the user has designated contains a purchase instruction for the content of the musical piece. If the command contains a purchase instruction, the terminal apparatus 10 advances to Step S19. If the command does not contain a purchase instruction, the terminal apparatus 10 terminates the process.

[Step S19]

In accordance with the purchase instruction, the terminal apparatus 10 performs the process of purchasing the content. To be more specific, the terminal apparatus 10 accesses the server that sells the content, performing the sequence of purchasing the content the user has designated. If the content is a musical piece, the terminal apparatus 10 can download the music data from the server that sells the musical piece.

Thus, the terminal apparatus 10 can acquire the related information and clip the related information acquired.

FIG. 13 is a diagram depicting the data configuration of related information thus clipped. The related information 50 clipped contains the musical-piece title, the artist's name, the clipping time, the CD number, the clipping site, and some other data items. These data items represent the various things concerning the musical piece.

The musical-piece title is the name of the musical piece. It is data contained in the related information transmitted from the server.

The artist's name is the name of the artist who plays the musical piece. It is data contained in the related information transmitted from the server.

The clipping time is the time when the musical piece is clipped. It is the time of the clock incorporated in the terminal apparatus 10 when the musical piece is clipped.

The CD number is the ID number of the CD in which the musical piece is recorded. It is data contained in the related information transmitted from the server. The CD number is the ID number that is used to identify the CD in CD shops. There are two types of CD numbers at present. Some CD shop uses one type, and others uses the other type. In view of this, the terminal apparatus 10 may add, to the related information clipped, the data identifying the code system used in the server that has provided the related information.

The clipping site is data representing the place where the content (source) corresponding to the related information clipped is available. The terminal apparatus 10 acquires the information related to the musical piece that is being played back from, for example, an MD. When the information is clipped, the terminal apparatus 10 sets "MD" as clipping site.

In the instance shown in FIG. 13, the musical-piece title is "Blue Sky after Rain," the artist's name is "the Falcons," the clipping time is "2003/3/8 19:20," the CD number is "01234567," and the clipping site is "MD."

The data items depend on the type of the related information clipped. They can be changed for a specific purpose.

A format in which the related information clipped is saved will be described below.

Figure 14:
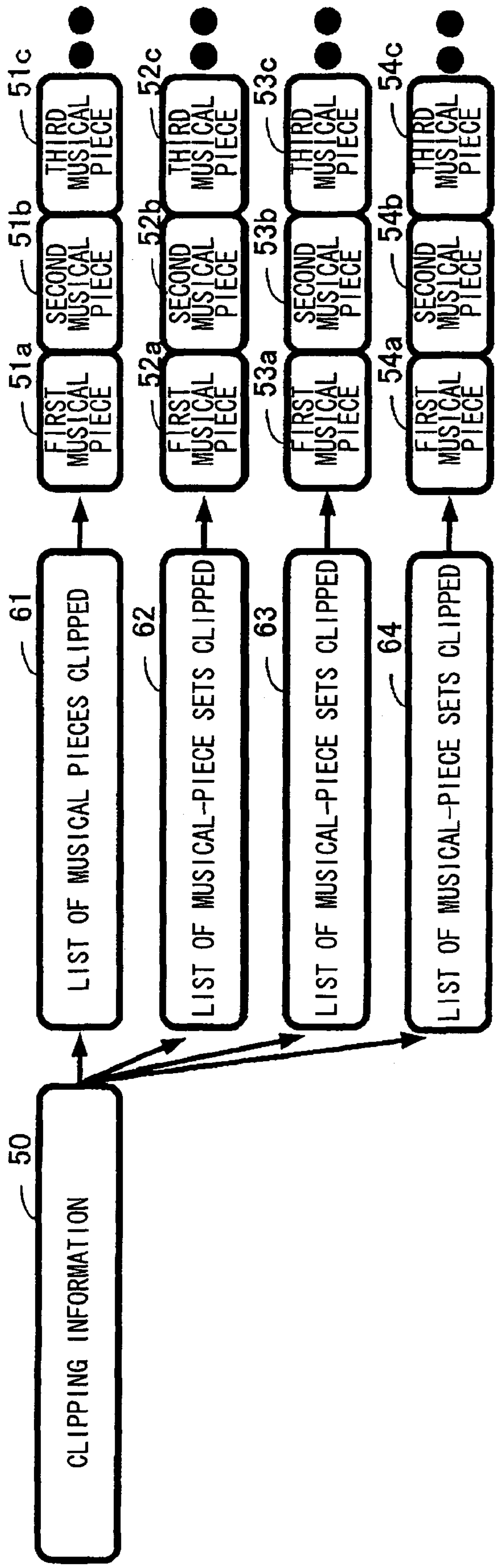
FIG. 14 is a diagram illustrating the format in which related information is saved.

FIG. 14 is a diagram illustrating the format in which the related information clipped is saved. The related information 50 clipped (clipped information) is saved in the form of some lists 61 to 64. The list 61 shows musical pieces clipped one by one. Each of the other lists 62 to 64 shows a set of musical pieces clipped. That is, only one list of individual musical pieces clipped is provided, whereas a few lists are provided, each showing a set of musical pieces clipped.

The list 61 of musical pieces clipped one by one is the site (e.g., folder or directory) where the information acquired by designating musical pieces, one by one, is saved. Each of the lists 62 to 64 is the site (e.g., folder or directory) where the information related to a set of musical pieces acquired is saved.

The lists 62 to 64, each showing a set of musical pieces clipped, have names that are appropriate for the set of musical pieces. When the terminal apparatus 10 saves information related to, for example, several musical pieces recorded in a CD, it sets the CD title as the name of the list showing the set of musical pieces clipped. The terminal apparatus 10 may save information related to several musical pieces broadcast in an FM program. In this case, the terminal apparatus 10 sets the name of the program or the date and time of broadcasting the program, as the name of the list showing the set of musical pieces clipped. The terminal apparatus 10 may save information related to several musical pieces retrieved via the network 30. If this is the case, the terminal apparatus 10 sets the retrieval key or the date and time of retrieving the musical pieces, as the name of the list showing the set of musical pieces clipped. Thus, various list names are available, in accordance with the types of the sets of musical pieces.

Items of related information clipped are associated with each list. More precisely, the information items 51*a*, 51*b* and 51*c* related to the first, second and third musical pieces clipped, and the like, are associated with the list 61. The information items 52*a*, 52*b* and 52*c* related to the first, second and third musical pieces clipped, and the like, are associated with the list 62 of a set of musical pieces clipped. The information items 53*a*, 53*b* and 53*c* related to the first, second and third musical pieces clipped, and the like, are associated with the list 63 of another set of musical pieces clipped. Likewise, the information items 54*a*, 54*b* and 54*c* related to the first, second and third musical pieces clipped, and the like, are associated with the list 64 of a set of musical pieces clipped.

To save any related information newly acquired, the terminal apparatus 10 designates a list to which the related information should be associated, in accordance with whether the information relates to individual musical pieces or a set of musical pieces. If the information relates to individual musical pieces, it is added to the end of the list 61. If the information relates to a set of musical pieces, the terminal apparatus 10 generates a new list for a set of musical pieces. In this case, the related information is associated with the new list.

The lists 62 to 64 show each a set of musical pieces clipped. The set may be a list (on-air list) of musical pieces FM-broadcast, a set of musical pieces obtained in the form of an album or play list, or a list of musical pieces retrieved. Thanks to this format of saving the related information clipped, the terminal apparatus 10 can handle various types of data, individual musical pieces, sets of musical pieces, clipped from various sources (CD, MD, HDD, TV program played black, musical pieces received, musical pieces acquired by inspecting related information) in the same manner. In this respect, the terminal apparatus 10 is advantageous.

How the terminal apparatus 10 operates to clip information related to musical pieces will be explained.

To clip information related to a musical piece, the terminal apparatus 10 acquires the information related to a musical piece the user wants to clip from a server. The user operates the remote controller 40 and the like, inputting a retrieval instruction to the terminal apparatus 10.

On receiving the retrieval instruction, the terminal apparatus 10 transmits a retrieval request corresponding to the retrieval instruction, to the server. Assume that the retrieval instruction describes that the information relates to the CD being played back now should be acquired. Then, the terminal apparatus 10 transmits a retrieval request that contains the information designating the CD, such as the CD number, to the CD-title information providing server 31. The CD-title information providing server 31 sends the information related to the musical pieces recorded in the CD, to the terminal apparatus 10 as retrieval result. The terminal apparatus 10 makes the display device 17 displays the retrieval result. When the user selects a musical piece that should be clipped, and then input a clipping instruction, the terminal apparatus 10 performs the process of clipping the musical piece.

Figure 15:
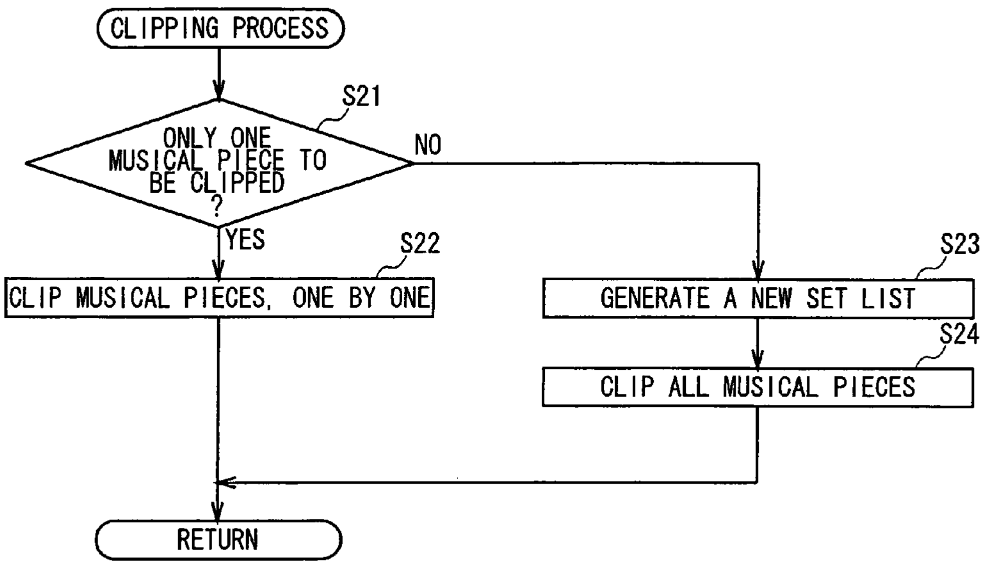
FIG. 15 is a flowchart showing the sequence of a clipping process.

FIG. 15 is a flowchart showing the sequence of a clipping process. The steps shown in FIG. 15 will be described.

[Step S21]

The terminal apparatus 10 determines whether a single musical piece or a list of musical pieces has been selected and should be clipped. If a single musical piece should be clipped, the terminal apparatus 10 advances to Step S22. If a list of musical pieces should be clipped, the terminal apparatus 10 goes to Step S23.

[Step S22]

If a single musical piece should be clipped, the terminal apparatus 10 clips the information related to the musical piece, to the list 61 that has been clipped for individual musical pieces. Then, the terminal apparatus 10 terminates the clipping process.

[Step 23]

A list of musical pieces should be clipped, the terminal apparatus 10 generates a new set list. The terminal apparatus 10 then gives a name to the set list generated. The name is, for example, the name of the list of musical pieces, which has been selected (e.g., the name of an album or the name of an FM-broadcast program).

[Step S24]

The terminal apparatus 10 clips the information related to every musical piece shown in the list to be clipped, to the set list generated in Step S23. Then, the terminal apparatus 10 terminates the clipping process.

How a musical piece or a set of musical pieces is clipped will be explained, with reference to FIGS. 16 and 17.

Figure 16:
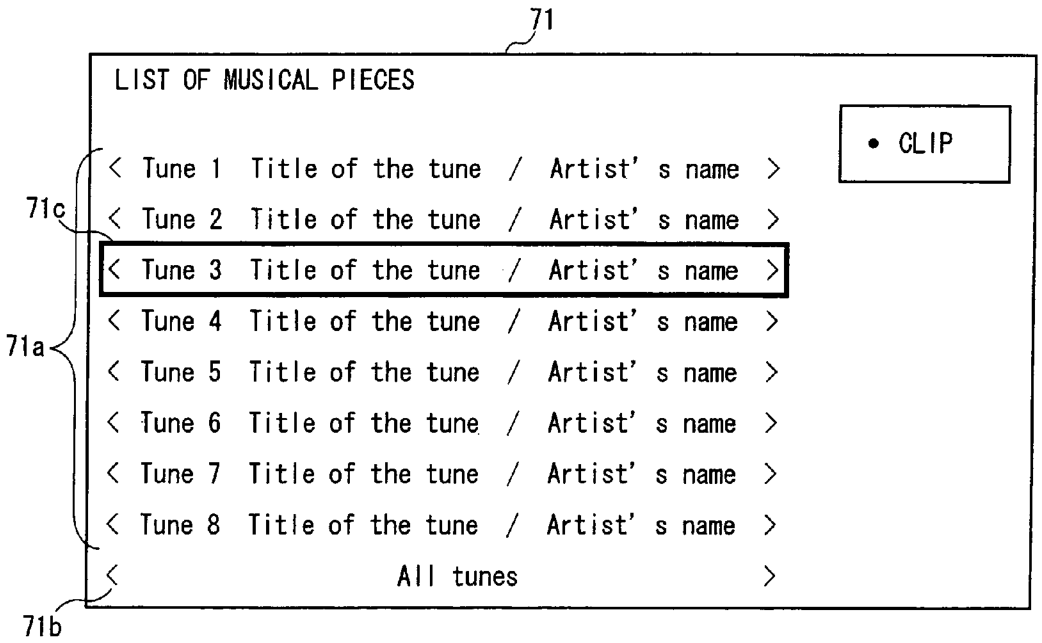
FIG. 16 is a diagram illustrating an operation that is performed to clip a musical piece from a list.

FIG. 16 is a diagram illustrating an operation that is performed to clip a musical piece from a list. The display device 17 displays, in its screen 71, a music list 71*a*. The music list 71*a* shows the titles of musical pieces and the names of artists, which are the related information retrieved. A musical-piece selection part 71*b* is displayed below the music list 71*a*. The musical-piece selection part 71*b* is a selection item that is designated to clip all related information items shown in the music list 71*a*.

To clip a musical piece, the user selects the musical piece from those shown in the music list 71*a* and then performs an input operation, designating the clip process. More specifically, the user operates the direction keys 41*a* and 41*b*, i.e., up-key and down-key, provided on the remote controller 40, moving the cursor 71*c* in the screen 71 to the musical piece to be clipped. The user then pushes the set key 42, thus clipping the related information pointed by the cursor 71c.

To clip all musical pieces shown in the music list 71a, the user selects the musical-piece selection part 71b and performs an input operation, designating the clip process. More precisely, the user operates the direction keys 41a and 41b, i.e., up-key and down-key, provided on the remote controller 40, moving the cursor 71c in the screen 71 to the musical-piece selection part 71b. The user then pushes the set key 42, thus clipping all musical pieces shown in the music list 71a.

The terminal apparatus 10 can clip all musical pieces shown in the music list, from a music list table. The terminal apparatus 10 saves the latest list of the musical pieces FM-broadcast if the user designates the musical-piece selection part 71b while the display device 17 is displaying this list.

Figure 17:
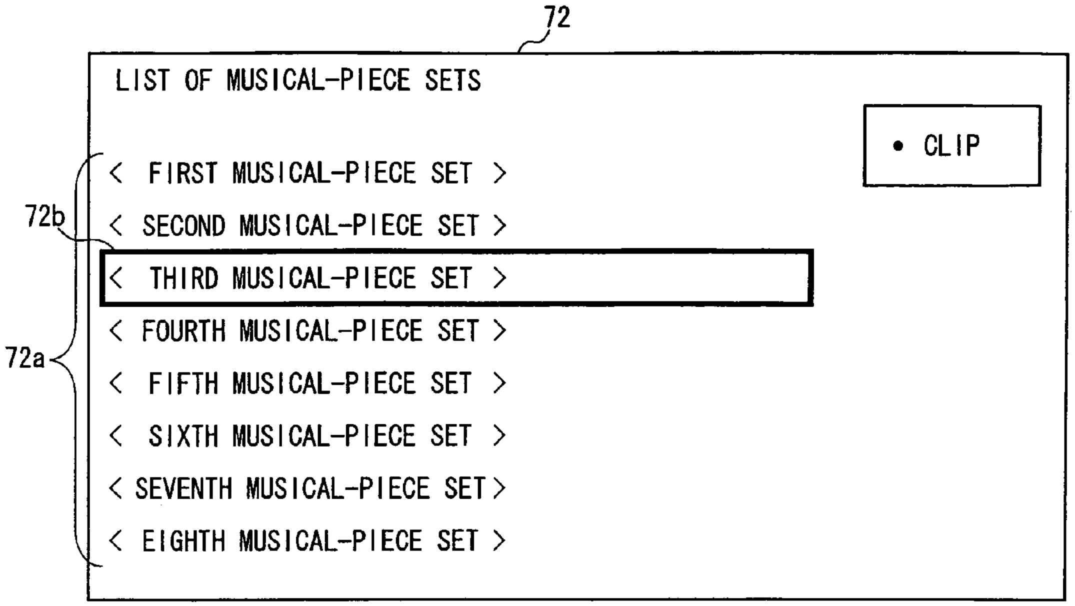
FIG. 17 is a diagram illustrating an operation that is performed to clip a music list from a musical-piece set table.

FIG. 17 is a diagram illustrating an operation that is performed to clip a music list from a musical-piece set table. The display device 17 displays, in its screen 72, a musical-piece set table 72a. The musical-piece set table 72a shows the ID names of the music lists. For example, the names of FM-broadcast programs are shown in the musical-piece set table 72a.

To clip all musical pieces shown in the music list contained in the musical-piece set table 72a, the user selects one of the music lists shown in the musical-piece set table 72a and performs an input operation to designate the clipping process. To be more specific, the user operates the direction keys 41a and 41b, i.e., up-key and down-key, provided on the remote controller 40, moving the cursor 72b to the desired music list. The user then pushes the set key 42, thus clipping the information related to all musical pieces shown in the music list pointed by the cursor 72b.

The clipping process can be performed in methods other than the method explained with reference to FIGS. 16 and 17. This is possible only if the terminal apparatus 10 has an user interface that can select any musical piece desired or any music list desired.

When a clipping process is designated, the display device 17 displays a clip confirmation menu.

Figure 18:
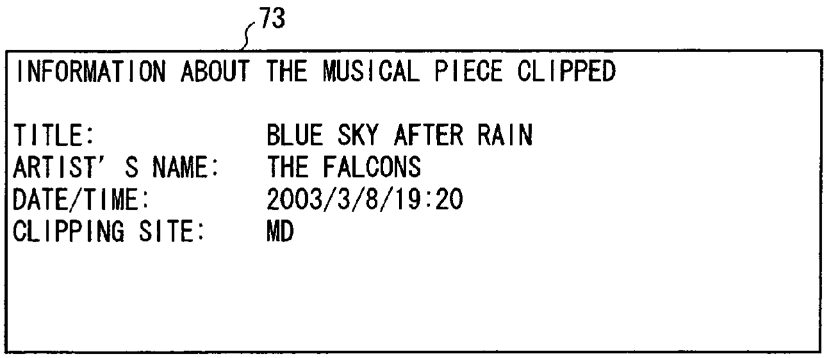
FIG. 18 is a diagram showing a clip confirmation menu.

FIG. 18 is a diagram showing a clip confirmation menu 73. As FIG. 18 depicts, the clip confirmation menu 73 shows the related information to be clipped. The related information shown in FIG. 18 consists of a musical-piece title "Blue Sky after Rain," the artist's name "the Falcons," the clipping time "2003/3/8 19:20," and the clipping site is "MD." Thus, the terminal apparatus 10 adds the related information clipped, to the list 61 stored in the clipped-information storage device 21a and showing the musical pieces clipped one by one, after it displays the information related to the musical pieces clipped.

On receiving the user's request for clipping musical pieces, the terminal apparatus 10 displays at least a part of the information related to the musical pieces to be clipped.

Figure 19:
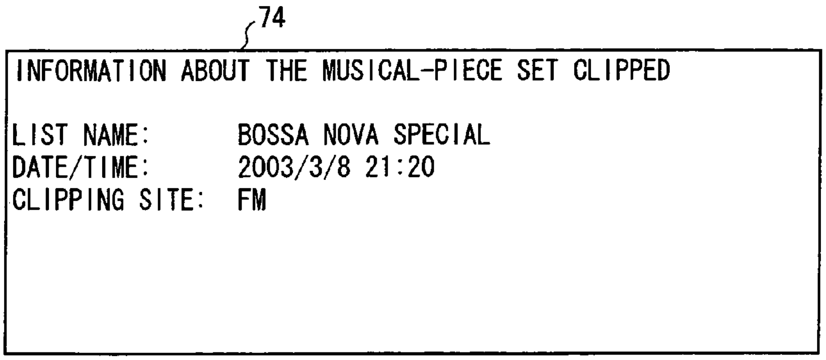
FIG. 19 is a diagram showing a menu displaying the music list clipped.

FIG. 19 is a diagram showing a menu displaying the music list information clipped. As shown in FIG. 19, the musical-list information clipped is displayed in the screen 74. More specifically, the music list name "Special Bossa Nova Album," the clipping time "2003/3/8 21:20," and the clipping site is "FM" are displayed in the example of FIG. 19. After displaying the information about the musical pieces clipped, the terminal apparatus 10 newly generates a list of musical-piece set clipped in the clipped-information storage device 21a. Namely, the terminal apparatus 10 adds the information related to every musical piece clipped, to the set list.

The terminal apparatus 10 can thus clip the information related to each musical piece or the information related to a set of musical pieces. In response to the user's request, the terminal apparatus 10 displays any musical piece clipped or any set of musical pieces clipped, at the display device 17. The terminal apparatus 10 stores the related information in a hierarchical format. Hence, any desired item of related information can be selected by tracing the format from the highest layer of the format. More precisely, the display device 17 displays a musical-piece set table 310 when the terminal apparatus 10 receives a request for displaying the information clipped.

Figure 20:
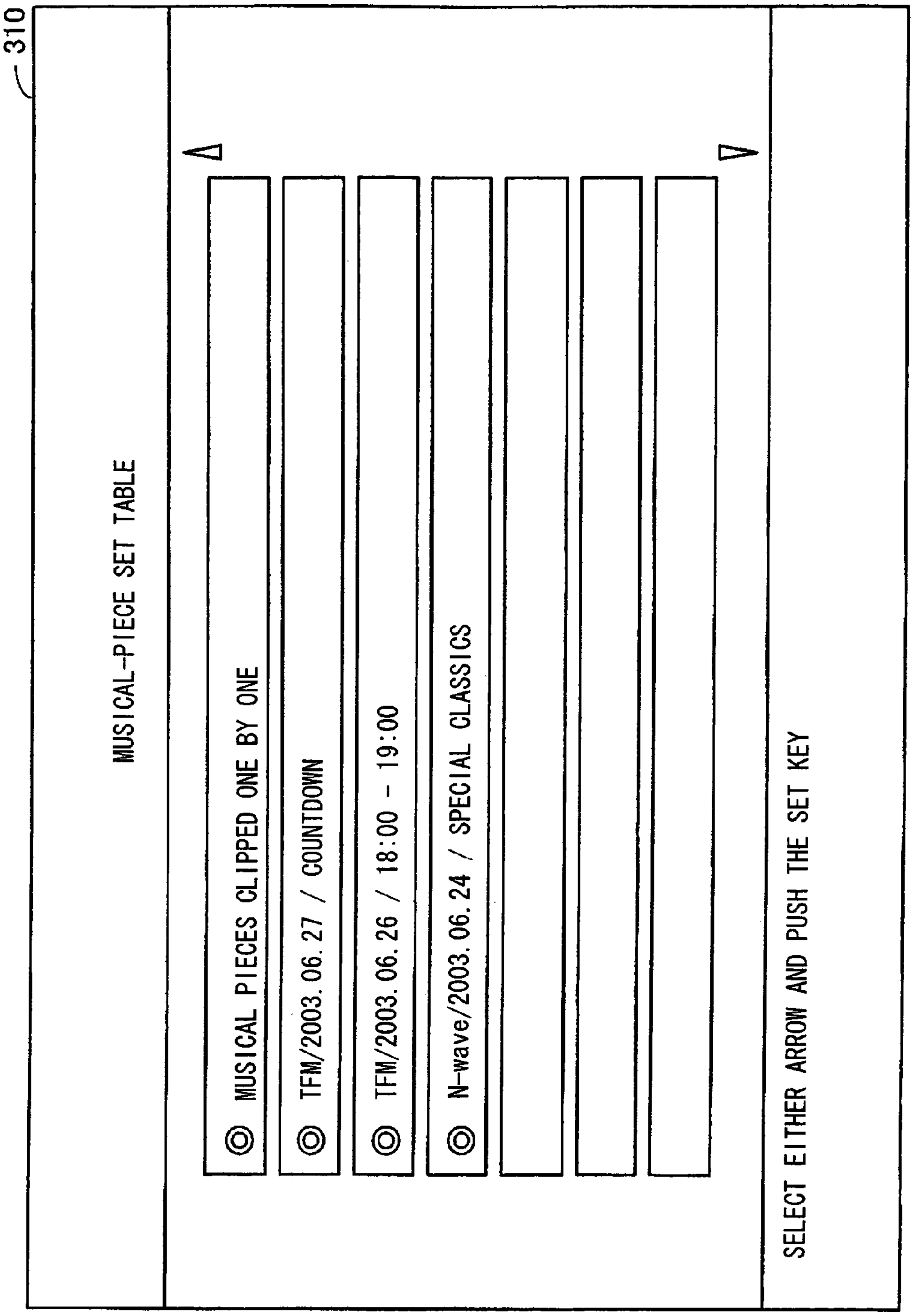
FIG. 20 is a diagram showing the musical-piece set table.

FIG. 20 is a diagram showing a musical-piece set table 310. The musical-piece set table 310 shows a set of musical pieces that have been clipped one by one and also a list of the musical pieces that have been clipped as a set. The name of the list of musical-piece clipped as a set is the attribute common to the musical pieces of the set. For example, the terminal apparatus 10 describes, in the list, the name of the broadcast station, the date of broadcasting, and the name of the program and the like of each musical piece clipped. The terminal apparatus 10 may clip the information acquired by date retrieval. In this case, the terminal apparatus 10 describes, in the list, the name of the broadcast station, the date/time of broadcasting (time bracket) and the like of each musical piece clipped.

When the user selects one of the musical-piece sets in the musical-piece set table 310, the terminal apparatus 10 makes the display device 17 displays the list of the musical pieces of the set selected.

Figure 21:
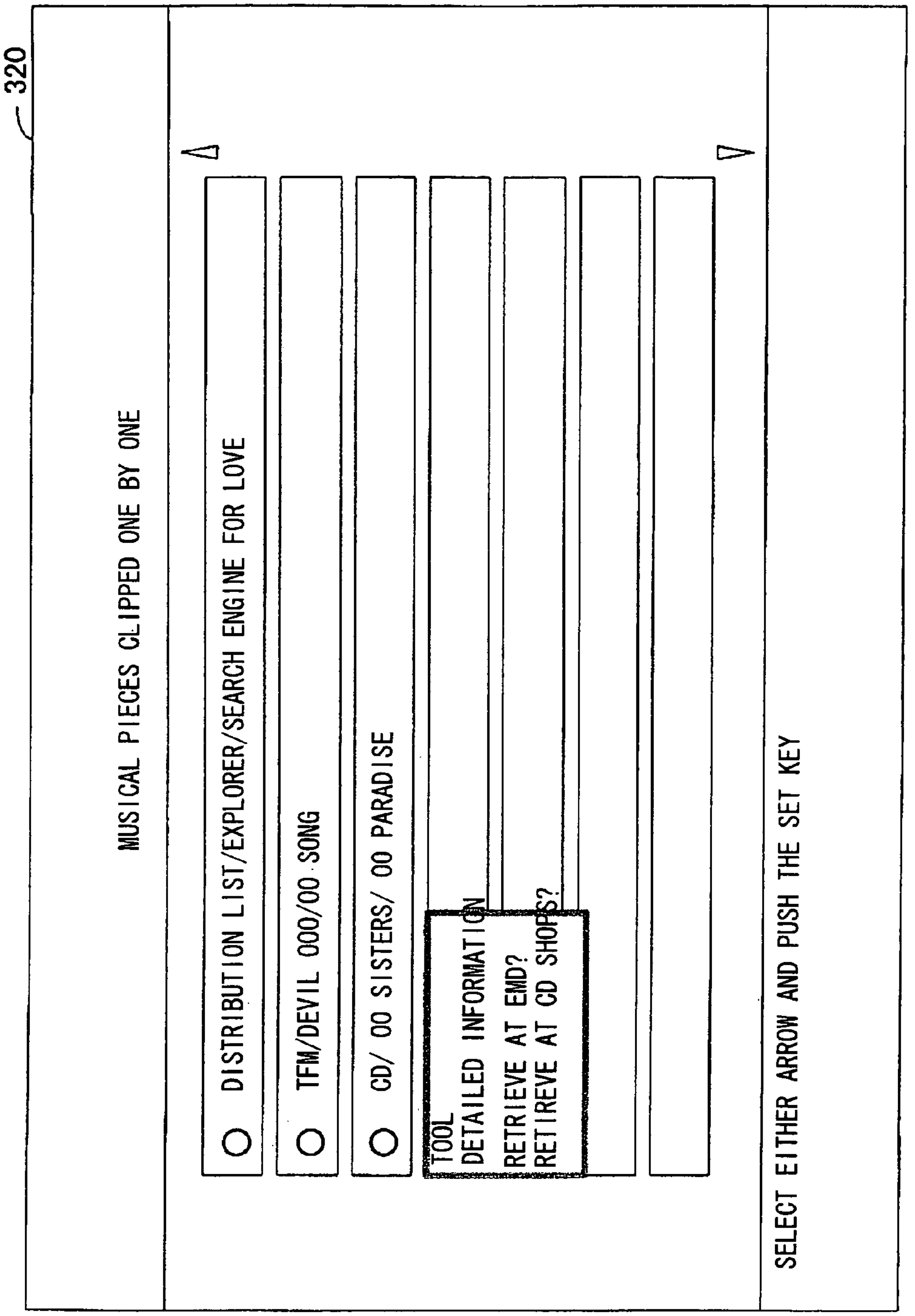
FIG. 21 is a diagram depicting a music-list displaying menu.

FIG. 21 is a diagram depicting a music-list displaying menu 320. The music-list displaying menu 320 shows the list of data items of the related information clipped. The terminal apparatus 10 extracts, for example, the source name, artist's name, title and the like from the related information, and displays the list of these data items.

When a musical piece is selected in the music-list displaying menu 320, the terminal apparatus 10, which has received the clipping command input by the user, displays at least a part of the related information that should be clipped.

A sequence of instructing a retrieval process or the like on the basis of the related information clipped will be explained.

First, the terminal apparatus 10 makes the display device 17 displays the related information clipped in the clipped-information storage device 21a, in response to the operation input made by the user.

Figure 22:
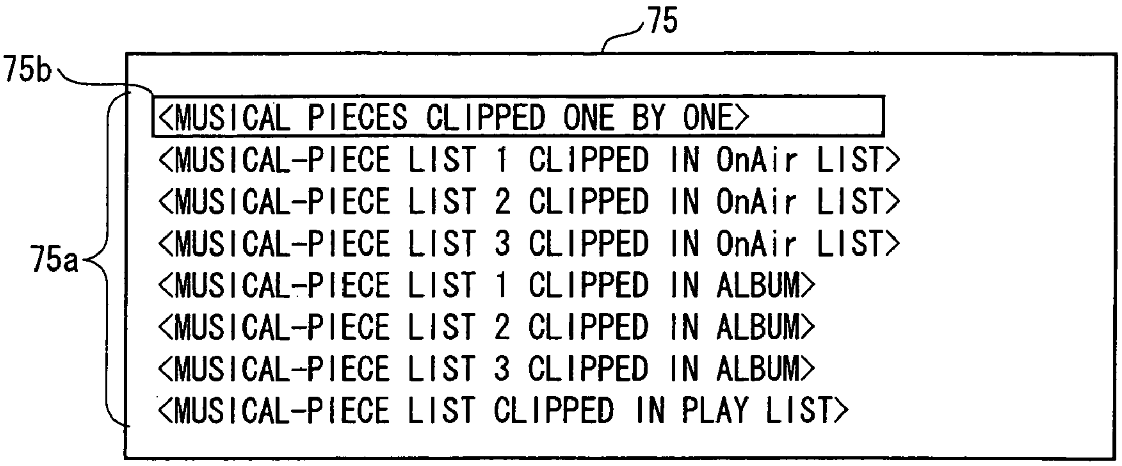
FIG. 22 is a diagram showing a music-set-table displaying menu.

FIG. 22 is a diagram showing a music-set-table displaying menu. When the user instructs that the related information be displayed, the terminal apparatus 10 displays a music-set-table displaying menu 75a in the screen 75. The music-set-table displaying menu 75a is identical, in format, to the related information saved, which is shown in FIG. 14. The user selects the list of musical pieces clipped one by one, if he or she wants to review the musical pieces thus clipped. For example, the user operates the direction keys 41a and 41b, i.e., up-key and down-key, provided on the remote controller 40, moving the cursor 75b to "Musical pieces clipped one by one." The user then pushes the set key 42. The menu is thereby switched to a music-list displaying menu showing musical pieces clipped one by one.

Figure 23:
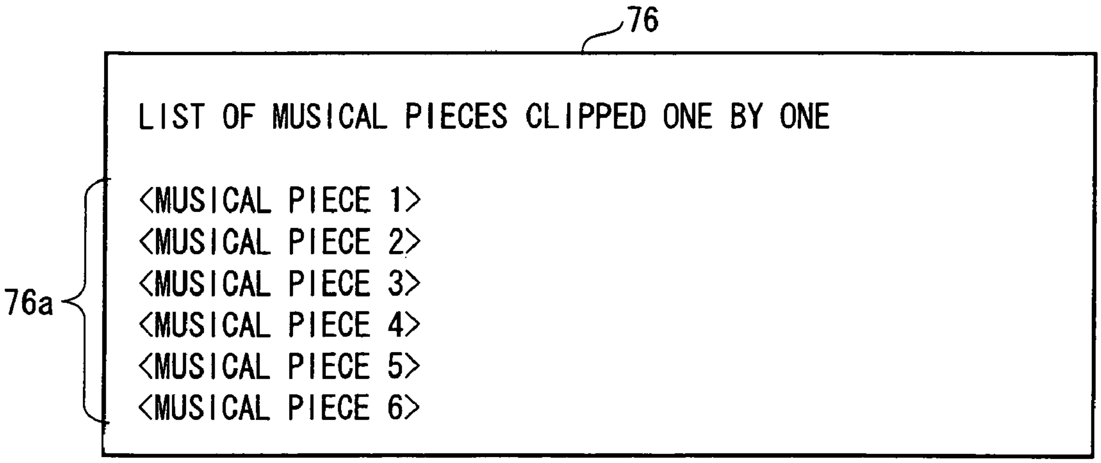
FIG. 23 is a diagram showing a music-list displaying menu that displays a list of musical pieces clipped one by one.

FIG. 23 is a diagram showing a music-list displaying menu 76 that displays a list of musical pieces clipped one by one. The menu 76 shows a list 76a of musical pieces clipped one by one. The user may select any desired one of the musical pieces from the music list 76a. Then, he or she can refer to the information related to the musical piece selected.

The user may designate a musical piece or a set of musical pieces, either displayed in the menu 76. The user can then instruct that the information or product related to the musical piece or the set of musical pieces be retrieved or purchased.

Figure 24:
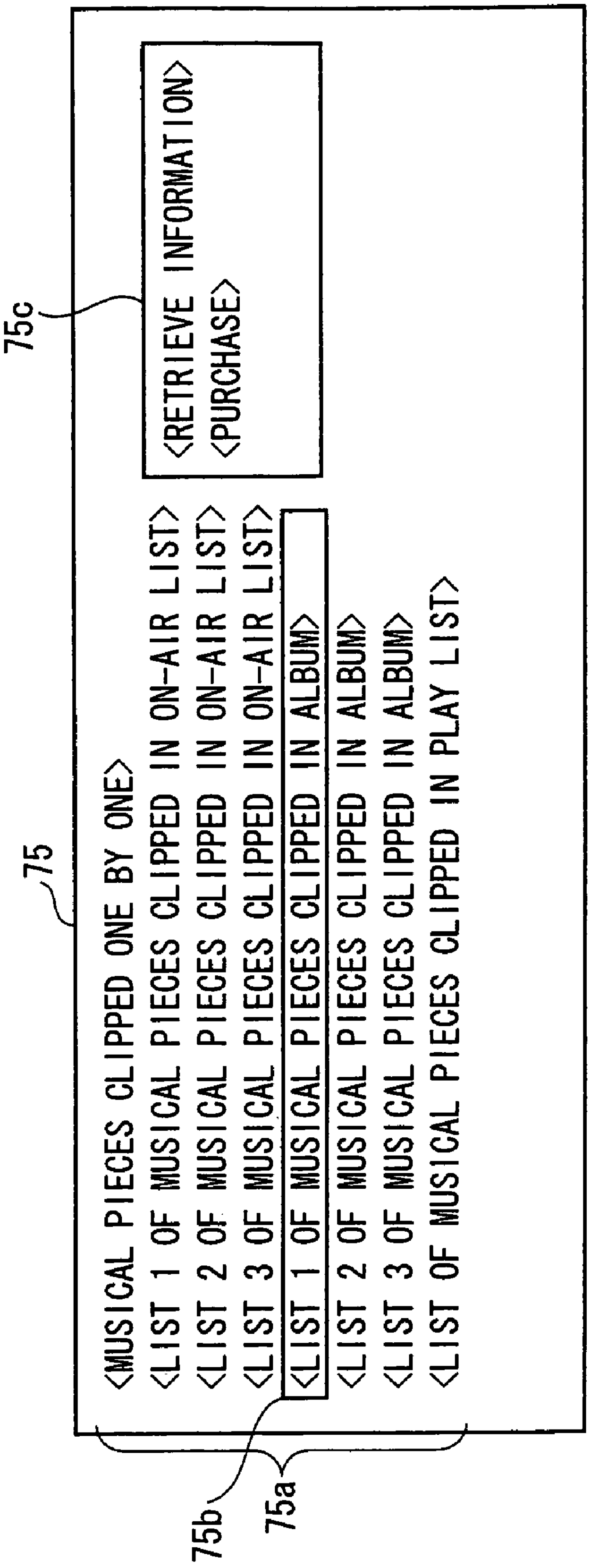
FIG. 24 is a diagram showing a menu and explaining how to retrieve information or how to make a purchase order, by using the table of musical-piece sets.

FIG. 24 is a diagram showing a menu and explaining how to retrieve information about a musical piece or make a purchase order for the musical piece, by using the table of musical-piece sets. While the music-set-table displaying menu 75*a* is being displayed in the screen 75, the user may select the list of musical pieces including the musical piece he or she wants to retrieve or buy. More specifically, the user operates the direction keys 41*a* and 41*b*, i.e., up-key and down-key, provided on the remote controller 40, moving the cursor 75*b* to the desired list of musical pieces. The user pushes the tool key 44. Then, the terminal apparatus 10 displays a tool menu 75*c*.

The tool menu 75*c* shows two commands, i.e., "Retrieve the information" and "Purchase the product." The user operates the direction keys 41*a* to 41*d* provided on the remote controller 40, moving the cursor 75*b* to the desired command. The user then pushes the set key 42. As a result, the terminal apparatus 10 performs the process that accords the command that the cursor 75*b* points.

If the command "Retrieve the information" is selected, the terminal apparatus 10 transmits a retrieve request using, for example, the album name as retrieval key to the server. If the process that accords the command "Purchase the product" is executed after a list of musical pieces of a specific album is selected, the terminal apparatus 10 transmits a purchase request for the album to the server such as a CD chop.

Thus, the musical piece that should be retrieved or purchased is selected and the retrieval or purchase of the musical piece is selected. Then, the terminal apparatus 10 sends the related information to the server from which the musical piece can be purchased. The terminal apparatus 10 can then retrieve or buy the musical piece. The destination of the retrieval request may be any server that has a musical-piece database and a retrieval means. The destination of the purchase request may be any server that can sell musical pieces.

In the case described above, the information related to a musical piece is clipped and the musical piece is retrieved in accordance with the related information clipped. Instead, a musical piece can be retrieved in accordance with the information related to the musical piece, which has yet to be clipped. It will be described how a musical piece or a set of musical pieces is clipped and, at the same time, the information related to the musical piece is retrieved or the product related to the musical piece is purchased.

Figure 25:
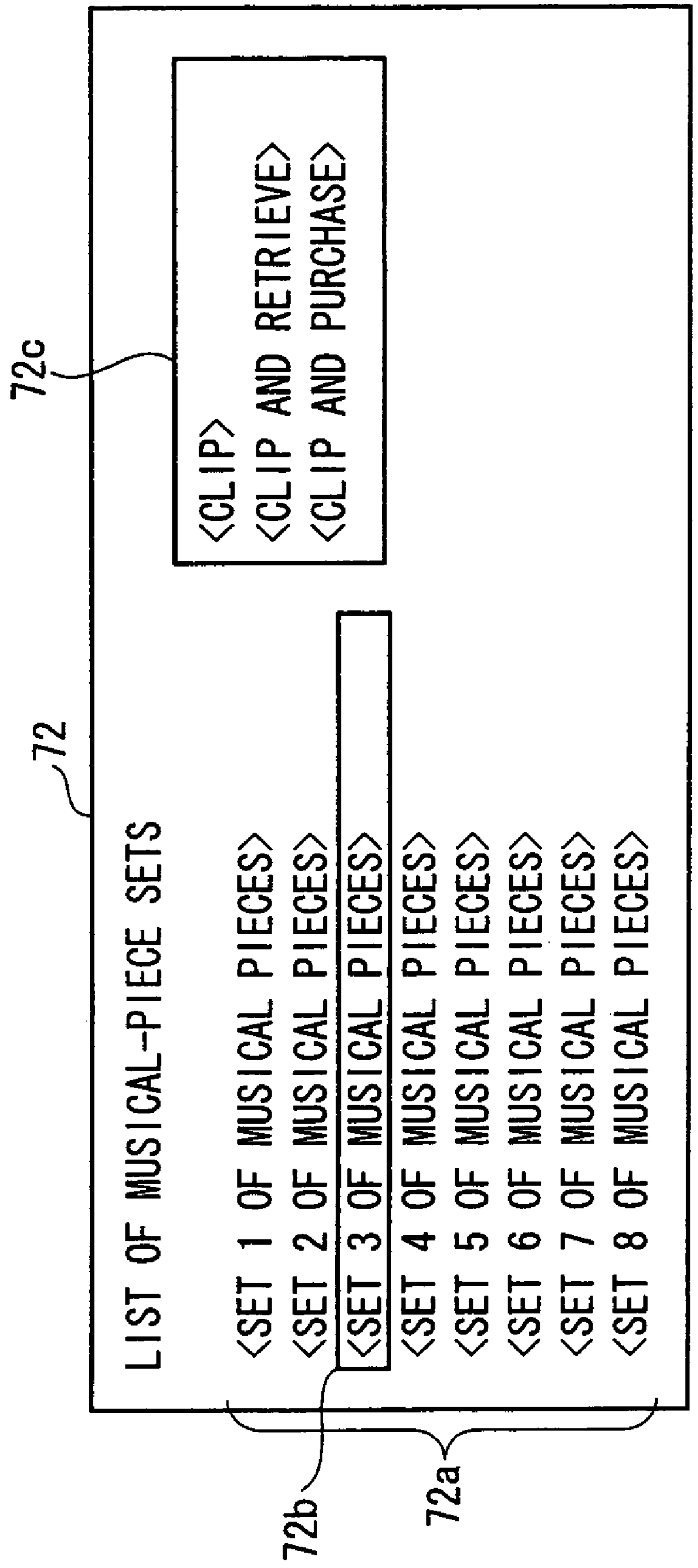
FIG. 25 is a diagram depicting a menu and explaining how to retrieve information or how to make a purchase order, while clipping information, by using the table of musical-piece sets.

FIG. 25 is a diagram depicting a menu and explaining how to retrieve information or how to make a purchase order, while clipping information, by using the table of musical-piece sets. After the music list 72*a* acquired from the server is displayed in the screen 72, the user may operate the direction keys 41*a* and 41*b*, i.e., up-key and down-key, provided on the remote controller 40, moving the cursor 72*b* to the list of musical pieces to be clipped. The user pushes the tool key 44 of the remote controller 40. Then, the terminal apparatus 10 displays a tool menu 72*c*. The tool menu 72*c* shows commands, i.e., "Clip," "Clip and retrieve", and "Clip and purchase". The user operates the direction keys 41*a* to 41*d* provided on the remote controller 40, moving the cursor 72*b* to the desired command. When the user pushes the set key 42, the terminal apparatus 10 performs the process corresponding to the command pointed by the cursor 72*b*.

The terminal apparatus 10 may perform the process that corresponds to the command "Clip." In this case, the terminal apparatus 10 clips all musical pieces included in the list designated. If the terminal apparatus 10 performs the process corresponding to command "Clip and retrieve," it clips all musical pieces included in the list designated, and also transmits to the server a retrieve request in which the information related to the list is used as retrieve key. If the terminal apparatus 10 performs the process corresponding to command "Clip and purchase", it clips all musical pieces included in the list designated, and transmits a purchase order for the musical-piece list (e.g. an album) to a server such as a CD shop.

Thus, the user can select a plurality processes in, for example, a pop-up menu shown in the screen, by performing a single operation (i.e., one click) after he or she selects a musical piece to be clipped or a set of musical pieces to be clipped. To retrieve and clip a musical piece or pieces, the terminal apparatus 10 first clips the musical piece or pieces and then retrieves the musical piece or pieces on the basis of the information related to the musical piece or pieces. To purchase and clip a musical piece or pieces, the terminal apparatus 10 first clips the musical piece or pieces and then purchases the musical piece or pieces on the basis of the information related to the musical piece or pieces.

The retrieval process will be described in detail.

There are two types of retrieval processes to perform. The first type is the retrieval of musical pieces recorded in CDs. The second type is the retrieval of musical pieces broadcast at FM broadcast stations.

Figure 26:
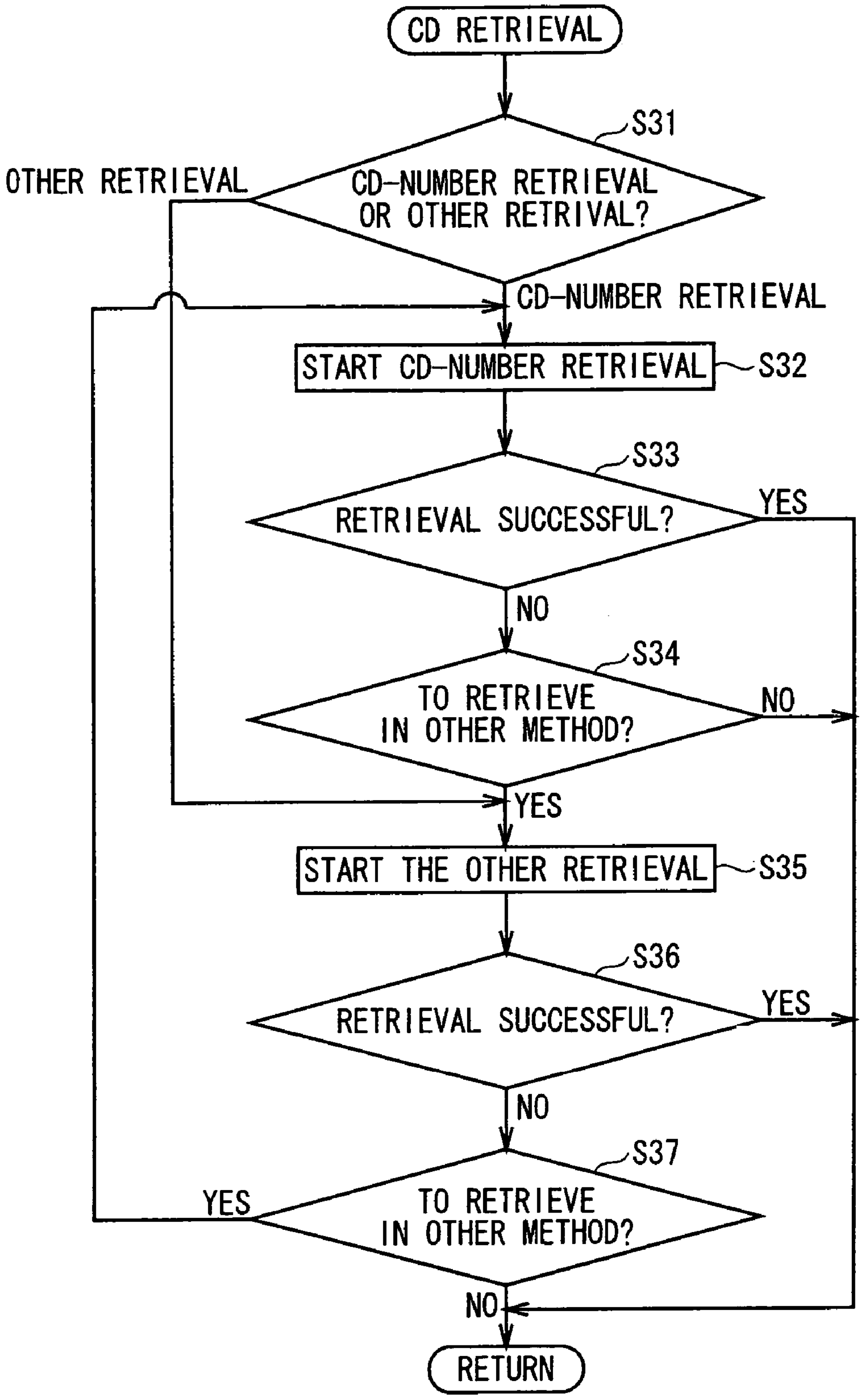
FIG. 26 is a flowchart explaining a CD-retrieving process.

FIG. 26 is a flowchart explaining a CD-retrieving process. The steps shown in FIG. 26 will be described along the step numbers.

[Step S31].

On receiving a designation of a retrieval method from the user, the terminal apparatus 10 determines whether the method designated is CD-number retrieval or any other retrieval method. If the method designated is CD-number retrieval, the terminal apparatus 10 goes to Step S32. If the method designated is a method other than the CD-number retrieval, the terminal apparatus 10 goes to Step S35.

[Step S32]

When a CD-number retrieval is designated, the terminal apparatus 10 carries out the CD-number retrieval. To be more specific, the terminal apparatus 10 transmits a retrieval request to the server. This request contains a CD number as retrieval key.

[Step S33]

The terminal apparatus 10 determines whether the CD number has been successfully retrieved. As the result of the retrieval, the server may send the information about the CD (i.e., album title or information related to the musical pieces recorded in the CD). In this case, the terminal apparatus 10 determines that the CD number has been retrieved. Now that the CD number has been successfully retrieved, the apparatus 10 terminates the retrieval process. If the CD number has not been retrieved, the process goes to Step S34.

[Step S34]

If the CD number has not been retrieved, the terminal apparatus 10 makes the user determine whether the CD number should be retrieved in any other method. More precisely, the terminal apparatus 10 displays a message, prompting the user to decide whether the CD number should be retrieved in any other method. The apparatus 10 then receives an operation input from the user. If the user designates a method other than the CD-number retrieval, the process goes to Step S35. If the user does not designate the other method, the terminal apparatus 10 terminates the process.

[Step S35]

The terminal apparatus 10 automatically performs the other retrieval method if the user designates the other method.

[Step S36]

The terminal apparatus 10 determines whether the CD number has been successfully retrieved in the other method. As the result of this retrieval, the server may send the information about the musical piece (i.e., the title of the album that includes the musical piece). In this case, the apparatus 10 determines that the retrieval is successful. Now that the retrieval is successful, the terminal apparatus 10 terminates the retrieval process. If the retrieval is unsuccessful, the process goes to Step S37.

[Step S37]

If the retrieval is unsuccessful, the terminal apparatus 10 makes the user decide whether he or she should try to retrieve the CD number by still another method. To be more specific, the terminal apparatus 10 displays a message, prompting the user to decide whether the CD number should be retrieved in another method. The apparatus 10 then receives an operation input from the user. If the user designates another retrieval method, the process goes to Step S32. If the user does not designate the other retrieval method, the terminal apparatus 10 terminates the process.

The terminal apparatus 10 would not perform the retrieval twice by the same method. Performing the CD retrieval this way, the terminal apparatus 10 can provide a retrieval method that is suitable for the user.

It will be explained how a musical piece is retrieved from a content broadcast at an FM station.

Figure 27:
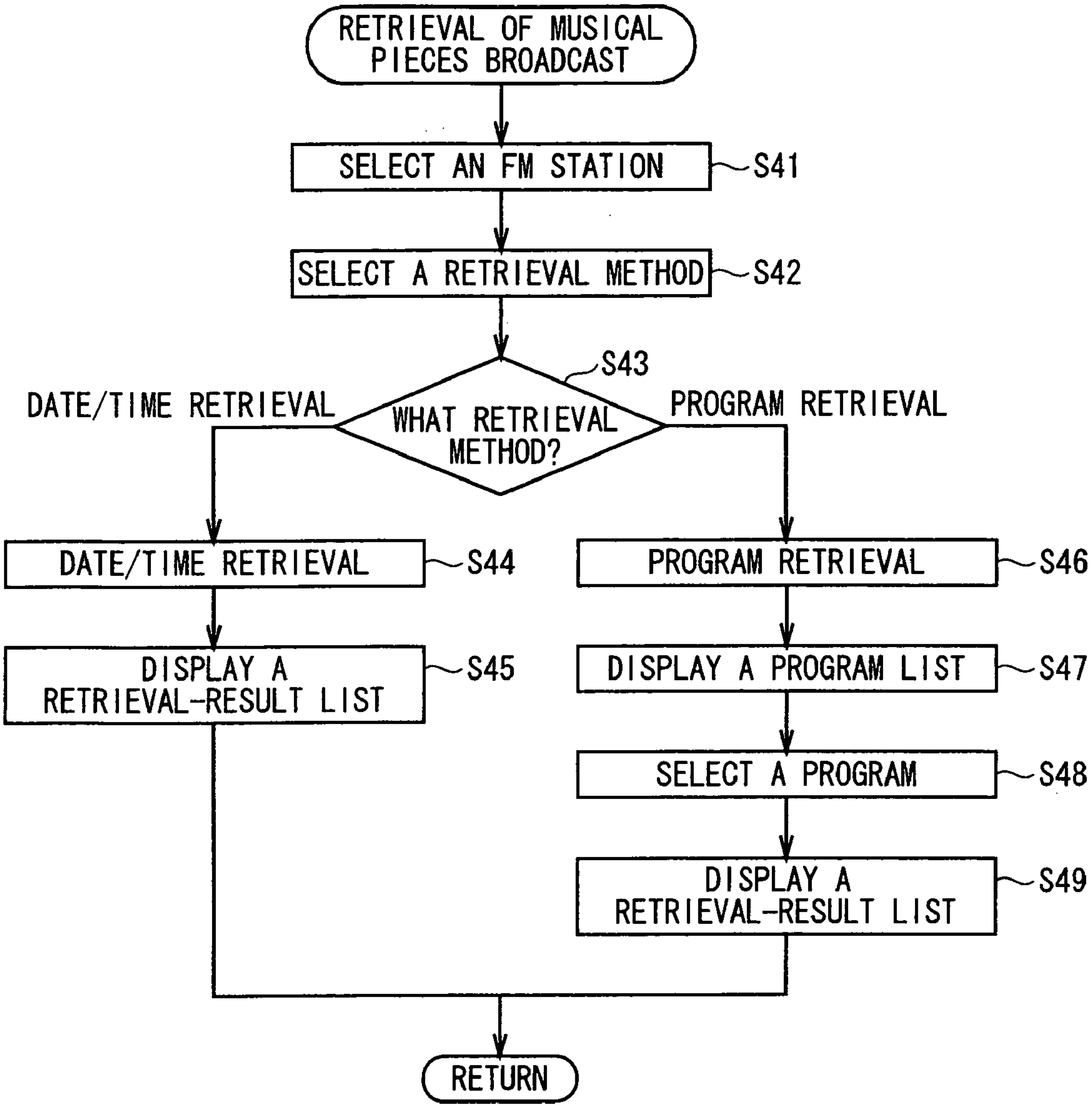
FIG. 27 is a flowchart showing the sequence of retrieving a musical piece from a content broadcast at a FM station.

FIG. 27 is a flowchart showing the sequence of retrieving a musical piece from a content broadcast at an FM station. The steps shown in FIG. 27 will be described.

[Step S41]

The terminal apparatus 10 receives a signal input by the user and designating an FM station.

[Step S42]

The terminal apparatus 10 receives a signal input by the user and designating a retrieval method.

[Step S43]

The terminal apparatus 10 determines which retrieval method the user has designated. If the method designated is date/time retrieval, the terminal apparatus 10 goes to Step S44. If the method designated is program retrieval, the terminal apparatus 10 goes to Step S46.

[Step S44]

If the date/time retrieval is designated, the terminal apparatus 10 carries out the date/time retrieval. More precisely, the terminal apparatus 10 receives an input signal that designates the period during which to retrieve the object. The terminal apparatus 10 can designate a predetermined period (e.g., 1 hour) from the time when the signal is input. The terminal apparatus 10 transmits a retrieval request to the server of the FM station. The retrieval request has a retrieval key that contains the information representing the period.

[Step S45]

When the terminal apparatus 10 receives the results of the retrieval performed in response to the retrieval request, it causes the display device 17 to display the list of retrieval results. Then, the apparatus 10 terminates the process.

[Step S46]

When the program retrieval is designated, the terminal apparatus 10 performs this retrieval. To be more specific, the terminal apparatus 10 receives the user's operation input that designates a program. Then, the terminal apparatus 10 transmits a retrieval request to the server of the FM station. The retrieval request contains the information identifying the program.

[Step S47]

On receiving the results of the retrieval performed in response to the retrieval request, the terminal apparatus 10 makes the display device 17 display the program list that has been retrieved.

[Step S48]

The terminal apparatus 10 receives an operation input that designates any program selected from the program list.

[Step S49]

The terminal apparatus 10 displays the list of the musical pieces broadcast in the program selected. The apparatus 10 then terminates the process.

Thus, the terminal apparatus 10 can acquire the information related to the musical pieces the FM station has broadcast. How the terminal apparatus 10 switches menu during the retrieval of the musical pieces broadcast will be explained, with reference to FIGS. 28 to 34.

Figure 28:
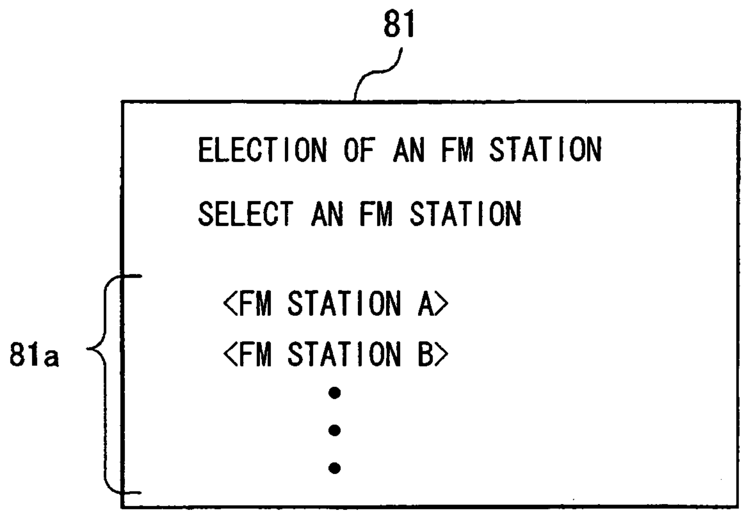
FIG. 28 is a diagram depicting an FM-station selection menu.

FIG. 28 is a diagram depicting an FM-station selection menu 81. The FM-station selection menu 81 shows an FM-station list 81*a*. The user can select any desired FM station from the FM-station list 81*a*. When the user selects an FM station, the terminal apparatus 10 makes the display device 17 switches the menu 81 to a retrieval-method selection menu.

Figure 29:
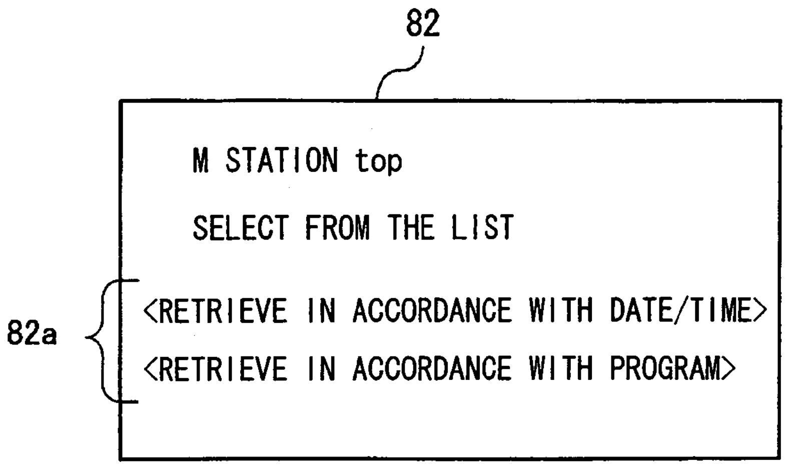
FIG. 29 is a diagram illustrating a retrieve-method selection menu.

FIG. 29 is a diagram illustrating the retrieve-method selection menu 82. The retrieve-method selection menu 82 shows a retrieve-method list 82*a*. In the example of FIG. 29, "Retrieve in accordance with the date/time," and "Retrieve in accordance with the program" are displayed. The user can select either retrieve method in the retrieve-method list 82*a*. When the user selects one of these methods, the terminal apparatus 10 makes the display device 17 switches the menu 82 to the retrieval menu for the method selected. More specifically, the terminal apparatus 10 causes the display device 17 to switch the menu to the date/time retrieval menu if the user selects "Retrieve in accordance with the date/time." If the user selects "Retrieve in accordance with the program," the terminal apparatus 10 causes the display device 17 to switch the menu to the program selection menu.

Figure 30:
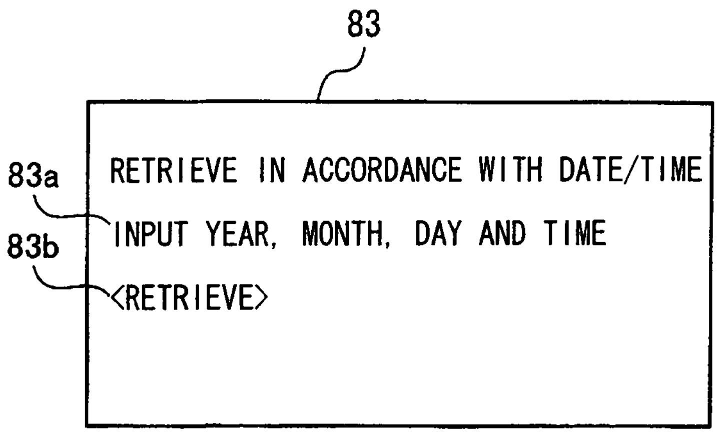
FIG. 30 is a diagram showing a date/time-retrieval menu.

FIG. 30 is a diagram showing a date/time retrieval menu 83. The date/time retrieval menu 83 shows a date/time-inputting part 83*a* and a retrieval-designating part 83*b*. The user selects the date/time-inputting part 83*a* and then inputs the date and time at which the desired musical piece was broadcast. Thereafter, the user may select the retrieval-designating part 83*b*. Then, the terminal apparatus 10 outputs a retrieval request to the server. On receiving the results of retrieval from the server, the terminal apparatus 10 makes the display device 17 switch the menu to a date/time-retrieval result menu.

Figure 31:
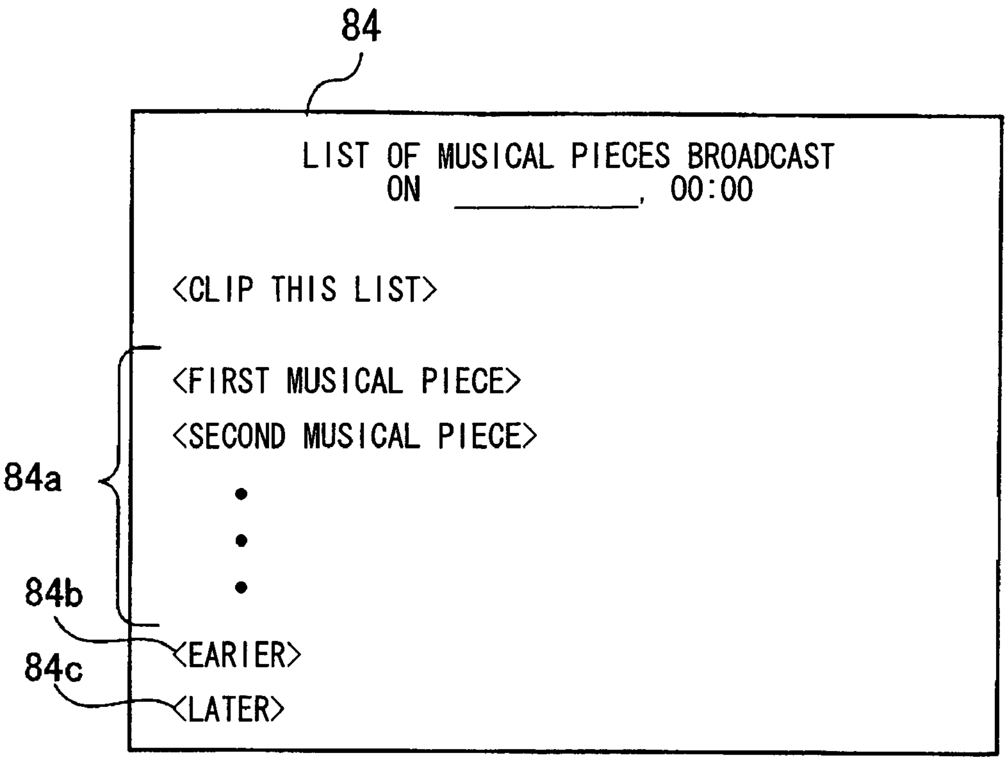
FIG. 31 is a diagram depicting a date/time-retrieval result menu.

FIG. 31 is a diagram depicting the date/time-retrieval result menu 84. The date/time-retrieval result menu 84 shows a related-information list 84*a* that has been acquired through the date/time retrieval. The data/time retrieval result menu 84 shows a retrieval-time changing part 84*b*, i.e., "<Earlier>," and another retrieval-time changing part 84*c*, i.e., "<Later>." When the retrieval-time changing part 84*b* is selected, the terminal apparatus 10 changes the retrieval time to one earlier than the retrieval time input. Then, the terminal apparatus 10 transmits the retrieval request again to the server. When the retrieval-time changing part 84*c* is selected, the apparatus 10 changes the retrieval time to one later than the retrieval time input. Then, the terminal apparatus 10 transmits the retrieval request again to the server.

Figure 32:
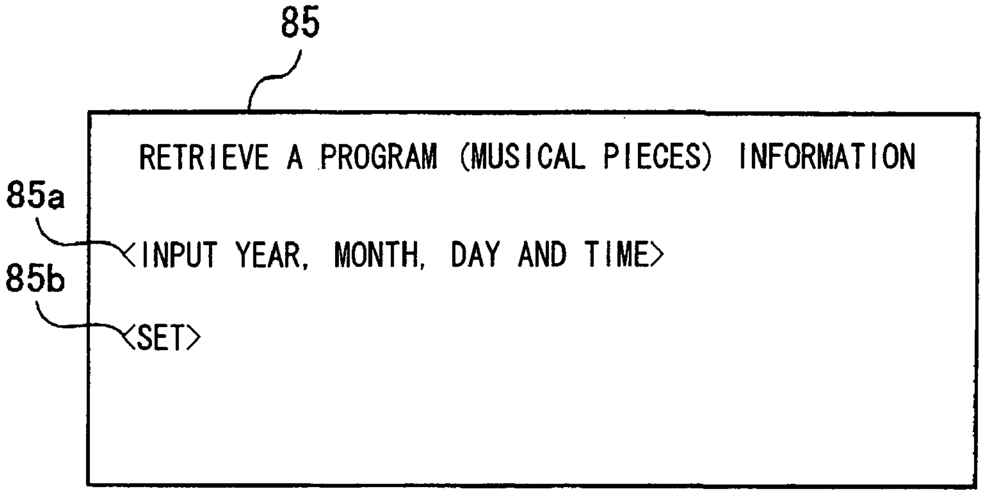
FIG. 32 is a diagram showing a program-retrieval menu.

FIG. 32 is a diagram showing a program-retrieval menu 85. The program-retrieval menu 85 shows a date/time-inputting part 85*a* and a date/time-setting part 85*b*. The user selects the date/time-inputting part 85*a* and inputs the date and time at which a desired program was broadcast. Thereafter, the user may select the date/time-setting part 85*b*. In this case, the terminal apparatus 10 outputs a program-list request to the server. On receiving the program list from the server, the terminal apparatus 10 makes the display device 17 switch the menu to a program list menu.

Figure 33:
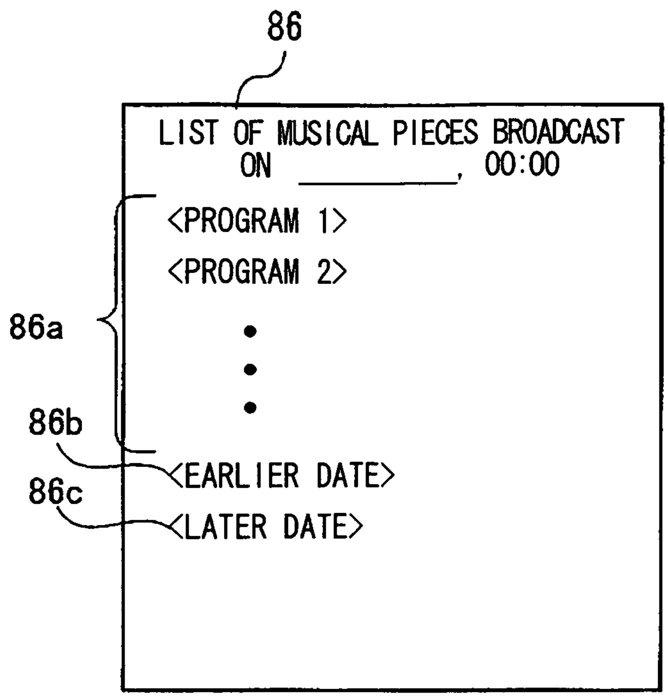
FIG. 33 is a diagram showing a program list menu.

FIG. 33 is a diagram depicting a program list menu 86. The program list menu 86 shows the program list 86*a* that has been acquired. The program list menu 86 shows two retrieval-time changing parts 86*b* and 86*c*, i.e., "Earlier date" and "Later date," too. When the retrieval-time changing parts 86*b* is selected, the terminal apparatus 10 shifts the broadcast date to the date one day earlier, while maintaining the time for the object to be retrieved. When the retrieval-time changing parts 86*c* is selected, the terminal apparatus 10 shifts the broadcast date to the date one day later, while maintaining the time for the object to be retrieved. Then, the terminal apparatus 10 transmits the retrieval request again to the server.

The user can select any desired program from the program list 86*a*. When the user selects a program, the terminal apparatus 10 makes the display device 17 switch the menu to a program-retrieval result menu.

Figure 34:
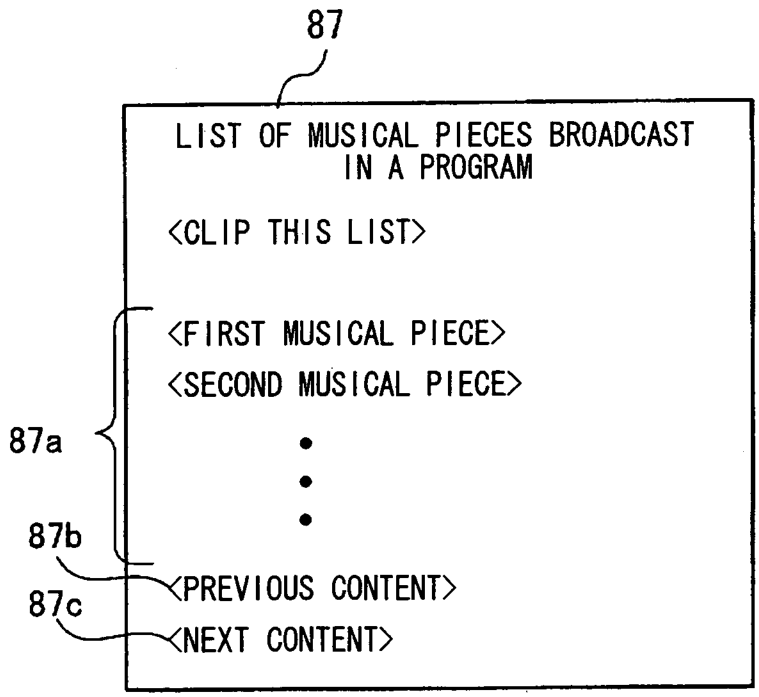
FIG. 34 is a diagram depicting the menu displayed when a program is retrieved.

FIG. 34 is a diagram depicting a retrieval-result menu 87. The retrieval-result menu 87 shows a related-information list 87*a* acquired through the retrieval. The retrieval-result menu 87 shows two broadcast-changing parts 87*b* and 87*c*, i.e., "Previous content" and "Next content," too. If the broadcast-changing part 87*b* is selected, the terminal apparatus 10 transmits a re-retrieval request to the server, so that the content of the program, broadcast previously, may be retrieved. If the broadcast-changing part 87*c* is selected, the terminal apparatus 10 transmits a re-retrieval request to the server, so that the content of the program, to be broadcast next, may be retrieved.

As has been described, the present embodiment enables the user to clip the information related to any desired musical piece that he or she finds while listening to various musical pieces, broadcast by radio, broadcast by TV, played back from a CD, downloaded, or played back for promotion, by the same method. That is, the terminal apparatus 10 can clip the information related to the musical pieces of all sources, by using the same means. For example, the terminal apparatus 10 can clip the information related to almost all sources, by performing the same operation. More precisely, the terminal apparatus 10 can clip not only the information (Now On Air) about the musical pieces now being FM-broadcast, but also the CD database, the information about musical pieces recorded in CD, TEXT and MD, the data added to the content of any distributed musical piece purchased. Further, the terminal apparatus 10 can display a table of related information clipped, to the user. Thus, the user can retrieve the detailed information about any desired musical piece and purchase the desired musical piece.

Moreover, the terminal apparatus 10 can clip individual musical pieces and any set of musical pieces. Hence, the apparatus 10 enables the user to clip an FM program or a CD album that includes many musical pieces interesting to the user. In other words, the user can record the information related to an interesting set of musical pieces through a single clipping operation. In addition, the terminal apparatus 10 manages the acquired related information in a hierarchical format, can set any related information as an information layer lower than a set of musical pieces. The terminal apparatus 10 can therefore display a table of related information items at various hierarchical layers. To enable the user to clip a set of musical pieces, the terminal apparatus 10 displays the list of musical-piece sets so that the user may select any desired set. Note that the terminal apparatus 10 can show a table of related information clipped, whichever source the information has been clipped from.

The terminal apparatus 10 can retrieve the related information directly, without clipping the information, in the same manner as it clips the information. The terminal apparatus 10 may have a clipping means, enabling the user to retrieve the related information directly, if necessary. The user can therefore immediately search for any musical pieces that interest him or her, by performing less actions than otherwise.

The functions the terminal apparatus 10 performs are described in an information-recording program. When a computer executes the information-recording program, the process functions described above are implemented. The information-recording program that describes the process functions is recorded in a computer-readable medium. The computer-readable recording medium may be a magnetic recording apparatus, an optical disc, a magneto-optical recording medium, a semiconductor memory, and the like. The magnetic recording apparatus may be a hard disk drive (HDD), a flexible disc (FD), magnetic tape, and the like. The optical disc may be a DVD (Digital Versatile Disc), a DVD-RAM, a CD-ROM (Read-only Memory), a CD-R (Recordable)/RW (Rewritable), and the like. The magneto-optical recording medium may be an MO (Magneto-Optical disc).

To distribute the information-recording program, portable recording media in which the information-recording program is recorded, such as DVDs and CD-ROMS, are sold. The information-recording program may be stored in the storage device of the server computer. If this is the case, the information-recording program can be transferred from the server computer to any other computers via the network.

The computer that needs to execute the information-recording program has the information-recording program stored in its storage device, the program having been read from the portable recording medium or transferred from the server computer. The computer reads the information-recording program from the storage device and performs processes in accordance with the information-recording program. The computer may read the information-recording program directly from the portable recording medium and then perform processes in accordance with the program thus read. Further, the computer may execute a process every time it receives an information-recording program transferred from the server computer.

(3) Second Embodiment

The second embodiment of this invention will be described in detail. The second embodiment is a service-providing system, in which one of the service servers can perform a service of providing the information (e.g., now-on-air) related to the musical piece being broadcast (see FIG. 7), a service of retrieving a CD to be purchased (see FIG. 26), and a service of providing an on-air list or a program list (see FIG. 27). This system has a single-sign-on function.

(3-1) Configuration of the Music-Related Service Providing System

Figure 35:
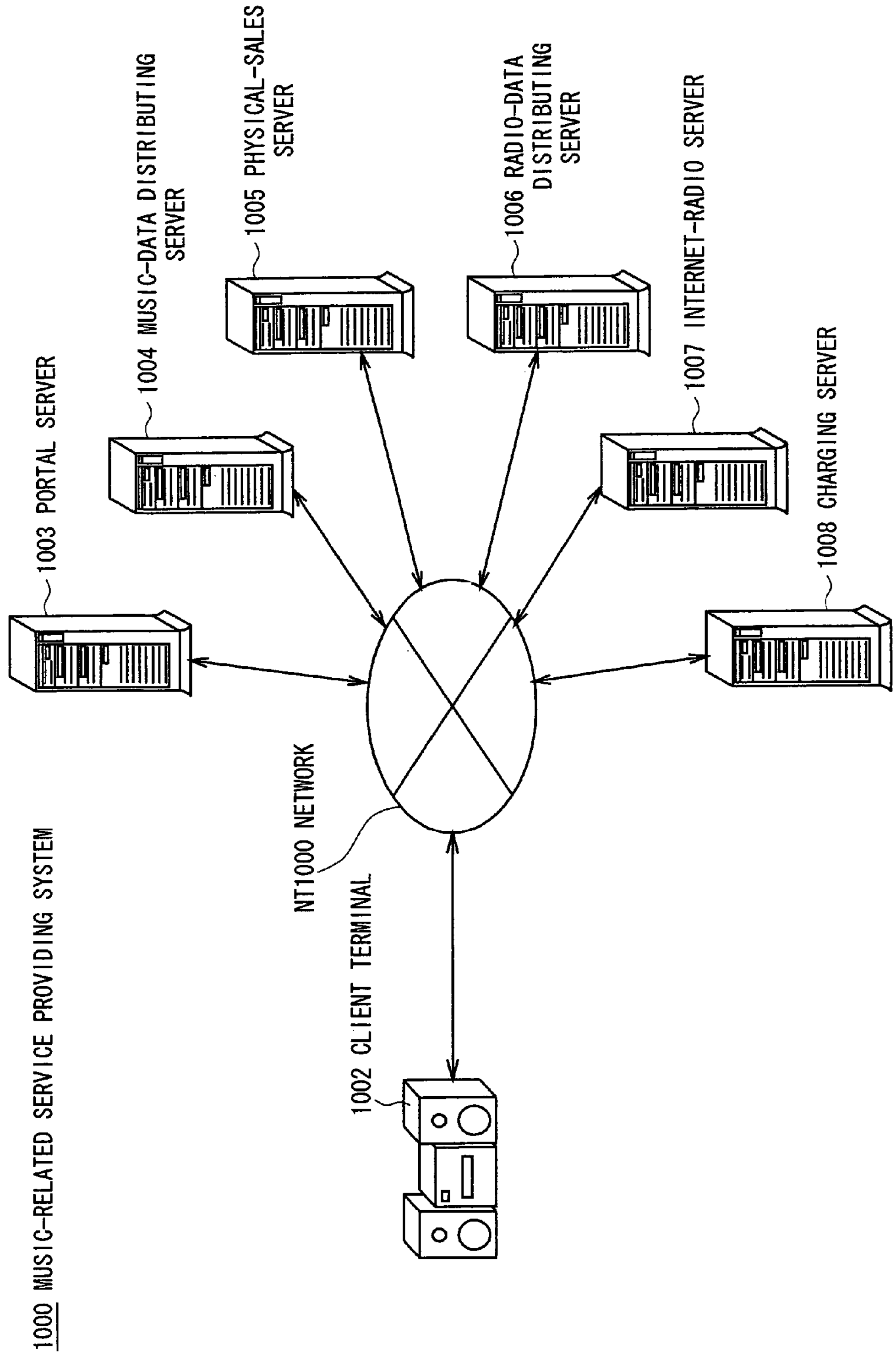
FIG. 35 is a diagram showing a music-related service providing system, according to a second embodiment of this invention.

FIG. 35 shows a music-related service providing system 1000. As FIG. 35 depicts, the system 1000 comprises a client terminal 1002, a portal server 1003, and a plurality of servers 1004 to 1008. The client terminal 1002 is property of a user who has entered a contract with the provider that runs the music-related service providing system 1000. The portal server 1003 controls the client terminal 1002. The servers 1004 to 1008 can give the client terminal 1002 various types of service relating to music.

The music-data distributing server 1004 can distribute music data to the client terminal 1002. The music data is transmitted in, for example, ATRAC3 (Adaptive Transform Acoustic Coding 3) format, AAC (Advanced Audio Coding) format, WMA (Windows Media Audio) format, RealAUDIO G2 Music Codec format, or MP3 (MPEG Audio Layer-3) format.

The physical-sales server 1005 can sell CDs (Compact Discs), DVDs (Digital Versatile Discs), and the like to the user to fulfill the order the user has placed through the client terminal 1002.

The radio-data distributing server 1006 can distribute to the client terminal 1002 the radio programs, music and the like that any radio station broadcasts.

The server 1007 is an Internet-radio server. This server 1007 performs the Internet radio-broadcasting service of transmitting the radio-program data in the data-streaming mode to the client terminal 1002 via a network NT1000 that is equivalent to the Internet.

The server 1008 is a charging server that collects from the user the charge for the use of the system, in response to the request made by the portal server 1003 or the like.

(3-2) Function-Circuit Block Configuration of the Client Terminal 1002

Figure 36:
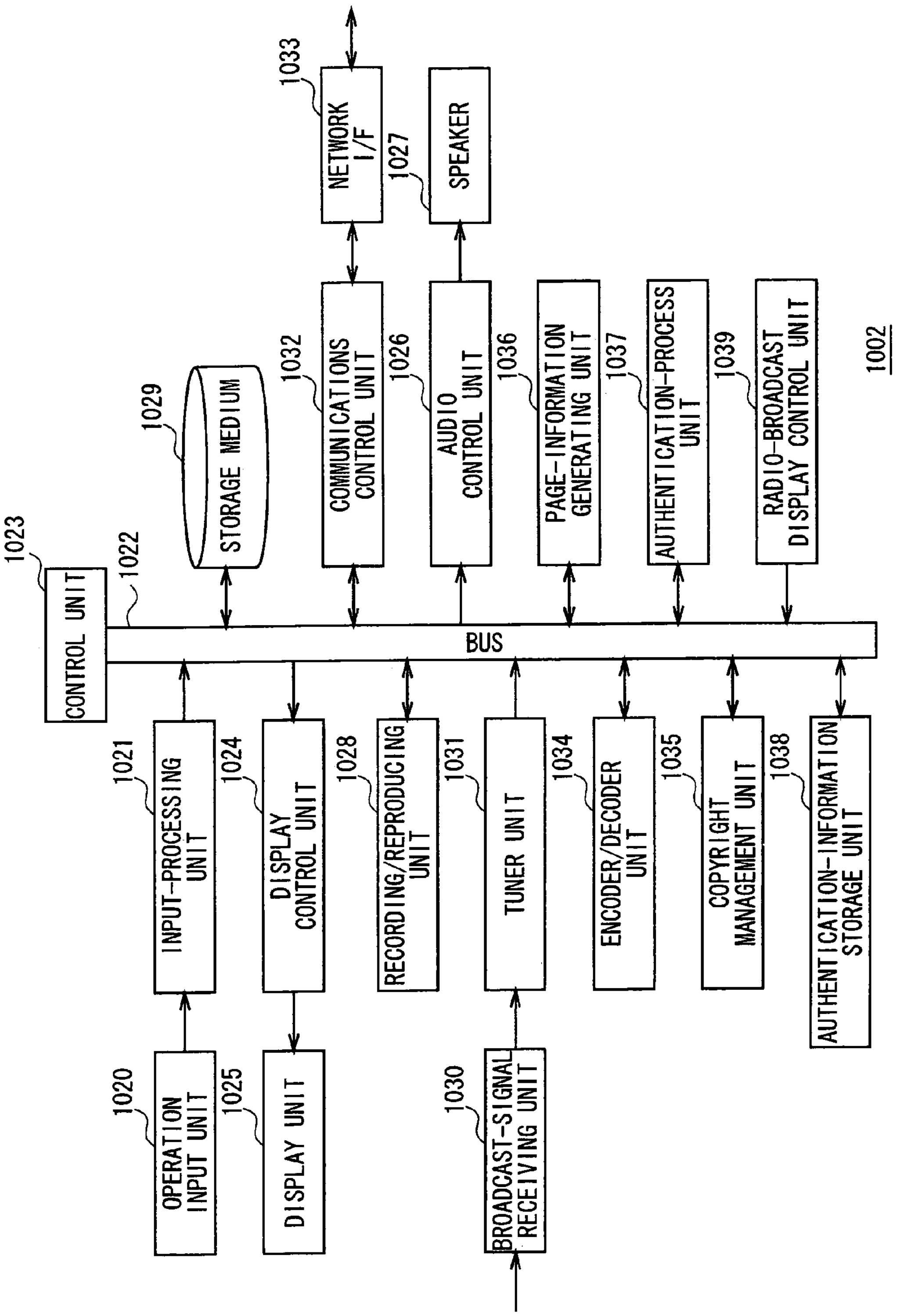
FIG. 36 is a block diagram of the hardware configuration of a client terminal, illustrating the function circuits of the terminal.

The hardware configuration of the client terminal 1002 will be described, with reference to the block diagram of FIG. 36. As FIG. 36 shows, the client terminal 1002 has an operation input unit 1020. The input unit 1020 has various operation buttons that are provided on the housing of the client terminal 1002 or on a remote controller (not shown). When the user depresses the buttons, the operation input unit 1020 detects the depression, generating operation-input signals. These signals are supplied to an input-processing unit 1021.

The input-processing unit 1021 converts the operation-input signals to operation commands. The operation commands are sent through a bus 1022 to a control unit 1023.

The control unit 1023 controls the circuits connected via the bus 1022 in accordance with the operation commands and the control signals supplied from the circuits.

The display control unit 1024 performs digital-to-analog conversion on the video data supplied to it through the bus 1022, thus generates an analog video signal. The analog video signal is supplied to the display unit 1025.

The display unit 1025 is, for example, a display device such as a liquid crystal display. It is attached directly on the surface of the housing or connected thereto.

When the display unit 1025 receives the processed result by the control unit 1023 and the various video data via the display control unit 1024 as analog video signals, the display unit 1025 displays images according to the analog video signals.

The audio control unit 1026 receives the audio data supplied via the bus 1022 and converts it to an analog audio signal, which is supplied to the speaker 1027. The speaker 1027 outputs sound based on the analog audio signal supplied from the audio control unit 1026.

The recording/reproducing unit 1028 is configured to reproduce content data from an external recording medium such as a CD, a memory stick (trademark), or the like and to record content data on the external recording medium. Note that a memory stick includes a flash memory and a case containing the flash memory.

The recording/reproducing unit 1028 may read video data, as content data, from the external recording medium. In this case, the video data is supplied via the bus 1022 to the display control unit 1024.

The display control unit 1024 converts the video data (i.e., content data) read by the recording/reproducing unit 1028 from the external recording medium, to an analog video signal. The analog video signal is supplied to the display unit 1025.

The recording/reproducing unit 1028 may read audio data, as content data, from the external recording medium. If this is the case, the audio data is supplied via the bus 1022 to the audio control unit 1026.

The audio control unit 1026 converts the audio data (i.e., content data) read by the recording/reproducing unit 1028 from the external recording medium, to an analog audio signal. The analog audio signal is supplied to the speaker 1027.

The control unit 1023 causes the recording/reproducing unit 1028 to supply the content data read from the external recording medium, to the storage medium 1029 incorporated in the client terminal 1002 through the bus 1022. The content data is thereby stored in the storage medium 1029. (Hereinafter, this process of storing content data in the storage medium 1029 will be referred to as "clipping.")

The control unit 1023 may read video data (image data), as content data, from the storage medium 1029. In this event, the video data is supplied to the display control unit 1024 via the bus 1022.

The control unit 1023 may read music data from the storage medium 1029 as content data. The music data is transferred to the audio control unit 1026 through the bus 1022.

Further, the control unit 1023 can read music data from the storage medium 1029 as content data and transfer this data to the recording/reproducing unit 1028. In this case, recording/reproducing unit 1028 can record the music data on the external recording medium.

The broadcast-signal receiving unit 1030 receives radio waves transmitted from radio stations. The radio waves are supplied from the unit 1030 to the tuner unit 1031.

Under the control of the control unit 1023, the tuner unit 1031 extracts a radio broadcast signal from the radio waves received by the broadcast-signal receiving unit 1030, the signal having the frequency allocated to the radio station that the user has selected by operating the operation input unit 1020. The audio data obtained from the radio broadcast signal is supplied to the audio control unit 1026 through the bus 1022.

The audio control unit 1026 converts the audio data from the tuner unit 1031 to analog audio signal. The analog audio signal is sent to the speaker 1027. The speaker 1027 generates sound from the analog audio signal. The user can therefore listen to the radio program.

The control unit 1023 can supply the audio data obtained in the tuner unit 1031, to the storage medium 1029. Hence, the storage medium 1029 can store the audio data representing the radio program.

The control unit 1023 is connected to the network NT1000 first by the communications control unit 1032 and then by the network interface 1033. Thus, the control unit 1023 can access the portal server 1003 and other servers 1004 to 1007 that are provided on the network NT1000. The control unit 1023 can exchange various information items and data items with the portal server 1003 and the other servers 1004 to 1007.

The encoder/decoder unit 1034 receives the content data from the network NT1000 through the network interface 1033 and communications control unit 1032. The unit 1034 also receives the content data read from the storage medium 1029 or the external recording medium. The content data from the network NT1000 and the content data from the storage medium 1029 or the external recording medium are encoded and compressed. The encoder/decoder unit 1034 decodes the content data and supplies them to the display control unit 1024 and the audio control unit 1026.

The content data read from the external recording medium may be one not compressed or encoded. In this case, the encoder/decoder unit 1034 compresses and encodes the content data. The encoder/decoder unit 1034 compresses and encodes the audio data and the like supplied from the tuner unit 1031, too. The content data, thus compressed and encoded, is sent to the storage medium 1029.

The content data compressed and encoded by the encoder/decoder unit 1034 is stored in the storage medium 1029 under the control of the control unit 1023.

The copyright management unit 1035 generates copyright management information about the content data downloaded from the network NT1000 via the network interface 1033 and communications control unit 1032. The unit 1035 also generates copyright management information about the content data the recording/reproducing unit 1028 has read from the external recording medium.

Under the control of the control unit 1023, the copyright management information generated by the copyright management unit 1035 is registered in the storage medium 1029, in association with the content data.

The copyright management unit 1035 may appropriately update the copyright management information to check out the content data associated with the copyright management information, between the storage medium 1029 and the external recording medium specified. Alternatively, the unit 1035 may appropriately update the copyright management information in order to check in the content data between the external recording medium and the storage medium 1029. In either case, the copy right to the content data is protected.

The page-information generating unit 1036 receives page information such as an XML (extensible Markup Language) file or an HTML (Hyper Text Markup Language) file from the network NT1000 via the network interface 1033 and communications control unit 1032. The unit 1036 interprets the page information and generates video data to be displayed by the display unit 1025. The video data is supplied to the display control unit 1024.

The authentication-process unit 1037 performs the process of transmitting authentication information to the portal server 1003 and the other servers 1004 to 1007 through the communications control unit 1032 and the network interface 1033. Note that the portal server 1003 and the other servers 1004 to 1007 are provided on the network NT1000 and are connected by the network interface 1033.

The authentication-information storage unit 1038 stores the authentication information that the authentication-process unit 1037 necessarily uses in order to access the portal server 1003 and the other servers 1004 to 1007.

The radio-broadcast display control unit 1039 transmits a request signal via the communications control unit 1032 and network interface 1033 to the radio-data distributing server 1006 of the radio station that is broadcasting the radio program the client terminal 1002 is receiving at present. The request signal requests that the server 1006 should give the user the information about the radio program that the client terminal 1002 is receiving.

As a result, the radio-data distributing server 1006 provided on the network NT1000 transmits the radio-program information. The radio-broadcast display control unit 1039 receives the radio-program information through the network interface 1033 and communications control unit 1032. Then, the unit 1039 transmits this information to the display control unit 1024. The display control unit 1024 conveys the information to the display unit 1025. The display unit 1025 displays the radio-program information. This information consists of the name of the radio program that the client terminal 1002 is receiving, the title of the musical piece the terminal 1002 is receiving, the name of the artist who plays the music, and the like.

Figure 37:
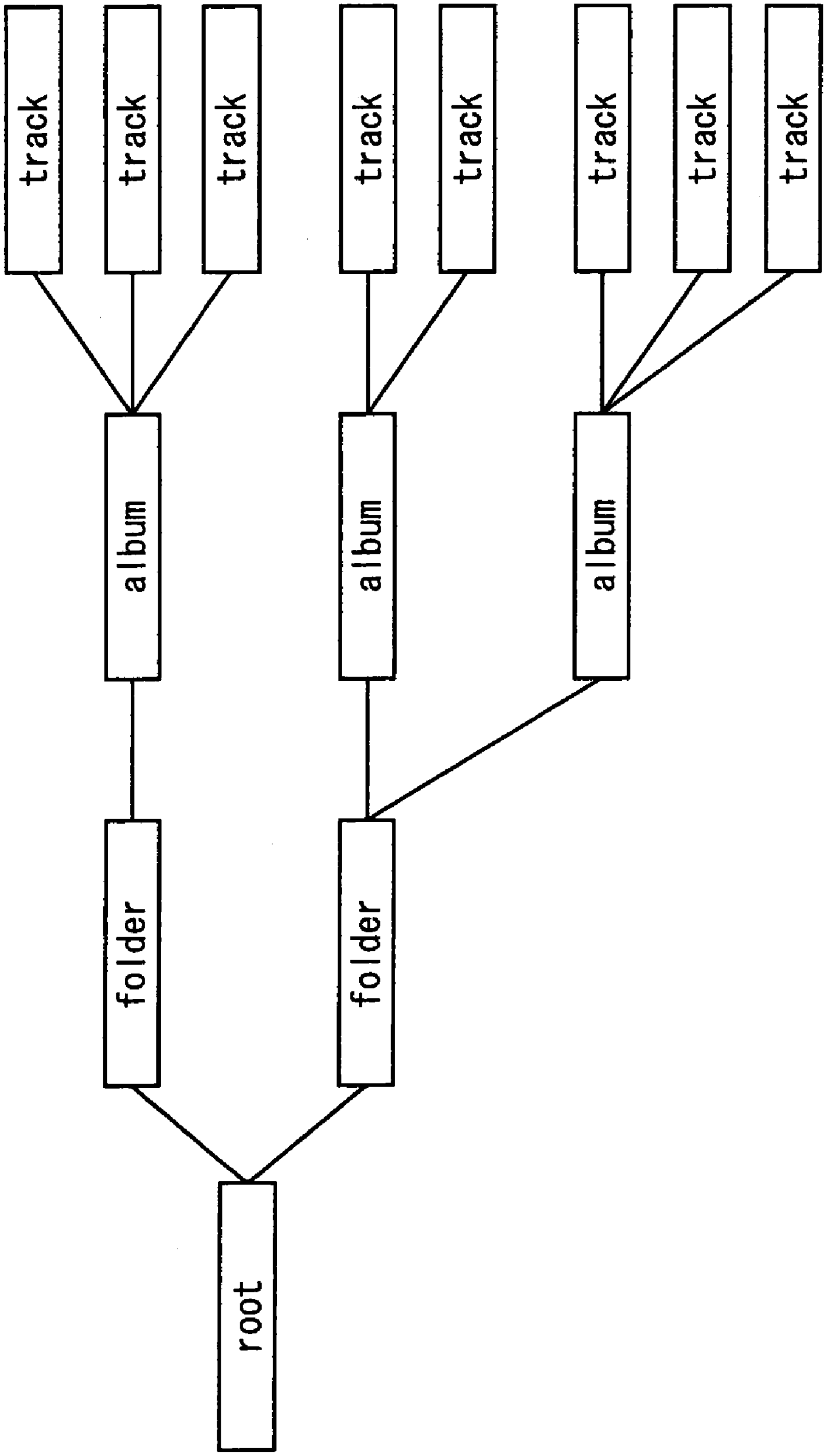
FIG. 37 is a diagram representing a directory configuration.

In the client terminal 1002, the control unit 1023 controls the content data to be stored in the storage medium 1029, in the form of such a directory configuration as is illustrated in FIG. 37. A given number of "folder" directories are prepared, constituting a layer immediately lower than "root" display. The "folder" directories thus prepared corresponding to the genres of contents or the users who may use the client terminal 1002.

"Album" directories are prepared, forming a layer immediately lower than "folder." They are provided in numbers falling within a prescribed range. At least one "track" files are prepared, constituting a layer immediately lower than "album." Several track files may belong to each "album" directory. Each track file is one musical piece, i.e., contents.

The content data of this directory configuration is managed by the database file that is stored in the storage medium 1029'.

(3-3) Function-Circuit Block Configuration of the Portal Server 1003

Figure 38:
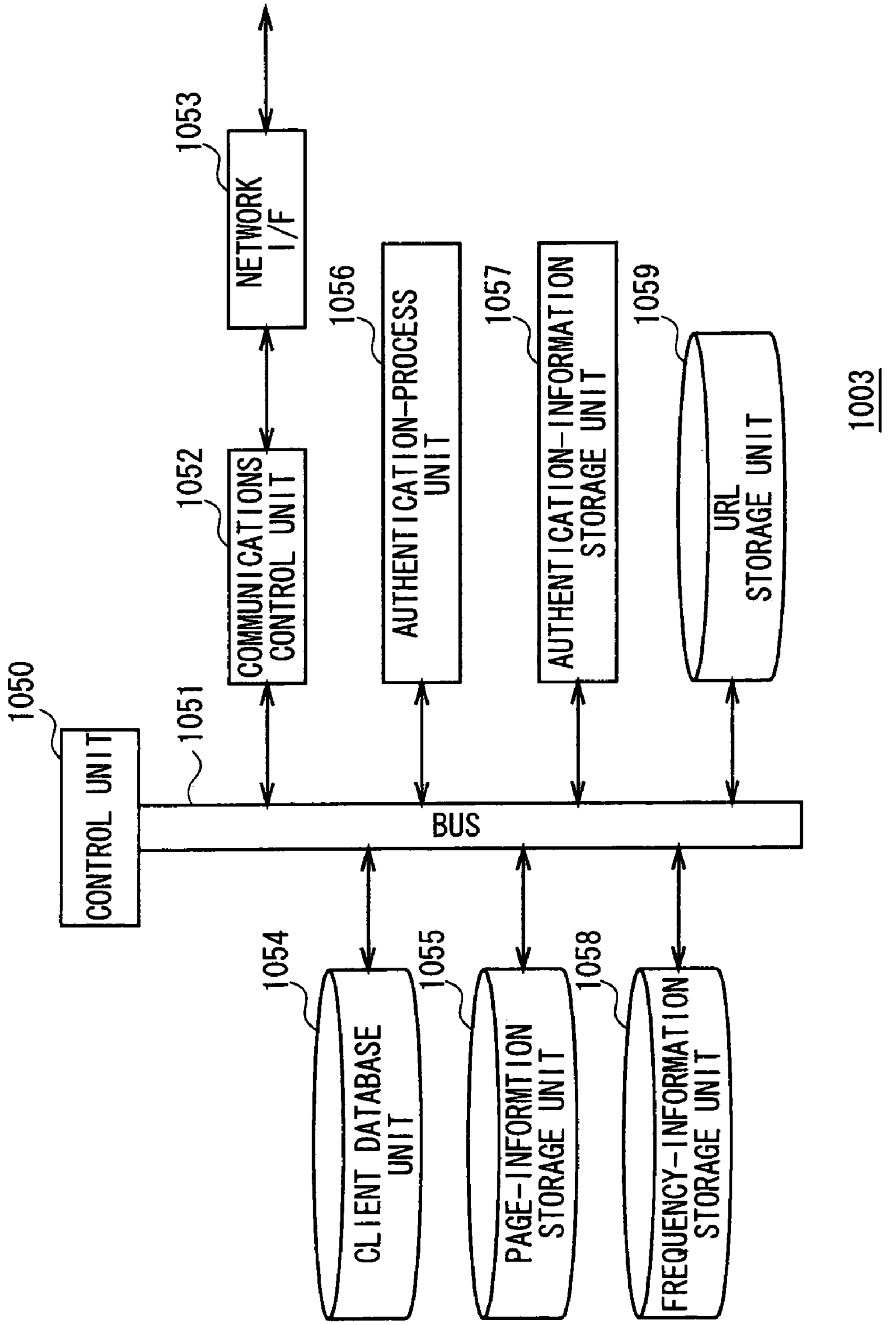
FIG. 38 is a block diagram of the hardware configuration of a portal server, depicting the function circuits constituting this server.

The hardware configuration of the portal server 1003 will be described with reference to FIG. 38. The control unit 1050 in the portal server 1003 controls the circuits of the portal server 1003, which are connected by the bus 1051.

Controlled by the control unit 1050, the communications control unit 1052 receives various information items from, and transmits various data items to, the client terminal 1002 and the other servers 1004 to 1008 through the network interface 1053.

The client database unit 1054 contains the ID (Identification) information and password information of any user who has entered contract with the provider that runs the music-related service providing system 1000. The ID information and the password information are registered, one associated with the other, forming an item of client information.

The page-information storage unit 1055 stores page information and the like, which are managed by the provider that runs the music-related service providing system 1000.

The page information is described in a specific language such as XML. It contains URL (Uniform Resource Locator) information used for accessing the music-data distributing server 1004, physical-sales server 1005, radio-data distributing server 1006, Internet-radio server 1007, etc.

The authentication-process unit 1056 can receive the user ID information and the user password information from the client terminal 1002 through the network interface 1053 and communications control unit 1052. Upon receiving the user ID information and the user password information, the unit 1056 determines whether the user ID information and the password information are registered as client information in the client database unit 1054.

Upon finishing the process of authenticating the user, the authentication-process unit 1056 issues portal-authentication result information (i.e., authentication-session ID information, later described). The portal-authentication result information, which indicates the result of the process of authenticating the user, is temporarily stored in the authentication-information storage unit 1057.

The authentication-process unit 1056 may determine that the ID information and the password information are registered in the client database unit 1054, showing that the user is an authenticated one. In this case, the control unit 1050 reads the page information about the provider, from the page-information storage unit 1055. The control unit 1050 transmits the page information, together with the portal-authentication result information, to the client terminal 1002, first through the communications control unit 1052 and then through the network interface 1053.

The authentication-process unit 1056 may determine that the ID information and the password information are not registered in the client database unit 1054, showing that the user is not an authenticated one. In this case, the control unit 1050 reads authentication-error notifying page information from the page-information storage unit 1055. The control unit 1050 transmits authentication-error information, together with the authentication-error-notifying page information, to the client terminal 1002, first through the communications control unit 1052 and then through the network interface 1053. The authentication-error-notifying page information indicates that the user is not an authenticated one.

Portal-authentication result information (i.e., authentication ticket, later described) is transmitted from the client terminal 1002 when the music-data distributing server 1004, physical-sales server 1005 and radio-data distributing server 1006 finish the authentication process on the user. The authentication-process unit 1056 receives the portal-authentication result data via the network interface 1053 and communications control unit 1052. The unit 1056 then compares this portal-authentication result information with the portal-authentication result information corresponding to the user and temporarily stored in the authentication-information storage unit 1057.

The authentication-process unit 1056 determines whether portal-authentication result information is normal one or not as an authentication process on the portal-authentication result information received from the music-data distributing server 1004, physical-sales server 1005 and radio-broadcast information distributing server 1006. The result of this decision is sent to the music-data distributing server 1004, physical-sales server 1005 and radio-data distributing server 1006, first through the communications control unit 1052 and then through the network interface 1053.

The frequency-information storage unit 1058 stores area code, frequency information items, names of radio stations, and call signs, in association with each other. The area codes are, for example, postal codes assigned to the areas, respectively. The frequency information items represent the frequencies assigned to the radio stations from which the client terminal 1002 can receive signals. The names of radio stations (hereinafter referred to as "radio-station names") pertain to the stations that broadcast radio programs that the terminal 1002 can receive. The call signs are ID information items that are uniquely assigned to the radio stations, respectively.

The URL storage unit 1059 stores the call signs and URL information items associated with the call signs, respectively. The URL information items represent URLs that can acquire the radio-broadcast information items (hereinafter called "now-on-air information") about the radio programs that the radio stations are broadcasting at present. Each now-on-air information item is the name of a radio program being broadcast, the title of the musical piece being broadcast, and the like.

(3-4) Function-Circuit Block Configuration of the Music-Data Distributing Server 1004

The hardware configuration of the music-data distributing server 1004 will be described, with reference to FIG. 39. The control unit 1070 in the music-data distributing server 1004 controls the circuits of the server 1004 connected to it by the bus 1071.

Controlled by the control unit 1070, the communications control unit 1072 receives/transmits various information items, and various data items from/to, the client terminal 1002, the portal server 1003 and the like through the network interface 1073. The various data items are, for example, content data.

The client database unit 1074 contains the ID information and password information of any user who has entered contract with the provider that runs the music-related service providing system 1000. The ID information and the password information are registered, one associated with the other, forming an item of client information. The client database 1074 need not be provided if the authentication-process unit 1075 can authenticate the user on the basis of the portal-authentication result information that the portal server 1003 has issued.

The storage unit 1076 stores page information and the like, which are managed in the music-data distributing server 1004. This page information introduces the music data that can be downloaded.

The page information for use in distributing music data is described in a specific language such as XML. The page information helps the user of the client terminal 1002 to select any music data that he or she wants to have downloaded.

The control unit 1070 may receive a request signal from the client terminal 1002 via the network interface 1073 and the communications control unit 1072. The request signal requests for the page information for distributing music data, which should be transmitted from the client terminal 1002. Upon receiving the request signal, the control unit 1070 supplies the page information for distributing the music data, which is stored in the page-information storage unit 1076, to the client terminal 1002 through the communications control unit 1072 and a network interface 1073.

The authentication-process unit 1075 receives the ID information and password information of the user from the client terminal 1002, first through the network interface 1073 and then through the communications control unit 1072. Then, it is determined whether the ID information and the password information have been registered, as client information, in the client database unit 1074. Thus, the authentication-process unit 1075 authenticates the user of the client terminal 1002.

The authentication-process unit 1075 may authenticate the user by a different method that uses neither the user ID information nor the password information. That is, the unit 1075 receives portal-authentication result data (i.e., authentication ticket, later described) issued by the portal server 1003 and transmitted from the client terminal 1002, first through the network interface 1073 and then through the communications control unit 1072. The authentication-process unit 1075 then transmits the portal-authentication result information to the portal server unit 1003, first through the communications control unit 1072 and then through the network interface 1073.

The portal server 1003 receives the portal-authentication result information and confirms the receipt of this information. The server 1003 transmits the information indicating the receipt of the portal-authentication result information. The authentication-process unit 1075 receives this information from the portal server 1003, first through the network interface 1073 and then through the communications control unit 1072. From this information, the authentication-process unit 1075 determines whether the user is an authenticated user who has entered a contract with the provider that runs the music-related service providing system 1000.

Thus, the authentication-process unit 1075 issues server-authentication result information (i.e., service-session ID information, later described) that shows the result of the authentication of the user.

The authentication-process unit 1075 may thus determine that the user is an authenticated one, as it finishes the process of authenticating the user. If this is the case, the control unit 1070 supplies the page information for distributing music data to the client terminal 1002, together with the server-authentication result information, through the communications control unit 1072 and a network interface 1073. The page information, which will be used to distribute the music data, is stored in the page-information storage unit 1076.

Conversely, the authentication-process unit 1075 may not determine that the user is an authenticated one, as it finishes the process of authenticating the user. In this case, the control unit 1070 supplies authentication-error information to the client terminal 1002, together with the authentication-error notifying page information, through the communications control unit 1072 and a network interface 1073. The authentication-error notifying page information, which indicates the authentication failure, is stored in the page-information storage unit 1076.

The authentication-information storage unit 1077 temporarily stores the server-authentication result information issued by the authentication-process unit 1075. The unit 1077 stores various authentication information items, too. The unit 1075 must use these authentication information items to authenticate the user of the client terminal 1002.

The music-data storage unit 1078 stores a plurality of music data items that have been compressed and encoded in the above-mentioned ATRAC3 or the above-mentioned MP3 format. In the unit 1078, the music data items are recorded, each associated with a retrieval key such as a content ID code.

The retrieval unit 1079 can receive a download request signal from the client terminal 1002 through the network interface 1073 and the communications control unit 1072. Note that the client terminal 1002 transmits the download request signal when it receives the page information for distributing music data. The download request signal requests that any music data item that the user wants should be downloaded into the client terminal 1002. This signal contains a key for retrieving the music data. Upon receiving the download request signal, the retrieval unit 1079 extracts the retrieval key from the download request signal.

In accordance with the retrieval key, the retrieval unit 1079 retrieves the music data item the user wants to have downloaded, from the music-data storage unit 1078.

The control unit 1070 transmits the music data item thus retrieved, to the client terminal 1002, first through the communications control unit 1072 and then through the network interface 1073.

The control unit 1070 transmits charge information to the charging server 1008, first through the communications control unit 1072 and then through the network interface 1073. The charge information will be used to collect from the user the charge for downloading the music data item. On the basis of the charge information, the charging server 1008 performs the process of charging the user for the music data item downloaded into the client terminal 1002.

(3-5) Function-Circuit Block Configuration of the Physical-Sales Server 1005

Figure 40:
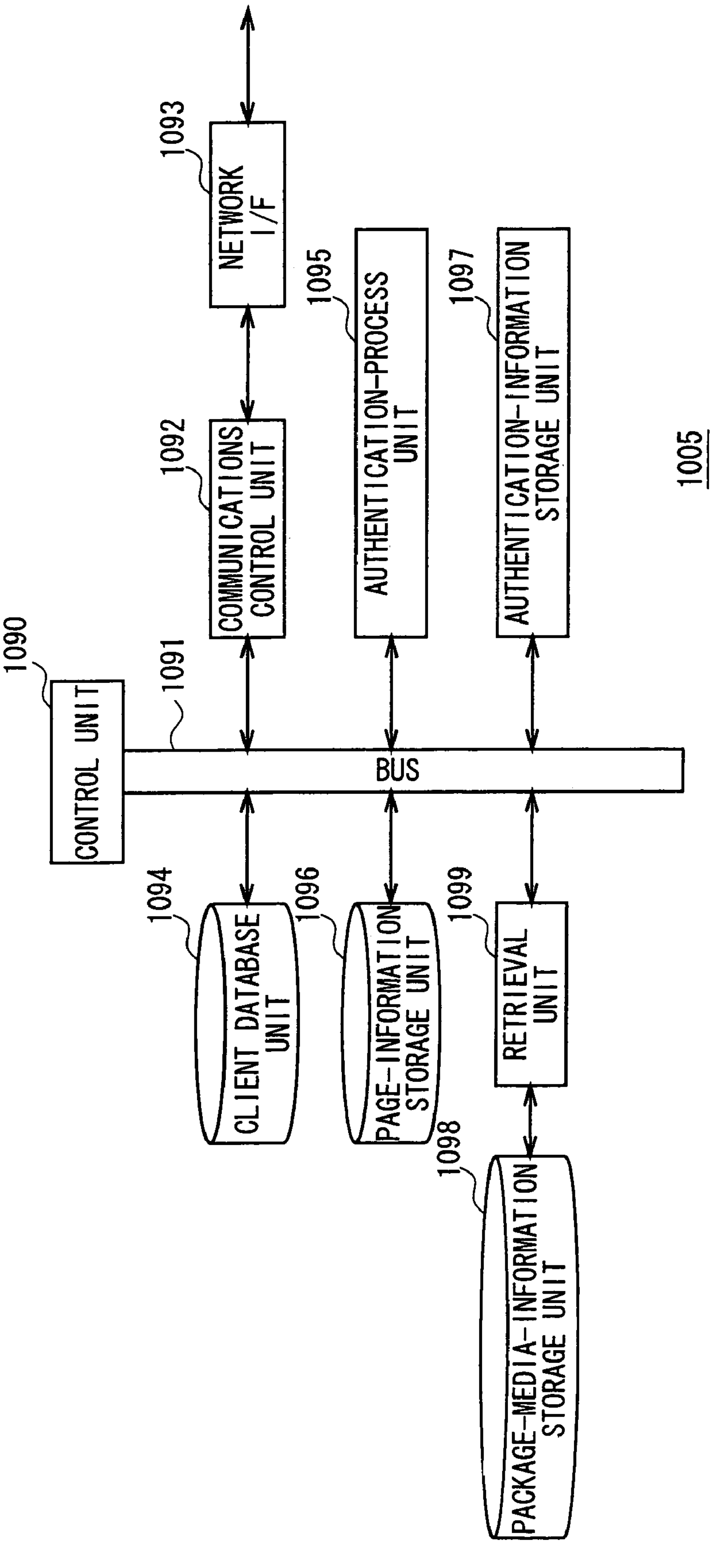
FIG. 40 is a block diagram of the hardware configuration of a sales server, showing the function circuits constituting the sales server.

The hardware configuration of the physical-sales server 1005 will be described, with reference to FIG. 40. The control unit 1090 in the physical-sales server 1005 controls the circuits of the physical-sales server 1005, which are connected to it by the bus 1091.

Under the control of the control unit 1090, the communications control unit 1092 receives various information items from, and transmits various information items to, the client terminal 1002, the portal server 1003 and the like through the network interface 1093.

The client database unit 1094 stores the ID information and password information of the users who have already entered a contract with the provider that runs the physical-sales server 1005. The user ID information and the password information are registered in one-to-one association as client information, in the client database unit 1094. The authentication-process unit 1095 may have the function of authenticating the user of the client terminal 1002 in accordance with the portal-authentication result information issued by the portal server 1003. In this case, the client database unit 1094 need not be provided.

The page-information storage unit 1096 stores page information and the like. The page information is used for the sale of package media such as CDs and DVDs for sale, managed by the physical-sales server 1005. More precisely, the page information introduces the package media.

The page information for sale of the package media is described in a specific language such as XML. The page information helps the user of the client terminal 1002 to select any package media (e.g., CDs or DVDS) that he or she wants to buy.

The control unit 1090 can receive a page-information request signal from the client terminal 1002, which requests for the page information for the sale of package media. Upon receipt of the page-information request signal, first through the network interface 1093 and then through the communications control unit 1092, the control unit 1090 transmits the page information for the sale of package media to the client terminal 1002, first through the communications control unit 1092 and then through the network interface 1093. It should be recalled that the page information is stored in the page-information storage unit 1096.

The authentication-process unit 1095 receives the IC information and the password information, both assigned to the user of the client terminal 1002, from the client terminal 1002 through the network interface 1093 and the communications control unit 1092. The unit 1095 then determines whether the user ID information and the password information are registered as client information in the client database unit 1094, in order to authenticate the user.

The authentication-process unit 1095 may authenticate the user by a different method that uses neither the user ID information nor the password information. In this method, the unit 1095 receives the portal-authentication result information (i.e., authentication ticket, later described) issued by the portal server 1003 and transmitted from the client terminal 1002, first through the network interface 1093 and then through the communications control unit 1092. The portal-authentication result information, thus received, is transmitted to the portal server 1003, first through the communications control unit 1092 and then through the network interface 1093.

When the portal-authentication result information is transmitted to the portal server 1003, the authentication-process unit 1095 receives confirmation information from the portal server 1003 through the network interface 1093 and the communications control unit 1092. The confirmation information shows that the portal server 1003 has performed an authentication process (i.e., the confirmation process described above) on the basis of the portal-authentication result information. Then, the authentication-process unit 1095 determines, from the confirmation information, whether the user of the client terminal 1002 is an authenticated one who has entered a contract with the provider that runs the music-related service providing system 1000.

When the authentication-process unit 1095 finishes the process of authenticating the user, it generates server-authentication result information (i.e., service-session ID information, later described) that indicates the result of the process of authenticating the user.

If the authentication-process unit 1095 authenticates the user, the control unit 1090 transmits the page information, together with the server-authentication result information, to the client terminal 1002, first through the communications control unit 1092 and then through the network interface 1093. Note that the page information is stored in the page-information storage unit 1096 and is used for the sale of package media.

The authentication-process unit 1095 may not authenticate the user. If this is the case, the control unit 1090 transmits authentication-error information, together with authentication-error-notifying page information; to the client terminal 1002, first through the communications control unit 1092 and then through the network interface 1093. The authentication-error-notifying page information is stored in the page-information storage unit 1096.

The authentication-information storage unit 1097 temporarily stores the server-authentication result information issued by the authentication-process unit 1095. The unit 1097 stores various authentication information items, too. The authentication-process unit 1095 must use these authentication information items to authenticate the user of the client terminal 1002.

The package-media-information storage unit 1098 stores information items about a plurality of package media such as CDs and DVDs for sale. (Hereinafter, these information items will be referred to as "package-media information") In the unit 1098, the package-media information items are recorded, each associated with a retrieval key such as a package-medium ID information.

The retrieval unit 1099 can receive a media-information request signal from the client terminal 1002 through the network interface 1093 and the communications control unit 1092. Note that the client terminal 1002 transmits the media-information request signal when it receives the page information for the sale of package media. The media-information request signal requests for package-media information relating to a package medium of a certain CD or DVD. Upon receiving the media-information request signal, the retrieval unit 1099 extracts a retrieval key for retrieving the certain package medium from the request signal.

On the basis of the retrieval key, the retrieval unit 1099 retrieves the package-media information about the package medium that corresponds to the retrieving condition of the retrieval key from the plurality of package-media information in the package-media-information storage unit 1098.

The control unit 1090 transmits the package-media information thus retrieved, to the client terminal 1002, first through the communications control unit 1092 and then through the network interface 1093. The client terminal 1002 displays the package-media information about the package medium the user wishes to buy.

The control unit 1090 may receive a purchase request signal from the client terminal 1002, through the network interface 1093 and the communications control unity 1092. Note that the purchase request signal indicates that the user wants to buy the package medium. Upon receiving the purchase request signal, the control unit 1090 performs the process of buying and delivering the package medium designated by the user of the client terminal 1002.

The control unit 1090 transmits charge information to the charging server 1008, first through the communications control unit 1092 and then through the network interface 1093. The charge information will be used to collect from the user the money for package medium. On the basis of the charge information, the charging server 1008 performs the process of charging the user for the package medium.

Upon finishing the process of causing the charging server 1008 to charge the user, the control unit 1090 generates purchase-completion page information to the client terminal 1002, first through the communications control unit 1092 and then through the network interface 1093. The purchase-completion page information shows that the user has bought the package medium.

(3-6) Function-Circuit Block Configuration of the Radio-Data Distributing Server 1006

Figure 41:
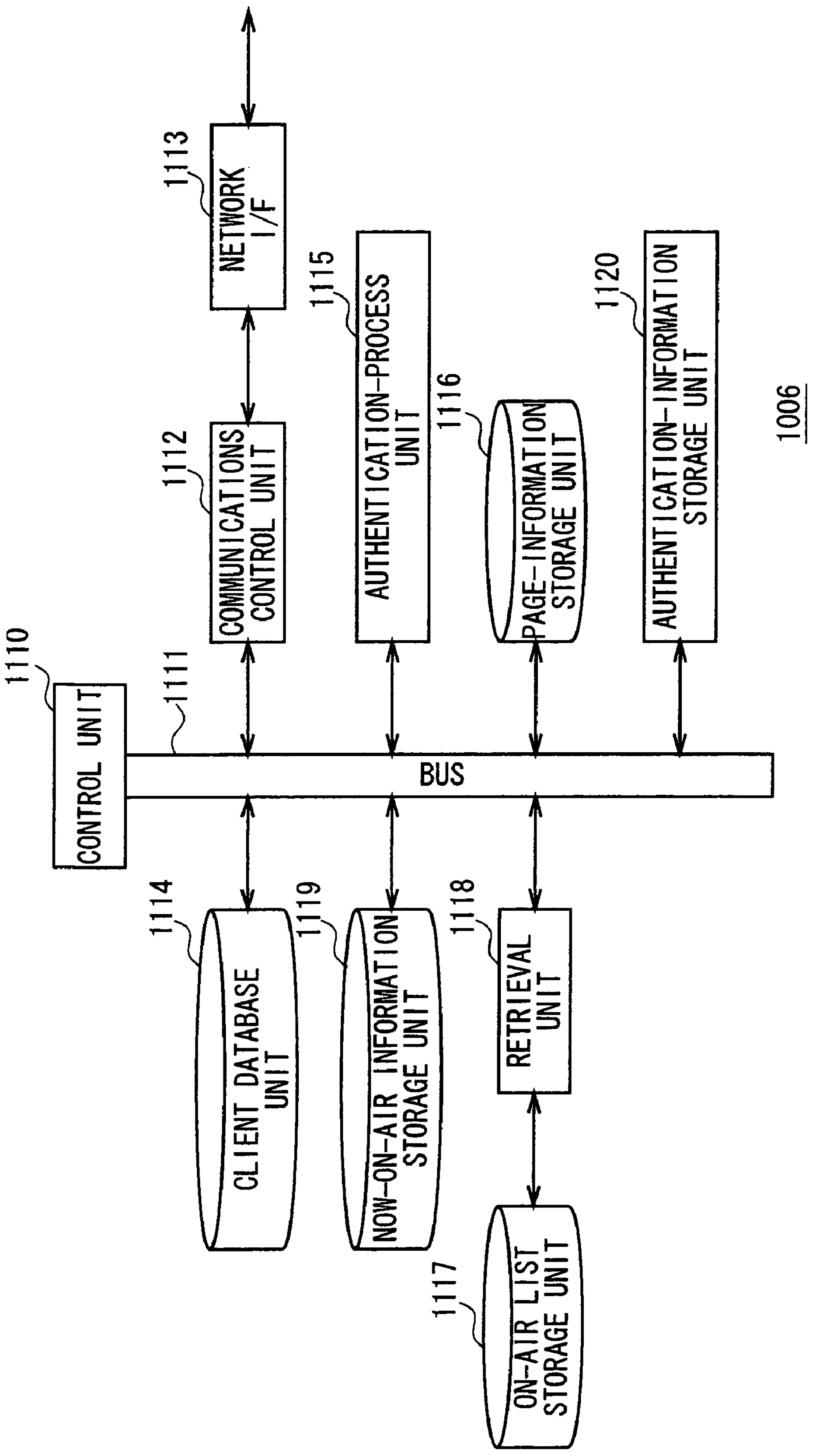
FIG. 41 is a block diagram of the hardware configuration of a radio-broadcasting information distributing server, showing the function circuits constituting this server.

The hardware configuration of the radio-data distributing server 1006 will be described, with reference to FIG. 41. The control unit 1110 in the radio-data distributing server 1006 controls the circuits of the radio-broadcasting information distributing server 1006, which are connected to it by the bus 1111.

Controlled by the control unit 1110, the communications control unit 1112 receives various information from, and transmits receives various information to, the client terminal 1002 and the portal server 1003 and the like through the network interface 1113.

The client database unit 1114 stores client information. The client information contains the user ID information and password information of any user who has entered contract with the provider that runs the radio-data distributing server 1006. The ID information and the password information are registered, one associated with the other, forming an item of client information. The client database unit 1114 need not be provided if the authentication-process unit 1115 can authenticate the user on the basis of the portal-authentication result information that the portal server 1003 has issued.

The page-information storage unit 1116 stores page information for distributing on-air list information and the like, which will be used to acquire radio broadcast information (hereinafter called "on-air list information"). The on-air list information is managed by the radio-data distributing server 1006 and concerns with the radio programs that have been broadcast by the radio stations that are linked to the radio-data distributing server 1006.

The page information for distributing the on-air list information is described in a specific language such as XML. It contains an input box or the like. The input box is used to input the name and broadcast date of any radio program the user wishes to have, which will be used as a key for retrieving the on-air list information.

The on-air list storage unit 1117 stores the name, on-air start time and on-air end time of each radio program that any radio station linked to the radio-data distributing server 1006 has already broadcast. The unit 1117 stores on-air list information, too. The on-air list information represents a list of the titles of the musical pieces broadcast in the radio program, the names of the artists who play the musical pieces, the on-air start time of each of these musical pieces, and the like.

The control unit 1110 receives a page-information request signal for requesting page information that distributes on-air list information from the client terminal 1002, first through the network interface 1113 and then through the communications control unit 1112. In response to the page-information request signal, the control unit 1110 transmits the page information for distributing the on-air list information, to the client terminal 1002, first through the communications control unit 1112 and then through the network interface 1113. Note that this page information is stored in the page information storage unit 1116.

The retrieval unit 1118 can receive an on-air list request signal from the client terminal 1002 through the network interface 1113 and the communications control unit 1112. Note that the on-air list request signal contains a key for retrieving the desired on-air list information input on the page information for distributing the on-air information. Upon receiving the on-air list request signal, the retrieval unit 1118 extracts the retrieval key from the on-air list request signal.

In accordance with the retrieval key, the retrieval unit 1118 retrieves, from the on-air list storage unit 1117, that part of the on-air list information that meets the retrieval condition defined by the retrieval key. This part of the on-air list information, thus extracted, is the on-air list information desired.

The control unit 1110 transmits the on-air list information thus retrieved, to the client terminal 1002, first through the communications control unit 1112 and then through the network interface 1113.

The now-on-air information storage unit 1119 stores now-on-air information that represents the name of the radio program currently being broadcast from the radio station corresponding to the radio-information distributing server 1006, on-air start time and on-air end time of the program, the title of the musical piece currently being broadcast in the radio program, the names of the artists who play the musical piece, the on-air start time of the musical piece, and the like.

The authentication-process unit 1115 receives the user ID information and password information of the user of the client terminal 1002, along with the now-on-air information request signal, from the client terminal 1002 through the network interface 1113 and the communications control unit 1112. Upon receiving the ID information and password information of the user, the unit 1115 determines whether the user ID information and password information have been registered as client information in the client database unit 1114, in order to authenticate the user.

The authentication-process unit 1115 may authenticate the user by a different method that uses neither the user ID information nor the password information. In this method, the unit 1115 receives the portal-authentication result information (i.e., authentication ticket, later described) issued by the portal server 1003 and transmitted from the client terminal 1002, first through the network interface 1113 and then through the communications control unit 1112. The portal-authentication result information, thus received, is transmitted to the portal server 1003, first through the communications control unit 1112 and then through the network interface 1113.

When the portal-authentication result information is transmitted to the portal server 1003, the authentication-process unit 1115 receives confirmation information from the portal server 1003 through the network interface 1113 and the communications control unit 1112. The confirmation information shows that the portal server 1003 has performed an authentication process (i.e., the confirmation process described above) on the basis of the portal-authentication result information. Then, the authentication-process unit 1115 determines, from the confirmation information, whether the user of the client terminal 1002 is an authenticated one who has entered a contract with the provider that runs the music-related service providing system 1000.

When the authentication-process unit 1115 finishes the process of authenticating the user, it generates server-authentication result information (i.e., service-session ID information, later described) that indicates the result of the process of authenticating the user.

If the authentication-process unit 1115 authenticates the user, the control unit 1110 transmits the now-on-air information, together with the server-authentication result information, to the client terminal 1002, first through the communications control unit 1112 and then through the network interface 1113. Note that the now-on-air information is stored in the now-on-air information storage unit 1119.

The authentication-process unit 1115 may not authenticate the user. If this is the case, the control unit 1110 transmits authentication-error information, together with authentication-error-notifying page information stored in the page information storage unit 1116, to the client terminal 1002, first through the communications control unit 1112 and then through the network interface 1113.

Thus, the control unit 1110 distributes the now-on-air information at the request of the user if the user is authenticated. If the user cannot be authenticated, the control unit 1110 disables the user from receiving the radio broadcast information, such as the now-on-air information, which the radio-data distributing server 1006 provides.

The authentication-information storage unit 1120 temporarily stores the server-authentication result information issued by the authentication-process unit 1115. The unit 1120 stores various authentication information items, too. The authentication-process unit 1115 must use these authentication information items to authenticate the user of the client terminal 1002.

(3-7) Processes Performed by the Servers

The process achieved between the client terminal 1002 and the portal server 1003, and the processes accomplished between the client terminal 1002 and the other servers 1004, 1005 and 1006 will be described, with reference to the sequence charts of FIGS. 42 to 47.

(3-7-1) Sequence of the User Authentication between the Client Terminal 1002 and the Portal Server 1003

The process of authenticating the user, which is achieved between the client terminal 1002 and the portal server 1003 will be explained, with reference to FIG. 42.

Assume that the power switch on the client terminal 1002 of the user who has entered a contract with the provider that runs the music-related service providing system 1000 is turned on, or the user depresses an operation button on the client terminal 1002. Then, an operation-input signal is generated. The input-processing unit 1021 converts the operation-input signal to an operation command. Upon receiving this operation command, the control unit 1023 starts the authentication requesting process.

First, in Step SP1000, the control unit 1023 generates a connection request signal. The connection request signal contains the authentication-session ID information and the like, which are temporarily stored in the authentication-information storage unit 1038. The connection request signal is transmitted to the portal server 1003, first through the communications control unit 1032 and then through the network interface 1033.

Note that the portal server 1003 issues authentication-session ID information every time the client terminal 1002 is connected to the portal server 1003. That is, the authentication-session ID information identifies the condition of communication (i.e., session) between the client terminal 1002 and the portal server 1003.

The authentication-session ID information is valid for a predetermined term, from the time the portal server 1003 issues it. (The validation term is, for example, about one minute.)

Therefore, the client terminal 1002 that has received the authentication-session ID information from the portal server 1003 is considered to be disconnected from the portal server 1003 if it fails to transmit the ID information back to the portal server 1003 within the validation term.

Since the authentication-session ID information is valid for a specific time only, the portal sever 1003 prevents any user who has not entered a contract with the provider that runs the music-related service providing system 1000 from using any authentication-session ID information issued in the past to identify himself or herself as an authenticated user.

The authentication-information storage unit 1038 temporarily stores the authentication-session ID information. This ID information is information that the portal server 1003 issued when the client terminal 1002 was connected to the portal server 1003 to have its user authenticated.

In Step SP1001, the control unit 1050 of the portal server 1003 receives the connection request signal from the client terminal 1002 through the network interface 1053 and the communications control unit 1052. The control unit 1050 supplies the authentication-session ID information and the like, which are contained in the connection request signal, to the authentication-process unit 1056.

Controlled by the control unit 1050, the authentication-process unit 1056 performs the process of authenticating the user on the basis of the authentication-session ID information received as connection request signal from the client terminal 1002.

The authentication-process unit 1056 may not authenticate the user of the client terminal 1002 because the authentication-session ID information is no longer valid. In this case, the control unit 1050 transmits authentication-error information indicating that the user is not authenticated, to the client terminal 1002, first through the communications control unit 1052 and then through the network interface 1053.

In Step SP1002, the control unit 1023 of the client terminal 1002 receives the authentication-error information from the portal server 1003, first through the network interface 1033 and then through the communications control unit 1032. In response to the authentication-error information, the control unit 1023 reads the user ID information, the password information, and the like, all stored in the authentication-information storage unit 1038. Then, the control unit 1023 transmits the user ID information, the password information and the like to the portal server 1003 through the communications control unit 1032 and the network interface 1033.

In Step SP1003, the control unit 1050 of the portal server 1003 receives the user ID information, the password information and the like from the client terminal 1002, first through the network interface 1053 and then through the communications control unit 1052. The control unit 1050 supplies the user ID information, the password information and the like to the authentication-process unit 1056.

Controlled by the control unit 1050, the authentication-process unit 1056 performs the process of authenticating the user. That is, the unit 1050 determines whether the user ID information, the password information and the like, all received from the client terminal 1002, are included in the client information registered in the client database unit 1054.

The authentication-process unit 1056 may determine that the user of the client terminal 1002 is authenticated. If this is the case, the control unit 1050 controls the authentication-process unit 1056, causing the unit 1056 to issue authentication-session ID information that shows the condition of communication between the client terminal 1002 and the portal server 1003. The authentication-session ID information is transmitted to the client terminal 1002. At the same time, the authentication-session ID information is temporarily stored in the authentication-information storage unit 1057.

The control unit 1050 transmits the authentication-session ID information and the like, issued by the authentication-process unit 1056, to the client terminal 1002, first through the communications control unit 1052 and then through the network interface 1053.

In Step SP1004, the control unit 1023 of the client terminal 1002 receives the authentication-session ID information and the like, transmitted from the portal server 1003, first through the network interface 1033 and then through the communications control unit 1032. The control unit 1023 supplies the authentication-session ID information and the like to the authentication-process unit 1037.

Controlled by the control unit 1023, the authentication-information storage unit 1038 temporarily stores the authentication-session ID information and the like that the authentication-process unit 1037 has received from the portal server 1003.

The control unit 1023 transmits a page-information request signal to the portal server 1003, first through the communications control unit 1032 and then through the network interface 1033. The page-information request signal demands that the portal server 1003 should give page information to the terminal 1002. The control unit 1023 transmits this signal, together with the authentication-session ID information and the like that have been received from the portal server 1003 and temporarily stored in the authentication-information storage unit 1038.

In Step S1005, the control unit 1050 of the portal server 1003 receives the page-information request signal, the authentication-session ID information, and the like, all transmitted from the client terminal 1002, first through the network interface 1053 and then through the communications control unit 1052. The control unit 1050 supplies the authentication-session ID information and the like to the authentication-process unit 1056.

The authentication-process unit 1056 carries out the process of authenticating the user of the client terminal 1002, under the control of the control unit 1050. More precisely, the unit 1056 compares the authentication-session ID information and the like, which have been transmitted from the client terminal 1002, with the authentication-session ID information and the like, which have been issued to the client terminal 1002 in Step SP1003 and temporarily stored in the authentication-information storage unit 1057.

If the user of the client terminal 1002 is found to be an authenticated one in Step SP1006, the authentication-process unit 1056 determines that the request for page information made by the client terminal 1002 is justifiable. Then, the validation term of the authentication-session ID information and the like is extended.

The control unit 1050 reads the page information requested for by the user, from the page-information storage unit 1055. The control unit 1050 then transmits the page information to the client terminal 1002, first through the communications control unit 1052 and then through the network interface 1053, together with the authentication-session ID information and the like, the validation term of which has been extended.

In Step SP1007, the control unit 1023 of the client terminal 1002 receives the page information, the authentication-session ID information, and the like, all transmitted from the portal server 1003, first through the network interface 1033 and then through the communications control unit 1032. The page information is supplied to the page-information generating unit 1036. The authentication-session ID information and the like, the validation term of which has been extended, are supplied to the authentication-process unit 1037.

The page-information generating unit 1036 generates video data from the page information supplied from the control unit 1023. The video data represents a page that contains data items showing the links to the music-data distributing server 1004, physical-sales server 1005 and radio-data distributing server 1006.

The display control unit 1024 performs digital-to-analog conversion on the video data supplied from the page-information generating unit 1036. Thus, the unit 1024 generates an analog video signal. The analog video signal is supplied to the display unit 1025. The display unit 1025 displays the page information about the portal server 1003, which is represented by the analog video signal.

The authentication-process unit 1037 updates the authentication-session ID information and the like, which are temporarily stored in Step SP1004, to new authentication-session ID information and the like whose validation term has been extended. More specifically, the unit 1037 receives the authentication-session ID information and the like, whose validation term has been extended, from the portal server 1003, and writes them over the authentication-session ID information and the like, whose validation term has not been extended, in the authentication-information storage unit 1038 under the control of the control unit 1023.

(3-7-2) Sequence of the User Authentication between the Client Terminal 1002 and the Servers 1004 to 1006

The process of authenticating the user, which is achieved between the client terminal 1002, on the one hand, and the music-data distributing server 1004, physical-sales server 1005 and radio-data distributing server 1006, on the other hand, will be explained, with reference to the sequence chart of FIG. 43.

Figure 42:
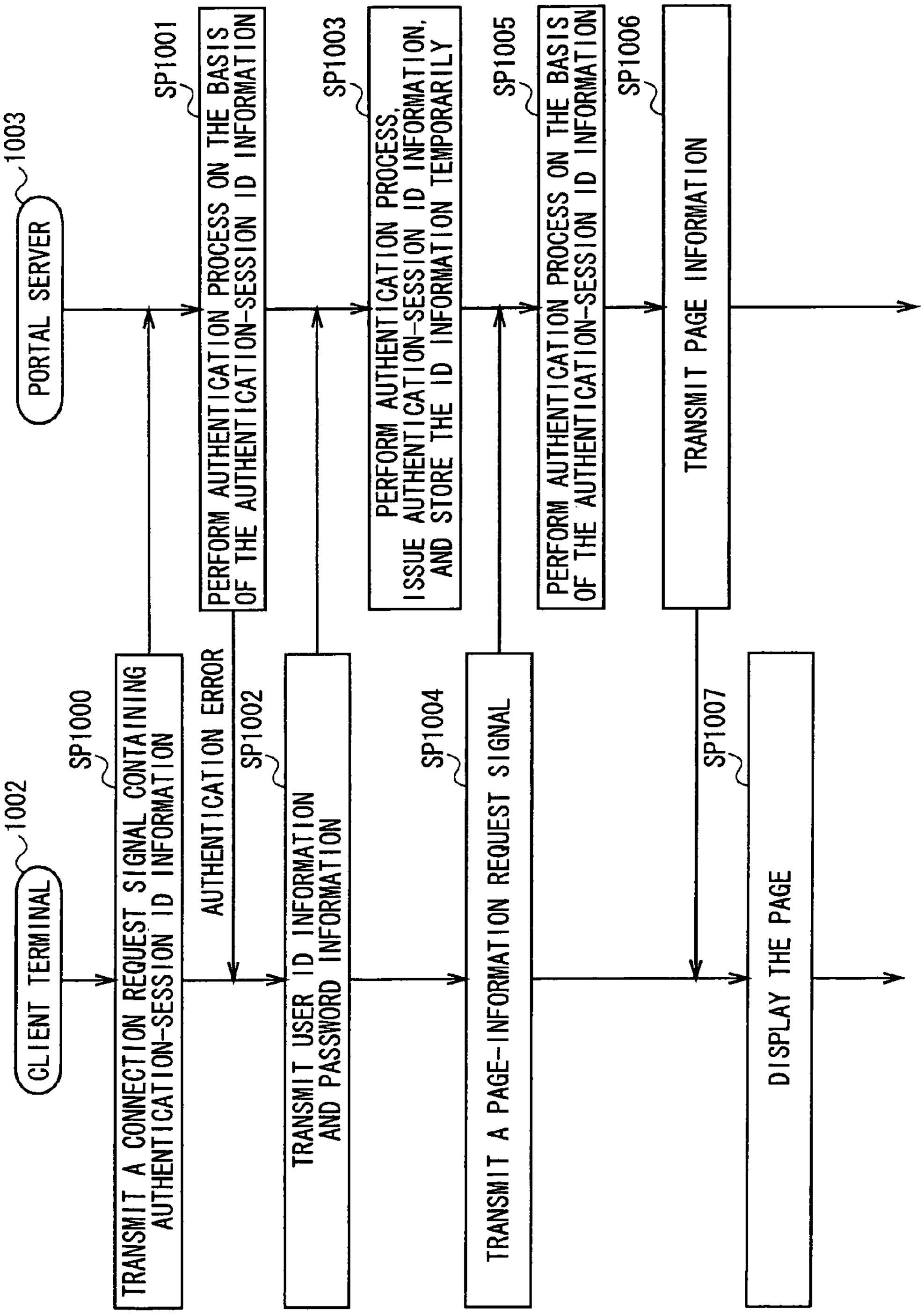
FIG. 42 is a sequence chart illustrating the sequence of verifying the user, which is achieved between the client terminal and the portal server.

The user may be authenticated as illustrated in FIG. 42. That is, the client terminal 1002 may first acquire the page information from the portal server 1003 and then accesses the music-data distributing server 1004, physical-sales server 1005 and radio-data distributing server 1006 by using the link data contained in the page information. (Hereinafter, the method of authenticating the user will be called "indirect-access authentication process".)

The user may be authenticated by another method. In this method, the client terminal 1002 uses URL information and the like, which are registered as bookmarks. Thus, the client terminal 1002 directly accesses the music-data distributing server 1004, physical-sales server 1005 and radio-data distributing server 1006, without acquiring the page information about the portal server 1003. (Hereinafter, this method of authenticating the user will be referred to as "indirect-access authentication process".)

In the indirect-access authentication process, the steps are performed in the same sequence, no matter whether the client terminal 1002 exchange data with the music-data distributing server 1004, physical-sales server 1005 or radio-data distributing server 1006.

In the direct-access authentication process, too, the steps are carried out in the same sequence, whether the client terminal 1002 exchange data with the music-data distributing server 1004, physical-sales server 1005 or radio-data distributing server 1006.

That is, the direct-access authentication process and the indirect-access authentication process are different only in the way in which the client terminal 1002 acquires the URL information it uses to access to the music-data distributing server 1004, physical-sales server 1005 or radio-data distributing server 1006. In both processes, the steps are performed in the same order.

Therefore, the direct-access authentication process and the indirect-access authentication process will be explained hereinafter as one method of authenticating the user. For simplicity of description, it will be described how the music-data distributing server 1004 is accessed in order to authenticate the user of the client terminal 1002.

First, in Step SP1010, the control unit 1023 of the client terminal 1002 transmits the service-session ID information to the music-data distributing server 1004 through the communications control unit 1032 and the network interface 1033, in accordance with the URL information contained as link data in the page information or the URL information registered as book mark. The service-session ID information is transmitted to the server 1004, together with a page-information request signal. This request signal requests for the page information for distributing the music data. (If the client terminal 1002 must access the physical-sales server 1005, the request signal will be one that requests for the page information about the package media for sale. If the client terminal must access the radio-data distributing server 1006, the request signal will be one that requests for the page information about on-air list information.)

The service-session ID information is identification information that the server (i.e., music-data distributing server 1004, physical-sales server 1005 or radio-data distributing server 1006) accessed by the client terminal 1002 issues every time it communicates with the client terminal 1002 to perform any process such as the authentication of the user. Namely, the service-session ID information identifies the communication condition (i.e., session) between the client terminal 1002 and the server.

Like the authentication-session ID information described above, the service-session ID information is valid for a predetermined term (e.g., about one minute), from the time the music-data distributing server 1004, physical-sales server 1005 or radio-data distributing server 1006 issues it. This measure is taken to accomplish reliable user authentication.

Thus, the client terminal 1002 will be considered to have been disconnected from the music-data distributing server 1004, physical-sales server 1005 or radio-data distributing server 1006 if it cannot give the service-session ID information back to one of these servers within the validation term. In other words, the music-data distributing server 1004, physical-sales server 1005 or radio-data distributing server 1006, which has issued the service-session ID information, will regard the client terminal 1002 as having been disconnected unless it receives the ID data returned from the terminal 1003 within that validation term.

Hence, the music-data distributing server 1004, physical-sales server 1005 and radio-data distributing server 1006 are prevented from being used by anyone who has not entered a contract with the provider that runs the music-related service providing system 1000.

The authentication-information storage unit 1038 temporarily stores the service-session ID information. Note that the service-session ID information is the information that the music-data distributing server 1004, physical-sales server 1005 or radio-data distributing server 1006 issued when it was connected to the client terminal 1002 in the past.

In Step SP1011, the control unit 1070 of the music-data distributing server 1004 receives the page-information request signal, the service-session ID information and the like that have been transmitted from the client terminal 1002, first through the network interface 1073 and then through the communications control unit 1072. The control unit 1070 supplies the service-session ID information and the like to the authentication-process unit 1075.

Controlled by the control unit 1070, the authentication-process unit 1075 compares the service-session ID information and the like transmitted from the client terminal 1002, with the service-session ID information and the like temporarily stored in the authentication-information storage unit 1077. Thus, the unit 1075 carries out the process of authenticating the user.

The authentication-process unit 1075 may not authenticate the user of the client terminal 1002 as a legal one, because the service-session ID information received from the client terminal 1002 is no longer valid. In this case, the unit 1075 determines that the page-information request signal transmitted from the client terminal 1002 is an illegal one.

If the authentication-process unit 1075 does not authenticate the user of the terminal 1002 as a legal one, the control unit 1070 transmits authentication-error information and a shop code to the client terminal 1002, first through the communications control unit 1072 and then through the network interface 1073. The authentication-error information indicates that the user has not been authenticated. The shop code identifies the music-data distributing server 1004.

In Step SP1012, the control unit 1023 of the client terminal 1002 receives the authentication-error information and the shop code, both transmitted from the music-data distributing server 1004, first through the network interface 1033 and then through the communications control unit 1032. From the authentication-error information, the control unit 1023 determines that the user has not been authenticated in the music-data distributing server 1004. The authentication-information storage unit 1038 temporarily stores the shop code received from the music-data distributing server 1004.

The control unit 1023 generates an authentication-ticket request signal, requesting for an authentication ticket that the client terminal 1002 will use to access the music-data distributing server 1004. The authentication-ticket request signal is transmitted, along with the shop code of the server 1004, and the authentication-session ID information temporarily stored in the authentication-information storage unit 1038 which has been received from the portal server 1003, and the like, to the portal server 1003, first through the communications control unit 1032 and then through the network interface 1033.

In Step SP1013, the control unit 1050 of the portal server 1003 receives the authentication-ticket request signal, the shop code, the authentication-session ID information, and the like, all transmitted from the client terminal 1002, through the network interface 1053 and the communications control unit 1054. The control unit 1050 supplies these data items to the authentication-process unit 1056.

Controlled by the control unit 1050, the authentication-process unit 1056 compares the authentication-session ID information and the like, received from the client terminal 1002, with the authentication-session ID information and the like, temporarily stored in the authentication-information storage unit 1057. Thus, the authentication-process unit 1056 carries out the process of authenticating the user of the client terminal 1002.

The authentication-session ID information transmitted from the client terminal 1002 may no longer be valid, and the authentication-process unit 1056 cannot determine whether the user is a legal one or not. If this is the case, the authentication-process unit 1056 determines that the authentication-ticket request signal is an illegal one.

The authentication-process unit 1056 may not authenticate the user of the client terminal 1002. In this case, the control unit 1050 transmits authentication-error information indicating the user cannot be authenticated to the client terminal 1002, first through the communications control unit 1052 and then through the network interface 1053.

The authentication-process unit 1056 may authenticate the user of the client terminal 1002. Then, it is determined that the authentication-session ID information received from the client terminal 1002 remains valid. The user of the client terminal 1002 is authenticated as a legal one. The authentication-ticket request signal transmitted from the client terminal 1002 is therefore considered to be legal.

If the authentication-process unit 1056 authenticates the user of the client terminal 1002, the control unit 1050 goes to Step SP1018.

In Step SP1014, the control unit 1023 of the client terminal 1002 receives the authentication-error information from the portal server 1003, first through the network interface 1033 and then through the communications control unit 1032. Then, the control unit 1023 reads the user ID information, the password information and the like, which are stored in the authentication-information storage unit 1038. The user ID information, the password information and the like are transmitted to the portal server 1003 through the communications control unit 1032 and the network interface 1033.

In Step SP1015, the control unit 1050 of the portal server 1003 receives the user ID information, the password information and the like from the client terminal 1002, through the network interface 1053 and the communications control unit 1052. The control unit 1050 supplies the user ID information, the password information and the like to the authentication-process unit 1056.

Controlled by the control unit 1050, the authentication-process unit 1056 performs the process of authenticating the user. More precisely, the unit 1056 determines whether the user ID information, the password information and the like it has received from the client terminal 1002 are contained in the client information that is registered in the client database unit 1054.

The authentication-process unit 1056 may determine that the user of the client terminal 1002 is a legal one. In this case, the unit 1056 issues authentication-session ID information and the like, under the control of the control unit 1050. The authentication-session ID information identifies the communication condition between the client terminal 1002 and the portal server 1003. The authentication-session ID information and the like, thus issued for the client terminal 1002, are temporarily stored in the authentication-information storage unit 1057.

The control unit 1050 then transmits the authentication-session ID information and the like, which have been issued for the client terminal 1002, to the client terminal 1002, first through the communications control unit 1052 and the network interface 1053.

In Step SP1016, the control unit 1023 of the client terminal 1002 receives the authentication-session ID information and the like from the portal server 1003, first through the network interface 1033 and then through the communications control unit 1032. The authentication-process unit 1037 writes the authentication-session ID information and the like into the authentication-information storage unit 1038. The unit 1038 temporarily stores the authentication-session ID information and the like.

The control unit 1023 generates an authentication-ticket request signal, requesting that the portal server 1003 should issue an authentication ticket again. The authentication-ticket request signal is transmitted to the portal server 1003 through the communications control unit 1032 and the network interface 1033, together with the shop code, the authentication-session ID information, and the like, all temporarily stored in the authentication-information storage unit 1038.

In the present embodiment, the shop code is temporarily stored in the authentication-information storage unit 1038. Nonetheless, the shop code can be transferred between the client terminal 1002 and the portal server 1003 to perform Steps SP1012 to SP1016. Thus, the shop code can be transmitted to the portal server 1003 in Step SP1016, without the necessity of temporarily storing the shop code in the authentication-information storage unit 1038 of the client terminal 1002.

In Step SP1017, the control unit 1050 of the portal server 1003 receives the authentication-ticket request signal, the shop code, the authentication-session ID information, and the like, from the client terminal 1002, first through the network interface 1053 and then through the communications control unit 1052. The control unit 1050 supplies them to the authentication-process unit 1056.

Controlled by the control unit 1050, the authentication-process unit 1056 performs the process of authenticating the user of the client terminal 1002. To be more specific, the unit 1056 compares the authentication-session ID information and the like it has just received from the client terminal 1002, with the authentication-session ID information and the like that are temporarily stored in the authentication-information storage unit 1057.

The authentication-process unit 1056 may authenticate the user as a legal one because the authentication-session ID information and the like, both received from the client terminal 1002, are still valid. If this is the case, the unit 1056 determines that the authentication-ticket request signal transmitted from the client terminal 1002 is justifiable.

When the authentication-process unit 1056 authenticates the user as a legal one, the control unit 1050 goes to the next step, Step SP1018.

In Step SP1018, controlled by the unit 1050, the authentication-process unit 1056 issues an authentication ticket and the like as portal-authentication result information in accordance with the shop code and authentication-ticket request signal it has received from the client terminal 1002 in Step SP1017. The authentication ticket and the like enable the client terminal 1002 to access the music-data distributing server 1004.

Controlled by the control unit 1050, the authentication-process unit 1056 writes the authentication ticket and the like into the authentication-information storage unit 1057, thus temporarily storing them in this storage unit 1057. At the same time, the unit 1056 extends the validation term of the authentication-session ID information and the like that have been issued to the client terminal 1002.

The control unit 1050 transmits the authentication ticket and the like to the client terminal 1002, together with the authentication-session ID information and the like, whose validation term has been extended by the authentication-process unit 1056 through the communications control unit 1052 and the network interface 1053.

In Step SP1019, the control unit 1023 of the client terminal 1002 receives the authentication ticket, the authentication-session ID information, and the like, from the portal server 1003, first through the network interface 1033 and then through the communications control unit 1032. The control unit 1023 supplies the authentication-session ID information to the authentication-process unit 1037.

The control unit 1023 transmits the authentication ticket and the like it has received from the portal server 1003, together with an authentication request signal, to the music-data distributing server 1004, through the communications control unit 1032 and the network interface 1033.

Controlled by the control unit 1023, the authentication-process unit 1037 writes the authentication-session ID information and the like which have been transmitted from the portal server 1003 and whose validation term has been extended, over the authentication-session ID information and the like that are stored authentication-information storage unit 1038. In other words, the authentication-process unit 1037 updates, in the storage unit 1038, the authentication-session ID information and the like to those the validation term of which has been extended.

In Step SP1020, the control unit 1070 of the music-data distributing server 1004 receives the authentication request signal, the authentication ticket, and the like, from the client terminal 1002, first through the network interface 1073 and then through the communications control unit 1072.

The control unit 1070 transmits the authentication ticket, and the like received from the client terminal 1002, to the portal server 1003 through the communication control unit 1072 and the network interface 1073, together with an authentication-ticket confirmation request signal.

In Step SP1021, the control unit 1050 of the portal server 1003 receives the authentication-ticket confirmation request signal, the authentication ticket and the like from the music-data distributing server 1004, first through the network interface 1053 and then through the communications control unit 1052. The control unit 1050 supplies the authentication-ticket confirmation request signal, the authentication ticket and the like to the authentication-process unit 1056.

Controlled by the control unit 1050, the authentication-process unit 1056 performs the process of confirming the authentication ticket transmitted from the music-data distributing server 1004, in response to the authentication-ticket confirmation request signal. More correctly, the unit 1056 compares the authentication ticket and the like it has received from the music-data distributing server 1004, with the authentication ticket and the like, which are temporarily stored in the authentication-information storage unit 1057.

The authentication-process unit 1056 may confirm that the authentication ticket and the like, which have been received from the music-data distributing server 1004, is a legal one. In this case, the control unit 1050 generates a confirmation-result information indicating that the authentication ticket is a legal one. The confirmation-result information is transmitted to the music-data distributing server 1004, first through the communications control unit 1052 and then through the network interface 1053.

In Step SP1022, the control unit 1070 of the music-data distributing server 1004 receives the confirmation-result information from the portal server 1003, first through the network interface 1073 and then through the communications control unit 1072. The control unit 1070 supplies the confirmation-result information to the authentication-process unit 1075.

Controlled by the control unit 1070, the authentication-process unit 1075 issues a service-session ID information and the like as server-authentication result information in response to the confirmation-result information. The service-session ID information identifies the communication condition between the client terminal 1002 and the music-data distributing server 1004. The authentication-process unit 1075 writes the service-session. ID information and the like-into the authentication-information storage unit 1077, thus temporarily storing them in the authentication-information storage unit 1077.

Further, the control unit 1070 transmits the service-session ID information and the like to the client terminal 1002 through the communications control unit 1072 and the network interface 1073. Note that the service-session ID information and the like have been issued for the client terminal 1002.

In Step SP1023, the control unit 1023 of the client terminal 1002 receives the service-session ID information and the like from the music-data distributing server 1004, first through the network interface 1033 and then through the communications control unit 1032. The authentication-process unit 1037 writes the service-session ID information and the like into the authentication-information storage unit 1038, temporarily storing them in the storage unit 1038.

The control unit 1023 then receives a page-information request signal from the music-data distributing server 1004. The page-information request signal requests for page information that will be used to have music data distributed from the music-data distributing server 1004. The control unit 1023 transmits the page-information request signal to the music-data distributing server 1004 through the communication control unit 1032 and the network interface 1033, together with the service-session ID information and the like which are temporarily stored in the authentication-information storage unit 1038.

In Step SP1024, the control unit 1070 of the music-data distributing server 1004 receives the page-information request signal, the service-session ID information and the like from the client terminal 1002, first through the network interface 1073 and then through the communications control unit 1072. The control unit 1070 then supplies the service-session ID information and the like to the authentication-process unit 1075.

Controlled by the control unit 1070, the authentication-process unit 1075 compares the service-session ID information and the like received from the client terminal 1002 with the service-session ID information and the like that have been issued in Step SP1002 and temporarily stored into the authentication-information storage unit 1077. Thus, the unit 1075 performs the process of authenticating the user of the client terminal 1002.

The authentication-process unit 1075 may authenticate the user as a legal one because the service-session ID information and like received from the client terminal 1002 are still valid. If this is the case, the unit 1075 determines that the page-information request signal that has been transmitted from the client terminal 1002 and will be used to distribute music data is justifiable.

When the authentication-process unit 1075 authenticates that the user of the client terminal 1002 is a legal one, the control unit 1070 goes to the next step, Step SP1025.

In Step SP1025, the control unit-1070 reads the page information for distributing music data requested by the user from the page-information storage unit 1076. Further, the control unit 1070 causes the authentication-process unit 1075 to extend the validation term of the service-session ID information and the like issued to the client terminal 1002.

Then, the control unit 1070 transmits the page information for distributing music data read from the page-information storage unit 1076 to the client terminal 1002 through the communications control unit 1072 and the network interface 1073. The page information is transmitted to the client terminal 1002, together with the service-session ID information and the like whose validation term has been extended by the authentication-process unit 1075.

In Step SP1026, the control unit 1023 of the client terminal 1002 receives, through the network interface 1033 and communications control unit 1032, the page information transmitted from the music-data distributing server 1004 and also the service-session ID information and the like whose validation term has been extended. The control unit 1023 supplies the page information for use in distributing music data, to the page-information generating unit 1036. At the same time, the control unit 1023 transmits the service-session ID information and the like to the authentication-process unit 1037. Note that the service-session ID information and the like have been received from the music-data distributing server 1004.

Controlled by the control unit 1023, the authentication-process unit 1037 writes the service-session ID information and the like which have been transmitted from the music-data distributing server 1004 and whose validation term has been extended, over the service-session ID information and the like that are stored in authentication-information storage unit 1038. In other words, the authentication-process unit 1037 updates, in the storage unit 1038, the service-session ID information and the like to those the validation term of which has been extended.

The page-information generating unit 1036 generates video data from the page information for use in distributing music data. The video data thus generated is supplied to the display control unit 1024.

The display control unit 1024 performs digital-to-analog conversion on the video data received from the page-information generating unit 1036, generating an analog video signal. The analog video signal is supplied to the display unit 1025. The display unit 1025 displays a music-data distributing page that is represented by the analog video signal.

(3-7-3) Process of Providing the Music-Related Service

As described above with reference to FIG. 43, the process of authenticating the user is achieved between the client-terminal 1002, on the one hand, and the music-data distributing server 1004, physical-sales server 1005 and radio-data distributing server 1006, on the other hand. This process is followed by the process of providing a music-related service. In the process of providing a music-related service, the client terminal 1002 receives the music-data distributing service, the physical sales service, and the radio-broadcast information distribution service, by using the page information for distribution of music data, the page information for selling package media and the page information for distributing on-air list information that the client terminal 1002 has acquired from the music-data distributing server 1004, physical-sales server 1005 and radio-data distributing server 1006, respectively. The process of providing a music-related service will be explained, with reference to FIGS. 44 to 47.

(3-7-3-1) Sequence of the Music-Data Distributing Service

The music-data distributing service will be described first. In this service, the client terminal 1002 can receive music data distributed from the music-data distributing server 1004.

In Step SP1030, the control unit 1023 of the client terminal 1002 receives a control command input at the input-processing unit 1021 to select a part of the music-data distributing page displayed by the display unit 1025. In response to the control command, the control unit 1023 generates a download request signal that requests for the downloading of the music data the user wants.

The control unit 1023 transmits the download request signal to the music-data distributing server 1004 through the communication control unit 1032 and network interface 1033, together with the service-session ID information and the like, which have been issued by the music-data distributing server 1004 and which are temporarily stored in the authentication-information storage unit 1038.

In Step SP1031, the control unit 1070 of the music-data distributing server 1004 receives the download request signal from the client terminal 1002, the service-session ID information and the like from the client terminal 1002, first through the network interface 1073 and then through the communications control unit 1072. The control unit 1070 supplies the service-session ID information and the like to the authentication-process unit 1075.

Controlled by the control unit 1070, the authentication-process unit 1075 compares the service-session ID information and the like, which have been transmitted from the client terminal 1002, with the service-session ID information and the like that are temporarily stored in the authentication-information storage unit 1077. Thus, the authentication-process unit 1075 carries out the process of authenticating the user of the client terminal 1002.

The authentication-process unit 1075 may determine that the user who has operated the client terminal 1002, demanding that the music data be downloaded into the terminal 1002, is a legal user. In this case, the control unit 1070 goes to the next step, Step SP1032.

In Step SP1032, the retrieval unit 1079 retrieves the music data item the user desires, from the music data items that are stored in the music-data storage unit 1078, in accordance with the retrieval key contained in the download request signal. It should be noted that the music data item retrieved accords with the retrieval condition that the retrieval key describes.

When the retrieval unit 1079 retrieves the music data item the user desires, the control unit 1070 causes the authentication-process unit 1075 to extend the validation term of the service-session ID information and the like issued to the client terminal 1002. The control unit 1070 then goes to the next step, i.e., Step SP1033.

In Step SP1033, the control unit 1070 reads from the music-data storage unit 1078 the music data that has been retrieved by the retrieval unit 1079 and that should be downloaded into the client terminal 1002. Further, the control unit 1070 transmits the music data thus read from the storage unit 1078 to the client terminal 1002, first through the communications control unit 1072 and then through the network interface 1073, along with the service-session ID information and the like whose validation term has been extended by the authentication-process unit 1075.

In Step SP1034, the control unit 1023 of the client terminal 1002 receives the music data from the music-data distributing server 1004, together with the service-session ID information and the like whose validation term has been extended, first through the network interface 1033 and then through the communications control unit 1032. The control unit 1023 writes the music data into the storage medium 1029. At the same time, the control unit 1023 supplies the service-session ID information and the like, which have been received from the music-data distributing server 1004, to the authentication-process unit 1037.

Controlled by the control unit 1023, the authentication-process unit 1037 writes the service-session ID information and the like which have been transmitted from the music-data distributing server 1004 and whose validation term has been extended, over the service-session ID information and the like that are stored in authentication-information storage unit 1038. The authentication-process unit 1037 therefore updates, in the storage unit 1038, the service-session ID information and the like to those the validation term of which has been extended.

Thus, the client terminal 1002 can download the music data desired by the user, utilizing the music-data distributing service the music-data distributing server 1004 provides.

(3-7-3-2) Sequence of the Physical Sales Service

Figure 45:
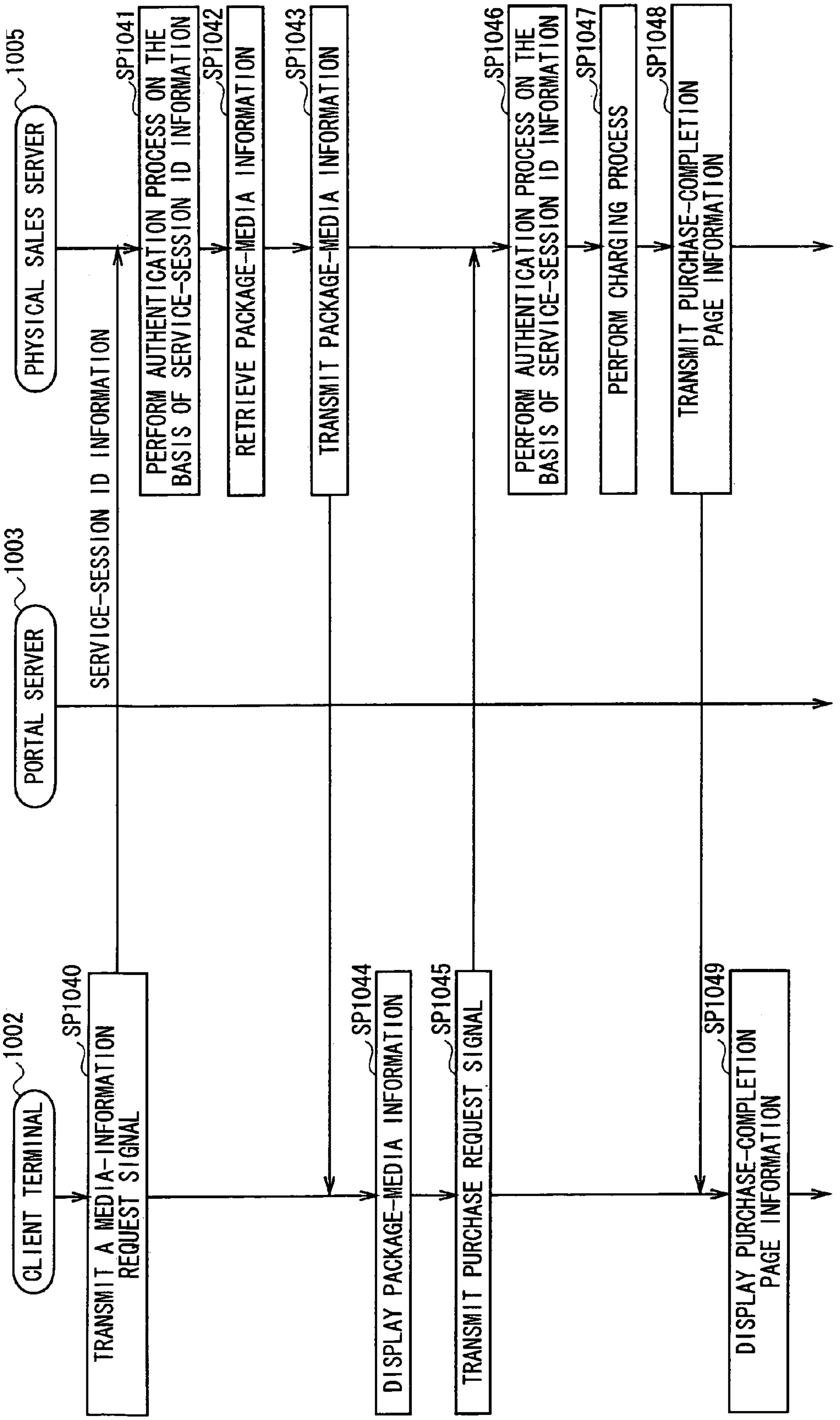
FIG. 45 is a sequence chart representing the sequence of providing the sales service.

The physical sales service will be described, in which the client terminal 1002 can receive a physical sales service from the physical-sales server 1005, with reference to FIG. 45.

In Step SP1040, the control unit 1023 of the client terminal 1002 receives a control command input at the input-processing unit 1021 to select a part of the package-media sales page displayed by the display unit 1025. In response to the control command, the control unit 1023 generates a media-information request signal that requests for the package-media information about the package medium designated by the control command input.

The control unit 1023 transmits the media-information request signal to the physical-sales server 1005 through the communication control unit 1032 and network interface 1033, together with the service-session ID information and the like, which have been issued by the physical-sales server 1005 and which are temporarily stored in the authentication-information storage unit 1038.

In Step SP1041, the control unit 1090 of the physical-sales server 1005 receives the media-information request signal from the client terminal 1002, the service-session ID information and the like, first through the network interface 1093 and then through the communications control unit 1092. The control unit 1090 supplies the service-session ID information and the like to the authentication-process unit 1095.

Controlled by the control unit 1090, the authentication-process unit 1095 compares the service-session ID information and the like, which have been transmitted from the client terminal 1002, with the service-session ID information and the like that are temporarily stored in the authentication-information storage unit 1097. Thus, the authentication-process unit 1095 carries out the process of authenticating the user of the client terminal 1002.

The authentication-process unit 1095 may determine that the user who has operated the client terminal 1002, demanding that the package-media information be downloaded into the terminal 1002, is a legal user. In this case, the control unit 1090 goes to the next step, Step SP1042.

In Step SP1042, the retrieval unit 1099 retrieves one of the package-media information item the user desires, from the package-media information items in the package-media-information storage unit 1098, in accordance with the retrieval key contained in the media-information request signal. It should be noted that the package-media information item retrieved accords with the retrieval condition the retrieval key describes.

When the retrieval unit 1099 retrieves the package-media information item, the control unit 1090 causes the authentication-process unit 1095 to extend the validation term of the service-session ID information and the like issued to the client terminal 1002. The control unit 1090 then goes to the next step, i.e., Step SP1043.

In Step SP1043, the control unit 1090 reads from the package-media-information storage unit 1098 the package-media information item that has been retrieved by the retrieval unit 1099. Further, the control unit 1090 transmits the package-media information item thus read to the client terminal 1002, first through the communications control unit 1092 and then through the network interface 1093, along with the service-session ID information and the like whose validation term has been extended by the authentication-process unit 1095.

In Step SP1044, the control unit 1023 of the client terminal 1002 receives the package-media information from the physical-sales server 1005, together with the service-session ID information and the like whose validation term has been extended, first through the network interface 1033 and then through the communications control unit 1032. The control unit 1023 supplies the package-media information to the page-information generating unit 1036. Further, the control unit 1023 supplies the service-session ID information and the like, which have been received from the physical-sales server 1005, to the authentication-process unit 1037.

Controlled by the control unit 1023, the authentication-process unit 1037 writes the service-session ID information and the like which have been transmitted from the physical-sales server 1005 and whose validation term has been extended, over the service-session ID information and the like that are stored authentication-information storage unit 1038. Therefore, the authentication-process unit 1037 updates, in the storage unit 1038, the service-session ID information and the like to those the validation term of which has been extended.

The page-information generating unit 1036 generates video data from the package-media information supplied from the control unit 1023. The video data is supplied to the display control unit 1024. The display control unit 1024 performs digital-to-analog conversion on the video data, generating an analog video signal. The analog video signal is supplied to the display unit 1025.

Thus, the control unit 1023 causes the display unit 1025 to display package-media information that is represented by the analog video signal. Then, the control unit 1023 goes to the next step, i.e., Step SP1045.

In Step SP1045, the control unit 1023 receives a control command input at the input-processing unit 1021, to buy the package medium identified by the package-media information displayed by the display unit 1025. In response to the control command, the control unit 1023 generates a purchase request signal that requests for buying the package medium.

The control unit 1023 transmits the purchase request signal to the physical-sales server 1005, first through the communication control unit 1032 and then through the network interface 1033, together with the service-session ID information and the like which has been transmitted from the physical-sales server 1005, which is temporarily stored in the authentication-information storage unit 1038 and the validation term of which has been extended.

In Step SP1046, the control unit 1090 of the physical-sales server 1005 receives the purchase request signal, the service-session ID information and the like from the client terminal 1002, first through the network interface 1093 and then through the communication control unit 1092. The control unit 1090 supplies the service-session ID information and the like to the authentication-process unit 1095.

Controlled by the control unit 1090, the authentication-process unit 1095 compares the service-session ID information and the like, which have been transmitted from the client terminal 1002, with the service-session ID information and the like that are temporarily stored in the authentication-information storage unit 1097. Thus, the authentication-process unit 1095 carries out the process of authenticating the user of the client terminal 1002.

The authentication-process unit 1095 may determine that the user, who has operated the client terminal 1002, demanding the purchase of the package medium, is a legal user. In this case, the control unit 1090 goes to the next step, Step SP1047.

In Step SP1047, the control unit 1090 transmits charge information to the charging server 1008, first though the communications control unit 1092 and then through the network interface 1093. The charge information will be used to deliver the package medium to the user of the client terminal 1002 and to charge the amount for the package medium the use is to buy. Upon receipt of the charge information, the charging server 1008 performs the process of charging the user for the purchase of the package medium.

Further, the control unit 1090 makes the authentication-process unit 1095 extend the validation term of the service-session ID information and the like, which have been issued to the client terminal 1002.

In Step SP1048, the control unit 1090 transmits purchase-completion page information to the client terminal 1002, first through the communication control unit 1092 and then through the network interface 1093, together with the service-session ID information and the like whose validation term has been extended by the authentication-process unit 1095. It should be noted that the purchase-completion page information shows that the user has bought the package medium.

In Step SP1049, the control unit 1023 of the client terminal 1002 receives the purchase-completion page information from the physical-sales server 1005, first through the network interface 1033 and then through the communications control unit 1032, together with the service-session ID information and the like whose validation term has been extended. The control unit 1023 supplies the purchase-completion page information to the page-information generating unit 1036. At the same time, the control unit 1023 supplies the service-session ID information and the like to the authentication-process unit 1037.

Controlled by the control unit 1023, the authentication-process unit 1037 writes the service-session ID information and the like which have been transmitted from the physical-sales server 1005 and whose validation term has been extended, over the service-session ID information and the like that are stored in the authentication-information storage unit 1038. Namely, the authentication-process unit 1037 updates, in the storage unit 1038, the service-session ID information and the like to those the validation term of which has been extended.

The page-information generating unit 1036 generates video data from the purchase-completion page information received from the control unit 1023. The video data thus generated is supplied to the display control unit 1024. The display control unit 1024 performs digital-to-analog conversion on the video data, generating an analog video signal. The analog video signal is supplied to the display unit 1025.

The control unit 1023 causes the display unit 1025 to display the purchase-completion page that is represented by the analog video signal.

Thus, the client terminal 1002 utilizes the physical-sales service the physical-sales server 1005 provides, enabling the user to purchase any package media that he or she wants.

(3-7-3-3) Sequence of Distributing the On-Air List Information

The service of distributing on-air list information will be described with reference to FIG. 46, in which the client terminal 1002 can receive on-air list information, as radio broadcast information distributed from the radio-data distributing server 1006.

In Step SP1060, the control unit 1023 of the client terminal 1002 generates an on-air list request signal that requests that desired on-air list information be downloaded into the client terminal 1002. The control unit 1023 generates this request signal in response to a control command input at the input-processing unit 1021 when a retrieval key is input in the input box on the page of on-air list information distribution, which is displayed by the display unit 1025.

The control unit 1023 transmits the on-air list request signal to the radio-data distributing server 1006, first through the communications control unit 1032 and then through the network interface 1033, together with the service-session ID information and the like. It should be noted that the service-session ID information and the like have been issued by the radio-data distributing server 1006 and are temporarily stored in the authentication-information storage unit 1038.

In Step SP1061, the control unit 1110 of the radio-data distributing server 1006 receives the on-air list request signal, the service-session ID information and the like from the client terminal 1002, first through the network interface 1113 and then through the communications control unit 1112. The control unit 1110 supplies the service-session ID information and the like to the authentication-process unit 1115.

Controlled by the control unit 1110, the authentication-process unit 1115 compares the service-session ID information and the like received from the client terminal 1002, with the service-session ID information and the like that are temporarily stored in the authentication-information storage unit 1120. Thus, the authentication-process unit 1115 performs the process of authenticating the user of the client terminal 1002.

The authentication-process unit 1115 may determine that the user who has operated the client terminal 1002 to request for the on-air list information is a legal one. In this case, the control unit 1110 goes to the next step, i.e., Step SP1062.

In Step SP1062, the retrieval unit 1118 retrieves, from the on-air list storage unit 1117, that part of the on-air list information which meets the retrieval condition defined by the retrieval key contained in the on-air list request signal.

When the retrieval unit 1118 retrieves the part of the on-air list information, the control unit 1110 causes the authentication-process unit 1115 to extend the validation term of the service-session ID information and the like that have been issued to the client terminal 1002. The control unit 1110 then goes to the next step, i.e., Step SP1063.

In Step SP1063, the control unit 1110 reads the on-air list information retrieved by the retrieval unit 1118, from the on-air list storage unit 1117. The control unit 1110 then supplies the on-air list information to the client terminal 1002, first through the communication control unit 1112 and then through the network interface 1113, along with the service-session ID information and the like whose validation term has been extended.

In Step SP1064, the control unit 1023 of the client terminal 1002 receives the on-air list information from the radio-data distributing server 1006, first through the network interface 1033 and then through the communications control unit 1032, together with the service-session ID information and the like whose validation term has been extended. The control unit 1023 transmits the on-air list information to the page-information generating unit 1036. At the same time, the control unit 1023 transmits the service-session ID information and the like received from the radio-data distributing server 1006, to the authentication-process unit 1037.

Controlled by the control unit 1023, the authentication-process unit 1037 writes the service-session ID information and the like which have been transmitted from the radio-data distributing server 1006 and whose validation term has been extended, over the service-session ID information and the like that are stored in the authentication-information storage unit 1038. That is, the authentication-process unit 1037 updates, in the storage unit 1038, the service-session ID information and the like to those the validation term of which has been extended.

The page-information generating unit 1036 generates video data from the on-air list information supplied from the control unit 1023. The video data thus generated is supplied to the display control unit 1024. The display control unit 1024 performs digital-to-analog conversion on the video data, generating an analog video signal. The analog video signal is supplied to the display unit 1025. The display unit 1025 displays the on-air list information represented by the analog video signal.

Thus, the client terminal 1002 utilizes the radio-broadcast information distribution service that the radio-data distributing server 1006 provides, enabling the user to obtain any on-air list information he or she wants.

(3-7-3-4) Sequence of Distributing the Now-On-Air Information

The service of distributing now-on-air information will be described with reference to FIG. 47, in which the client terminal 1002 can receive on-air list information, as radio broadcast information distributed from the radio-data distributing server 1006.

The radio-data distributing server 1006 that provides now-on-air information is installed in each radio station (that is, for each call sign).

In the initial state, the client terminal 1002 may not store the URL information about the radio-data distributing server 1006 of each radio station.

Therefore, the sequence of distributing the now-on-air information will be described on the assumption that the portal server 1003 manages the URL information about the radio-data distributing server 1006 of each radio station, in association with the call sign of the radio station.

It is also assumed that, in the sequence of distributing the now-on-air information, the authentication-information storage unit 1038 does not store the authentication-session ID information or the like when the client terminal 1002 requests that the portal server 1003 should give it the broadcast frequency data so that it may automatically preset the broadcast frequency of each radio station. Hence, the client terminal 1002 first transmits the user ID information, the password information and the like to the portal server 1003.

In Step SP1070, the control unit 1023 of the client terminal 1002 receives an operation command that the user has input at the input-processing unit 1021 to preset the broadcast frequency of each radio station. In response to the operation command, the control unit 1023 transmits a frequency-information request signal to the portal server 1003, first through the communications control unit 1032 and then through the network interface 1033. The frequency-information request signal, which requests for the frequency information representing the broadcast frequency of the radio station, is transmitted together with the user ID information, the password information, and the like.

In Step SP1071, the control unit 1050 of the portal server 1003 receives the frequency-information request signal, the area code, the user ID information, the password information and the like, all transmitted from the client terminal 1002, first through the network interface 1053 and then through the communications control unit 1052. The control unit 1050 supplies the user ID information, the password information and the like, which have been received from the client terminal 1002, to the authentication-process unit 1056.

Controlled by the control unit 1050, the authentication-process unit 1056 compares the user ID information, the password information and the like, all received from the client terminal 1002, with the client information that is registered in the client database unit 1054. The authentication-process unit 1056 thus carries out the process of authenticating the user of the client terminal 1002.

The authentication-process unit 1056 may determine that the user of the client terminal 1002 is a legal one and the frequency-information request signal transmitted from the client terminal 1002 is justifiable. In this case, the authentication-process unit 1056 issues an authentication-session ID information and the like, which identifies the communication condition between the client terminal 1002 and the portal server 1003, under the control of the control unit 1050. The authentication-session ID information and the like, thus issued, are temporarily stored in the authentication-information storage unit 1057.

When the authentication-process unit 1056 determines that the user of the client terminal 1002 is a legal one, the control unit 1050 goes to the next step, i.e., Step SP1072.

In Step SP1072, the control unit 1050 retrieves the frequency information items, the names of radio stations and the call signs, all pertaining to the area code received from the client terminal 1002, from the frequency-information storage unit 1058. The frequency data items, the names of radio stations, and the call signs are read in the form of a list.

The control unit 1050 transmits the list of frequency information items, radio-station names and call signs, which have been read from the frequency-information storage unit 1058, to the client terminal 1002, first through the communications control unit 1052 and then through the network interface 1053. The list is transmitted to the client terminal 1002, together with the authentication-session ID information and the like that the authentication-process unit 1056 has issued in Step SP1071 to the client terminal 1002.

In Step SP1073, the control unit 1023 of the client terminal 1002 receives the frequency information items, the names of radio stations, the call-sign list, the authentication ID information, and the like from the portal server 1003, first through the network interface 1033 and then through the communications control unit 1032. The control unit 1023 supplies the authentication-session ID information and the like received from the portal server 1003, to the authentication-process unit 1037. Further, the control unit 1023 supplies the frequency information items, the names of radio stations, and the call-sign list to the display control unit 1024.

Controlled by the control unit 1023, the authentication-process unit 1037 writes the authentication-session ID information and the like into the authentication-information storage unit 1038. Thus, the storage unit 1038 temporarily stores the authentication-session ID information and the like.

The display control unit 1024 supplies the frequency information items, the names of radio stations, and the call-sign list, all received from the control unit 1023, to the display unit 1025. The display unit 1025 displays the list of the frequency information items, radio-station names and call signs.

When a selection command is input at the input-processing unit 1021, the control unit 1023 writes the frequency information item, radio-station name and call sign, which are selected by the user, into the storage medium 1029, thus presetting these values. Then, the control unit 1023 goes to the next step, i.e., Step SP1074.

In Step SP1074, the control unit 1023 controls the tuner unit 1031 in accordance with the turning-control command input at the input-processing unit 1021. That is, the control unit 1023 causes the tuner unit 1031 to extract, from the radio broadcast waves, the radio signal broadcast at the broadcast frequency that corresponds to the turning-control command.

The tuner unit 1031 decodes the radio signal broadcast at that frequency, generating audio data. The audio data is supplied to the audio control unit 1026.

The audio control unit 1026 converts the audio data supplied from the tuner section 1031, to an analog audio signal. The analog audio signal is supplied to the speaker 1027. The speaker 1027 generates sound from the analog audio signal. The user can therefore listen to the radio program he or she has selected.

In Step SP1075, the radio-broadcast display control unit 1039 is controlled by the control unit 1023, reading the call sign stored in the storage medium 1029 and associated with the frequency information representing the broadcast frequency that corresponds to the tuning-control command. The radio-broadcast display control unit 1039 transmits the call sign to the portal server 1003, together with the authentication-session ID information and the like that are temporarily stored in the storage unit 1038, first through the communications control unit 1032 and then through the network interface 1033.

In Step SP1076, the control unit 1050 of the portal server 1003 receives the call sign, the authentication-session ID information, and the like, all transmitted from the client terminal 1002, first through the network interface 1053 and then through the communications control unit 1052. The control unit 1050 then supplies the authentication-session ID information and the like to the authentication-process unit 1056.

Controlled by the control unit 1050, the authentication-process unit 1056 compares the authentication-session ID information and the like received from the client terminal 1002, with the authentication-session ID information and the like that are temporarily stored in the authentication-information storage unit 1057. The authentication-process unit 1056 carries out the process of authenticating the user of the client terminal 1002.

The authentication-process unit 1056 may determine that the authentication-session ID information and the like received from the client terminal 1002 are still valid and that the user who has operated the client terminal 1002 to transmit the call sign is a legal one. If this is the case, the control unit 1050 goes to the next step, i.e., Step SP1077.

In Step SP1077, the control unit 1050 selects and retrieves one of the URL information items stored in the URL storage unit 1059, which is associated with the call sign received from the client terminal 1002.

The control unit 1050 causes the authentication-process unit 1056 to extend the validation term of the authentication-session ID information and the like which have been issued to the client terminal 1002.

The control unit 1050 then reads the URL information retrieved, from the URL storage unit 1059. The control unit 1050 transmits the URL information to the client terminal 1002 through the communications control unit 1052 and the network interface 1053, together with the authentication-session ID information and the like whose validation term has been extended.

In Step SP1078, the control unit 1023 of the client terminal 1002 receives the URL information, and the authentication-session ID information and the like whose validation term has been extended, from the portal server 1003, first through the network interface 1033 and then through the communications control unit 1032. The authentication-session ID information and the like are supplied to the authentication-process unit 1037, and the ULR information are supplied to the radio-broadcast display control unit 1039.

Controlled by the control unit 1023, the authentication-process unit 1037 writes the authentication-session ID information and the like which have been transmitted from the portal server 1003 and whose validation term has been extended, over the authentication-session ID information and the like that are stored in the authentication-information storage unit 1038. That is, the authentication-process unit 1037 updates, in the storage unit 1038, the authentication-session ID information and the like to those the validation term of which has been extended.

Controlled by the control unit 1023, the radio-broadcast display control unit 1039 writes the URL information supplied from the control unit 1023, into, for example, the storage medium 1029. The storage medium 1029 temporarily stores the URL information in association with the call sign.

Controlled by the control unit 1023, the radio-broadcast display control unit 1039 transmits a now-on-air information request signal to the radio-data distributing server 1006 in accordance with the URL information temporarily stored in, for example, the storage medium 1029. The now-on-air information request signal is transmitted to the radio-data distributing server 1006, first through the communications control unit 1032 and then through the network interface 1.033, together with the service-session ID information and the like that have been transmitted from the radio-data distributing server 1006 and are now temporarily stored in the authentication-information storage unit 1038.

In the process of distributing the now-on-air information, the process (Step SP1078) of transmitting the now-on-air information request signal, the service-session ID information and the like from the client terminal 1002 to the radio-data distributing server 1006 corresponds to Step SP1010 that has been described with reference to FIG. 43.

Figure 43:
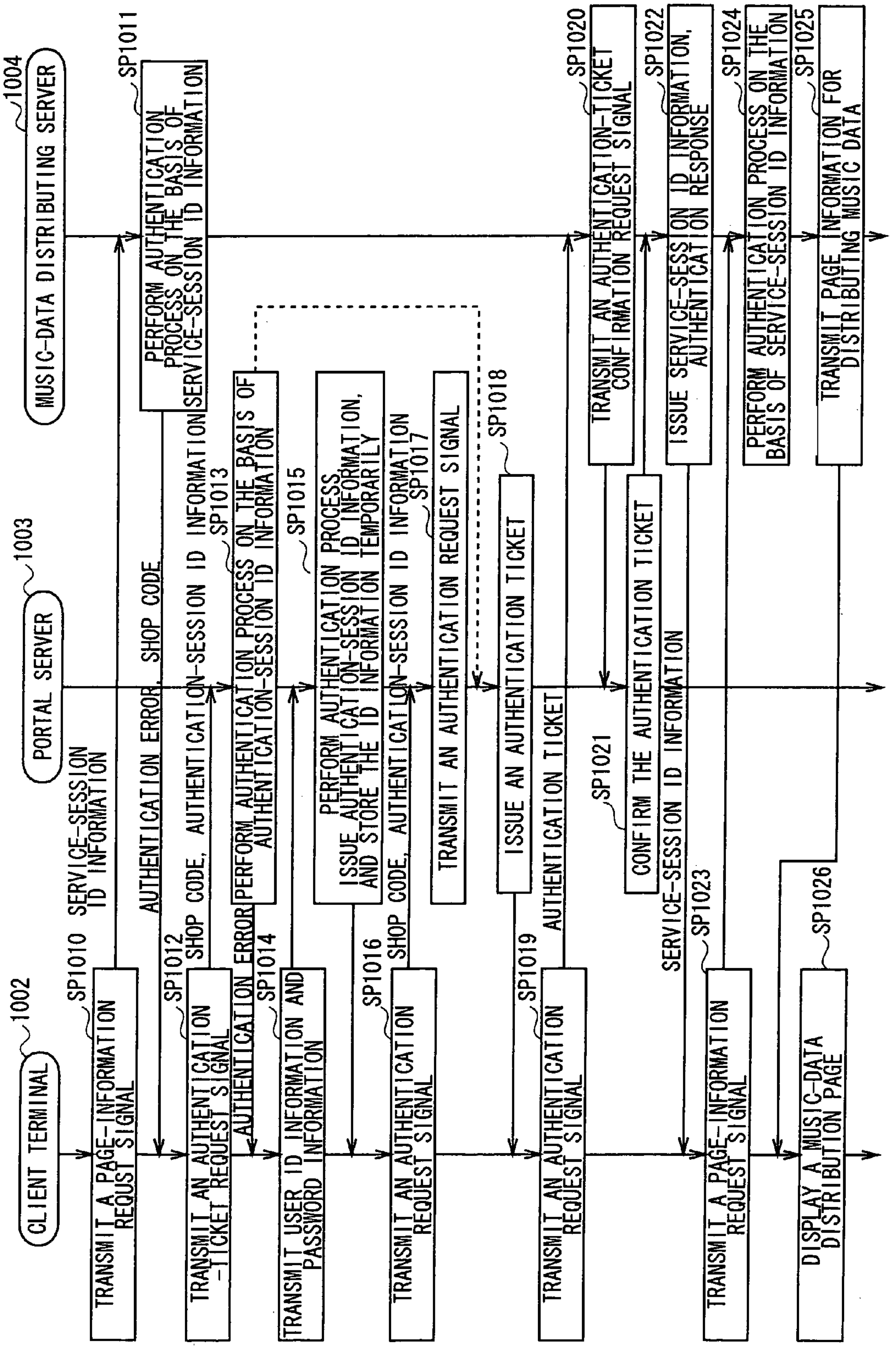
FIG. 43 is a sequence chart illustrating the sequence of verifying the user, accomplished between the client terminal and the music-data distributing server.
Figure 44:
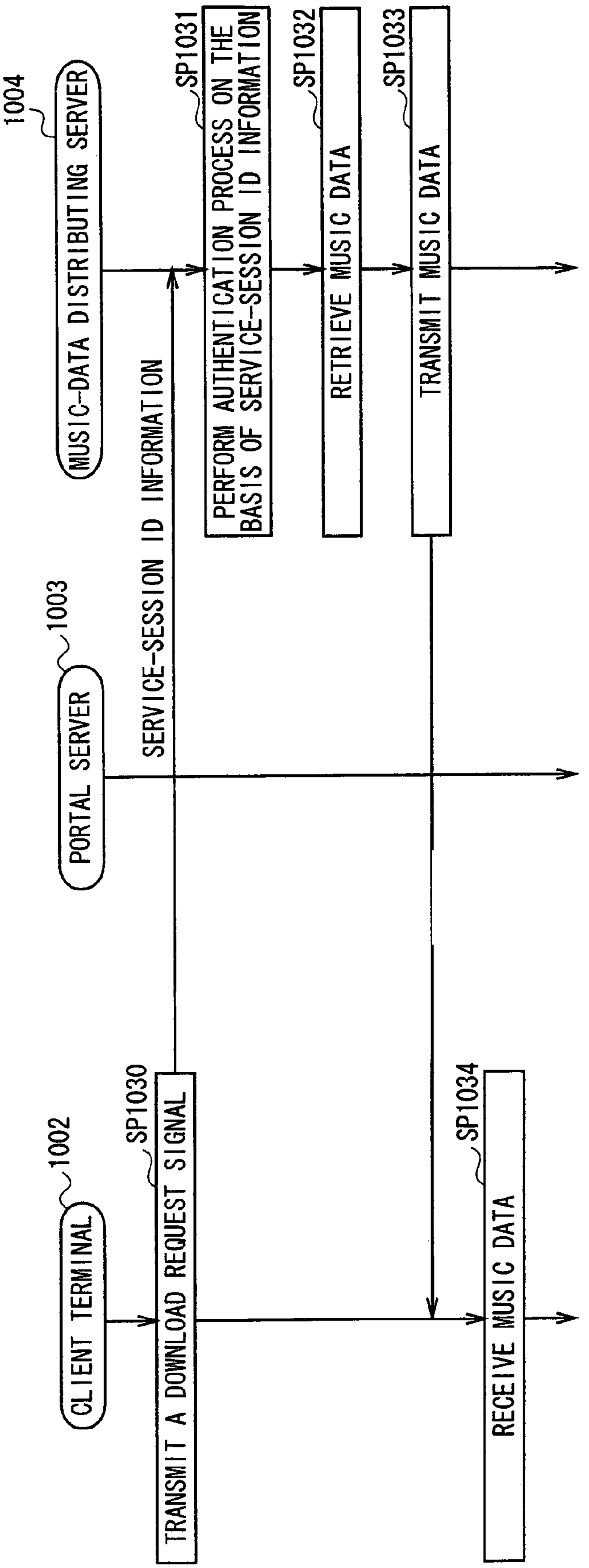
FIG. 44 is a sequence chart representing the sequence of distributing music data.

Hence, in the sequence of distributing radio-broadcast information, the process of authenticating the user, which is similar to Steps SP1011 to SP1013 and Steps SP1018 to SP1022 shown in FIG. 43, is carried out in the client terminal 1002, radio-data distributing server 1006 and portal server 1003 after the process of Step SP1078. Thereafter, the operation goes to Step SP1079.

In Step SP1079, the control unit 1023 of the client terminal 1002 controls the radio-broadcast display control unit 1039, causing the unit 1039 to transmit the now-on-air information request signal to the radio-data distributing server 1006 in accordance with the URL information temporarily stored in, for example, the storage medium 1029. The now-on-air information request signal is transmitted to the server 1006, first through the communication control unit 1032 and then through the network interface 1033, together with the service-session ID information and the like that have been received from the radio-data distributing server 1006 and are now temporarily stored in the authentication-information storage unit 1038.

In Step SP1080, the control unit 1110 of the radio-data distributing server 1006 receives the now-on-air information request signal, the service-session ID information and the like from the client terminal 1002, first through the network interface 1113 and then through the communications control unit 1112. The control unit 1110 supplies the authentication-session ID information and the like to the authentication-process unit 1115.

Controlled by the control unit 1110, the authentication-process unit 1115 compares the service-session ID information and the like received from the client terminal 1002, with the service-session ID information and the like that are temporarily stored in the authentication-information storage unit 1120. Thus, the authentication-process unit 1115 carries out the process of authenticating the user of the client terminal 1002.

The authentication-process unit 1115 may determine that the user of the client terminal 1002 is a legal one. In this case, the unit 1115 determines that now-on-air information request signal transmitted from the client terminal 1002 is justifiable.

When the authentication-process unit 1115 determines that the user of the client terminal 1002 is a legal one, the control unit 1110 causes the authentication-process unit 1115 to extend the validation term of the service-session ID information and the like issued to the client terminal 1002. The control unit 1110 then goes to the next step, i.e., Step SP1081.

In Step SP1081, the control unit 1110 reads the now-on-air information from the now-on-air information storage unit 1119. The control unit 1110 then transmits the now-on-air information to the client terminal 1002, first through the communications control unit 1112 and then through the network interface 1113, along with the service-session ID information and the like whose validation term has been extended by the authentication-process unit 1115.

In Step SP1082, the control unit 1023 of the client terminal 1002 receives the now-on-air information, and the service-session ID information and the like, whose validation term has been extended, from the radio-data distributing server 1006, first through the network interface 1033 and then through the communications control unit 1032. The control unit 1023 supplies the service-session ID information and the like to the authentication-process unit 1037, and the now-on-air information to the radio-broadcast display control unit 1039.

Controlled by the control unit 1023, the authentication-process unit 1037 writes the service-session ID information and the like which has been transmitted from the radio-data distributing server 1006 and whose validation term has been extended, over the service-session ID information and the like that are temporarily stored in the authentication-information storage unit 1038. That is, the authentication-process unit 1037 updates, in the storage unit 1038, the service-session ID information and the like to those the validation term of which has been extended.

The radio-broadcast display control unit 1039 supplies the now-on-air information received from the control unit 1023, to the display unit 1025 through the display control unit 1024. The display unit 1025 displays the now-on-air information about the radio programs that the client terminal 1002 is receiving.

In the sequence of distributing radio-broadcast information, the client terminal 1002 thereafter repeats the process of transmitting the now-on-air information request signal in Step SP1079 at specific intervals. Moreover, the radio-data distributing server 1006 performs Steps SP1080 and SP1081 in response at the request of the client terminal 1002.

Thus, the display unit 1025 of the client terminal 1002 can display the now-on-air information, which is updated from time to time and which shows the name, on-air start time and on-air end time of each radio program and also the title of the musical piece being broadcast in the program, the name of the artist who plays the musical piece, the on-air start time of the musical piece, and the like.

Figure 46:
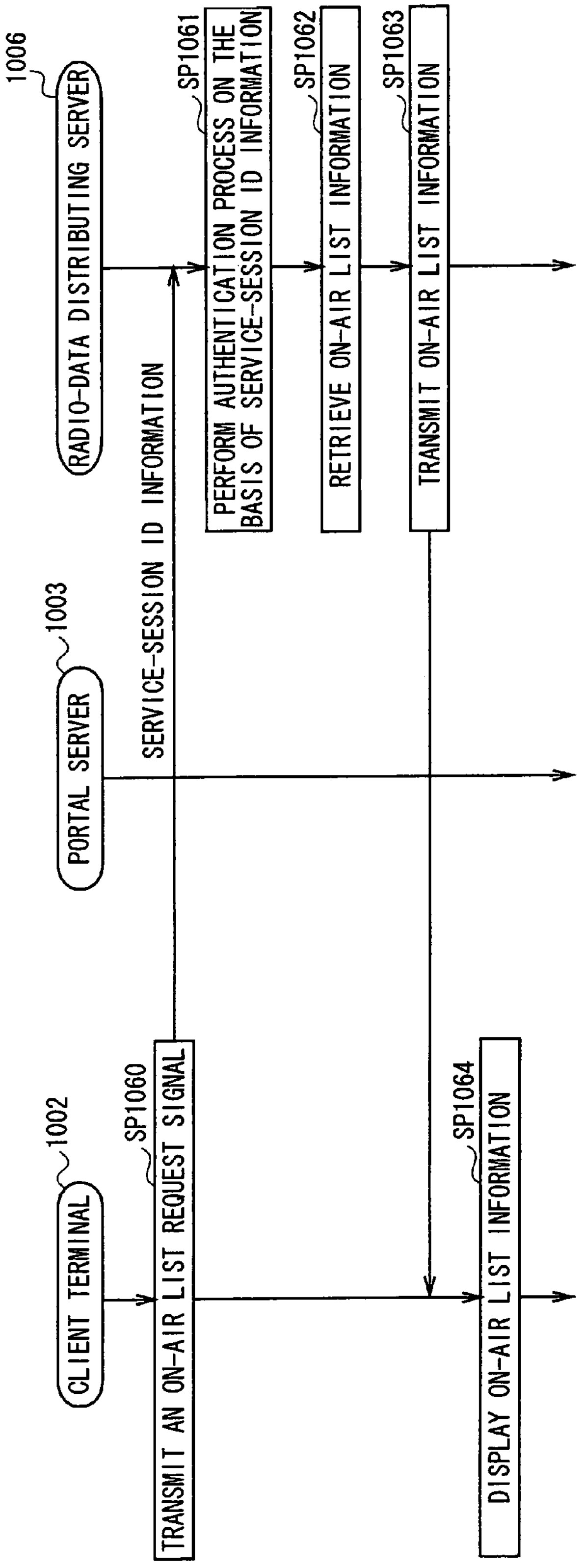
FIG. 46 is a sequence chart representing the sequence (1) of providing the radio-broadcasting information (on-air list).

In the present embodiment, the sequence chart of FIG. 46 corresponds to the service of providing now-on-air, which the broadcast-station server 32 performs in the first embodiment.

Figure 47:
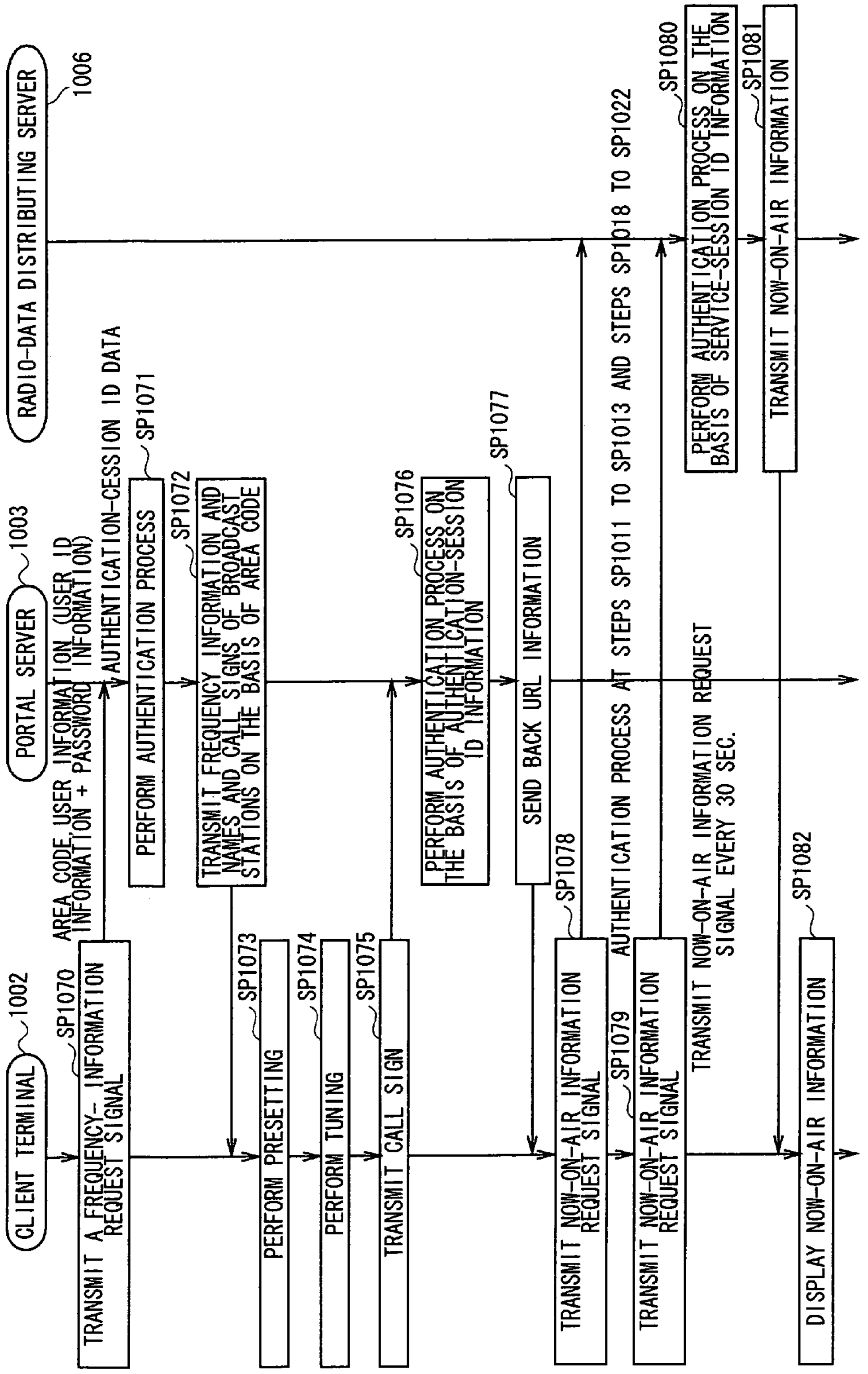
FIG. 47 is a sequence chart representing the sequence (2) of providing the radio-broadcasting information (now-on-air information).

In the sequence chart of FIG. 47, Steps SP1078 to SP1082 correspond to the items described in the claims of the present application.

Configured as described above, the music-related service providing system 1000 can reliably authenticate the user who has been registered to receive the music-related services offered by the system 1000. If the user is thus authenticated, the client terminal 2 that the user uses can acquire the information related to the content such as a musical piece contained in the information (now-on-air information or on-air list information) broadcast by, for example, radio.

Thus, in the music-related service providing system 1000, any third party is reliably prevented from acquiring the related information and illegally using the related information.

In the second embodiment, the client terminal 1002 is equivalent to the information-recording apparatus 1 of this invention and the terminal apparatus 10 according to the first embodiment. The portal server 1003 described with reference to FIG. 38 is equivalent to the integrated service server 36 used in the first embodiment. Further, the radio-data distributing server 1006 described with reference to FIG. 41 is equivalent to the broadcast-station server 32 used in the first embodiment.

Figure 39:
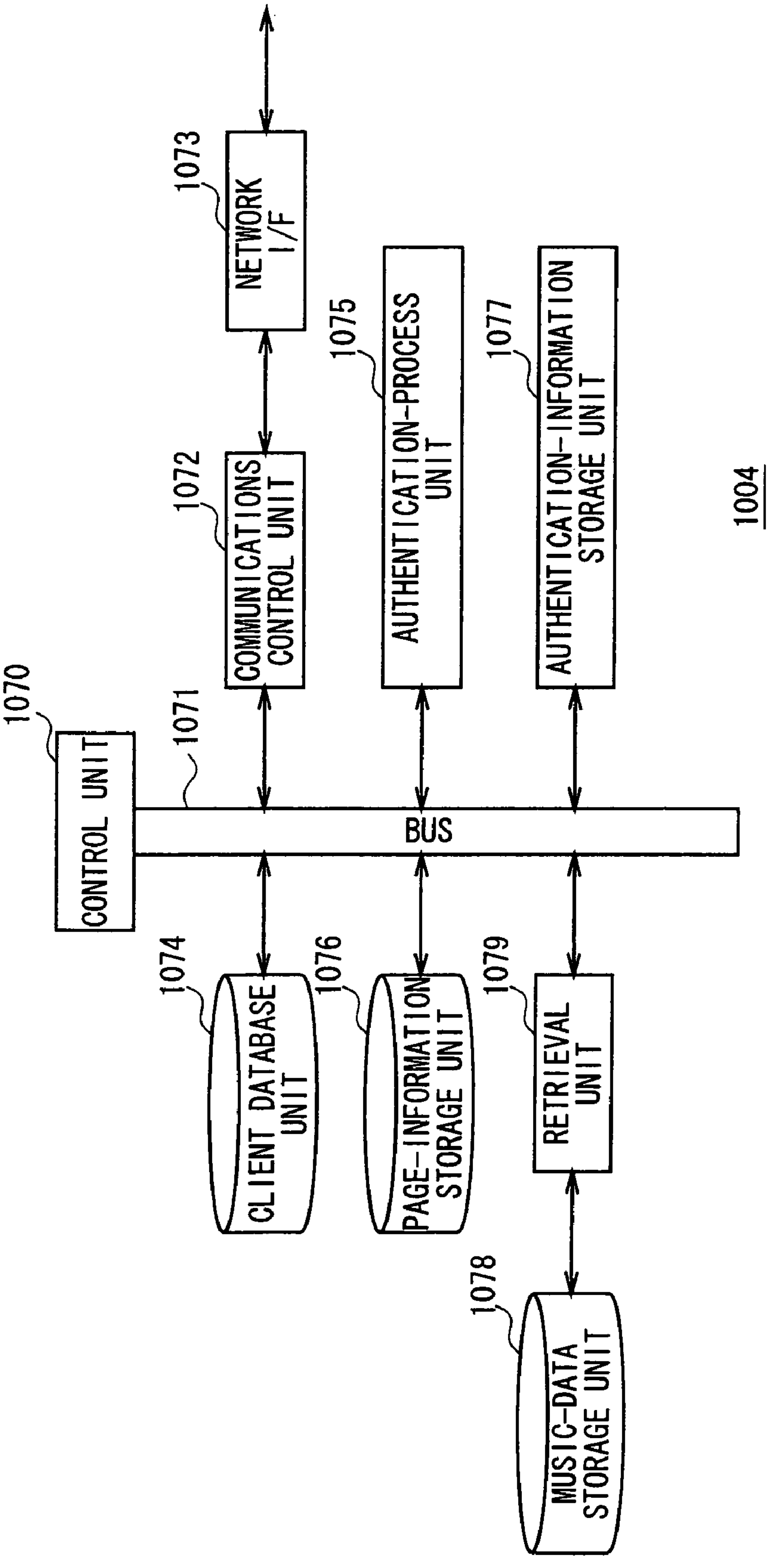
FIG. 39 is a block diagram of the hardware configuration of a music-data distributing server, showing the function circuits constituting this server.

In addition, the music-data distributing server 1004 described with reference to FIG. 39 is equivalent to the music distributing server 33 used in the first embodiment. The physical-sales server 1005 described with reference to FIG. 40 is equivalent to the CD-shop server 34 used in the first embodiment.

Of the program modules incorporated in the terminal apparatus 10 shown in FIG. 6, the HTTP message program 111 and the communicator program 112 can perform functions that are similar to the those of the communications control unit 1032 provided in the client terminal 1002 described with reference to FIG. 36.

The content-playback module 113 is a program module that can perform a function similar to that of the encoder/decoder unit 1034 incorporated in the client terminal 1002 described with reference to FIG. 36.

The copyright-protection information management module 114 is a program module that performs a function similar to that of the copyright management unit 1035 provided in the client terminal 1002 described with reference to FIG. 36.

The Internet-radio station selection/playback module 118 is a program module that can perform functions similar to those of the control unit 1023 and audio control unit 1026 that are incorporated in the client terminal 1002 depicted in FIG. 36.

The music-purchase playback module 119 is a program module that can perform functions similar to those of the control unit 1023 and audio control unit 1026 incorporated in the client terminal 1002 described with reference to FIG. 36.

The XML browser 151 is a program module that can perform functions similar to those of the input-processing unit 1021 and page-information generating unit 1036 used in the client terminal 1002 described with reference to FIG. 36.

The hard-disc content controller 117, database accessing module 115 and content-data accessing module 116 are program modules that can perform functions similar to that of the control unit 1023 incorporated in the client terminal 1002 described with reference to FIG. 36.

The authentication library 131 of the library 130 is a program module that can perform a function similar to those of the authentication-process unit 1037 and authentication-information storage unit 1038 used in the client terminal 1002 that is described with reference to FIG. 36.

The clip library 132 provided in the library 130 is a program module that can perform a function similar to that of the control unit 1023 provided in the client terminal 1002 that is described with reference to FIG. 36.

The related-information displaying module 120 is a program module that can perform a function similar to that of the radio-broadcast display control unit 1039 incorporated in the client terminal 1002 that is described with reference to FIG. 36.

The tuner-station reproducing/recording module 121 is a program module that can perform functions similar to those of the control unit 1023, audio control unit 1026 and tuner unit 1031 provided in the client terminal 1002 that is described with reference to FIG. 36.

The audio-user interface 152 is a program module that can perform functions similar to those of the input-processing unit 1021, control unit 1023 and display control unit 1024 provided in the client terminal 1002 that is described with reference to FIG. 36.

The CD-playback module 141 is a program module that can perform functions similar to those of the audio control unit 1026 and external medium recording/reproducing unit 1028 provided in the client terminal 1002 that is described with reference to FIG. 36.

The HDD-playback module 142 is a program module that can perform functions similar to those of the control unit 1023 and audio control unit 1026 provided in the client terminal 1002 that is described with reference to FIG. 36.

Hence, in the terminal apparatus 10 of the hardware configuration by the hardware circuit blocks described with reference to FIG. 5, the CPU 11 can perform the same processes as the client terminal 1002 comprising the function-circuit blocks shown in FIG. 36, by using the various program modules specified above.

In the client terminal 1002, the function blocks can perform the functions that can be realized by the program modules incorporated in the terminal apparatus 10. Thus, it is possible to attain the same advantages as the first embodiment.

In the embodiment described above, what the client terminal 1002 can receive is radio programs broadcast from radio stations. Nonetheless, the client terminal 1002 may receive Internet-radio broadcast or satellite-radio-broadcast programs, acquiring the information about these programs and also radio-broadcast information. Alternatively, the client terminal 1002 may receive television programs broadcast from the television stations, acquiring the information about the television programs from a server provided on the network NT1000.

Further, in the embodiment described above, the present invention is applied to the information recording apparatus 1, terminal device 10 and client terminal 1002. The present invention is not limited to this. The present invention can be widely applied to various information recording apparatus, such as personal computers, mobile telephones, PDAs (Personal Digital Assistances), information processes of game devices, etc., television set, radio-broadcasting receiving device, DVD (Digital Versatile Disc) recorders, hard-disk recorders, and the like.

In the embodiment described above, the hardware circuit blocks, function-circuit blocks and program modules are incorporated in the terminal apparatus 10 or in the client terminal 1002. This invention is not limited to this. They may be incorporated into terminals of types other than the terminal apparatus 10 and the client terminal 1002, such as mobile telephones, personal computers and the like. Then, any other terminal having such blocks and modules can perform the same processes as the terminal apparatus 10 or the client terminal 1002 does.

In the embodiment described above, the information-recording program according to this invention is the program modules described with reference to FIG. 6. This invention is not limited to this. The information-recording program may be any one of other types of programs.

In the embodiment described above, the receiving means for receiving the information related to a plurality of contents broadcast is the communications process unit 22 and network interface 23 of the terminal apparatus 10 or the communications control unit 1032 of the client terminal 1002, all described with reference to FIGS. 1 to 47. This invention is not limited to this. Various other types of receiving means can be used, in accordance with the communications system that the information-recording apparatus employs.

In the embodiment described above, the temporary storage means that temporarily stores the information related to a plurality of contents is the hard disk drive 21 of the terminal apparatus 10 or the storage medium 1029 of the client terminal 1002, all described with reference to FIGS. 1 to 47. The present invention is not limited to this. The temporary storage means may be any other type, such as a drive circuit that temporarily records related information in a recording medium such as a magneto-optical disk or a semiconductor memory.

In the embodiment described above, the storage means that stores related information is the hard disk drive 21 of the terminal apparatus 10 or the storage medium 1029 of the client terminal 1002, all described with reference to FIGS. 1 to 47. This invention is not limited to this. The storage means may be any other type, such as a recording medium, e.g., a magneto-optical disk or a semiconductor memory.

In the embodiment described above, the instructing means that instructs that the related information items recorded in the temporary storage means be saved in the storage means is the CPU 11 of the terminal apparatus 10 or the control unit 1023 of the client terminal 1002, all described with reference to FIGS. 1 to 47. This invention is not limited to this. The instructing means may be any other type, such as an input control unit, which that can output various instructions in accordance with the user's operation inputs.

In the embodiment described above, the recording means that records, in the storage means, the related information items stored in the temporary storage means, as one set, in accordance with the instruction made by the instructing means, and records, in the storage means, the set name in association with the set, is the CPU 11 of the terminal apparatus 10 or the control unit 1023 of the client terminal 155, 1002, all described with reference to FIGS. 1 to 47. This invention is not limited to this. The recording means may be any other type, such as a drive circuit that temporarily records information in a recording medium such as a magneto-optical disc or a semiconductor memory.

In the embodiment described above, the reproducing means that reproduces a plurality of contents from a recording medium loaded is the CPU 11 of the terminal apparatus 10 or the control unit 1023 of the client terminal 1002, all described with reference to FIGS. 1 to 47. This invention is not limited to this. The reproducing means may be any other type, such as a drive circuit corresponding to the types of recording media.

In the embodiment described above, the transmitting means that transmits request for the information related to the contents reproduced by the reproducing means is the communications process unit 22 of the terminal apparatus 10, the network interface 23 or the communications control unit 1032 of the client terminal 1002, all described with reference to FIGS. 1 to 47. This invention is not limited to this. Various other types of transmitting means can be used, in accordance with the communications system that the information-recording apparatus employs.

In the embodiment described above, authentication server having an authentication function is the integrated service server 36 or the portal server 1003, both described with reference to FIGS. 1 to 47. This invention is not limited to this. Instead, any other type of an authentication server can be used.

In the embodiment described above, the server for providing management information is the broadcast-station server 32 or the radio-data distributing server 1006, both described with reference to FIGS. 1 to 47. The present invention is not limited to this. This server may be any other type that can provide the information related to contents, such as the CD-title information providing server 31 or a server run by a television broadcast station.

In the embodiment described above, the service-identification information that identifies the server that provides the related information and is transmitted from this server to the terminal apparatus, along with the information indicating an authentication error, is the shop code described with reference to FIGS. 1 to 47. This invention is not limited to this. Any other type of service-identification information can be used, provided that it can identify the server that provides the related information.

INDUSTRIAL APPLICABILITY

The present invention can be applied to an information-recording apparatus for use in, for example, personal computers and mobile telephones.

The invention claimed is:

1. An information-recording apparatus comprising:

selection input means for selecting contents by indicating a time period for retrieving the contents from a broadcast, and for sending a retrieval key including the time period to a server;

receiving means for receiving a plurality of information related to the contents of the broadcast, based on the retrieval key that was sent to the server;

temporary storage means for temporarily storing the plurality of information related to the contents;

storage means for storing the plurality of information related to the contents;

instructing means for instructing that the plurality of information related to the contents temporarily stored in the temporary storage means be recorded in the storage means;

recording means for recording at least one the plurality of the information related to the contents stored in the temporary storage means in accordance with instructions from the instructing means as a set of information on contents in the storage means, the set of information on the contents linked to a name of the set; and displaying means for displaying the name of the set.

2. The information-recording apparatus according to claim 1, wherein the plurality of the information related to the contents includes information on a program broadcast, and the recording means records the information related to the contents having a common program broadcast as a set of information on contents in the storage means, when the instructing means instructs that the information related to the contents of the common program broadcast be recorded in the storage means, and records the name of the program broadcast as the name of the set.

3. The information-recording apparatus according to claim 2, wherein the recording means records the information related to the contents of the common program broadcast during a given time period as a set of information on contents in the storage means, when the instructing means instructs that the information related to the contents of the common program broadcast in the given time period be recorded in the storage means, and records the name of a station of the common broadcast program and the given time period as the name of the set.

4. The information-recording apparatus according to claim 1, further comprising:

reproducing means for reproducing contents from a recording medium, the recording medium including information related to the contents, wherein the recording means records the information related to the contents that are read from the recording medium as a set of information on contents in the storage means, when the instructing means instructs that the information related to the contents of the recording medium be recorded in the storage means.

5. The information-recording apparatus according to claim 1, wherein the instructing means instructs that at least one of the plurality of information related to the contents be recorded in the storage means, and the recording means records the at least one of the plurality of information related to the contents in the storage means as one element added to a set that is already stored in the storage means.

6. The information-recording apparatus according to claim 1, further comprising:

reproducing means for reproducing the contents from a recording medium, and transmitting means for transmitting request information requesting the information related to the contents reproduced by the reproducing means, wherein the receiving means receives a plurality of information related to the contents corresponding to the request information, the recording means records the information related to the contents received by the receiving means as the set, and records a name of the set that is linked to the set in the storage means.

7. An information-recording method comprising the steps of:

selecting contents by indicating a time period for retrieving the contents from a broadcast;

sending a retrieval key including the time period to a server for retrieval of the contents;

receiving a plurality of information related to the contents of the broadcast, based on the retrieval key that was sent to the server;

temporarily storing the plurality of information related to the contents in a temporary storage means;

instructing that the plurality information related to the contents temporarily stored in the temporary storage means be recorded in storage means;

recording at least one of the plurality of information related to the contents stored in the temporary storage means in accordance with instructions from said step of instructing as a set of information on contents, the set of the information on contents linked to a name of the set; and displaying the name of the set on a display means.

8. The information-recording method according to claim 7, wherein the step of receiving information related to the contents is performed as a terminal apparatus that communicates with an authentication server having an authentication function and a related-information providing server for providing the information related to the contents and which can receive the information related to the contents, wherein the step of receiving includes the steps of:

transmitting request information requesting the information related to the contents, to the related-information providing server, together with a service-session ID that identifies a session between the terminal apparatus and the related-information providing server;

receiving, from the related-information providing server, information representing an authentication error and service identification information identifying the related-information providing server;

transmitting authentication-ticket request information to the authentication server, together with an authentication-session ID that identifies a session between the terminal apparatus and the authentication server, the authentication-ticket request information requesting that an authentication ticket be issued for an access to the related-information providing server;

receiving the authentication ticket issued by the authentication server when the authentication server authenticates the terminal apparatus, and transmitting the authentication-ticket request information, together with the authentication ticket to the related-information providing server;

receiving the service-session ID, when the related-information providing server authenticates the terminal apparatus;

transmitting request information for requesting the related information to the related-information providing server, together with the service-session ID; and receiving the information related to the contents corresponding to the request information, when the related-information providing server authenticates the terminal apparatus.

9. The information-recording method according to claim 8, wherein the step of receiving related information is performed as the terminal apparatus receives information representing an authentication error and transmits a user ID and a password to the authentication server when the authentication performed by the authentication server is an error, receives the authentication-session ID, when the authentication server authenticates the user ID and the password, and transmits the authentication-ticket request information to the authentication server, together with the authentication-session ID.

10. The information-recording method according to claim 7, further comprising the steps of:

transmitting, at predetermined intervals, request information requesting the information related to the contents being broadcast and received;

displaying the information related to the contents, wherein the information related to the contents that corresponds to the request information is received in said step of receiving, and wherein the information related to the contents received is displayed in the step of displaying.

11. A hardware computer readable medium having an information-recording program stored thereon, the program configured to cause a computer to perform a method comprising the steps of:

selecting contents by indicating a time period for retrieving the contents from a broadcast;

sending a retrieval key including the time period to a server for retrieval of the contents;

receiving a plurality of information related to the contents of the broadcast, based on the retrieval key that was sent to the server;

temporarily storing the plurality of information related to the contents in a temporary storage means;

instructing that the plurality of information related to the contents temporarily stored in the temporary storage means be recorded in the storage means;

recording at least one of the plurality of information related to the contents stored in the temporary storage means in accordance with instructions from said instructing as a set of information on contents, the set of the information on contents linked to a name of the set; and displaying the name of the set on a display means.

12. The information-recording apparatus according to claim 1, wherein the displaying means is further displaying said information related to the contents in a list, together with the name of the set.

13. The information-recording method according to claim 7, wherein said step of displaying further displays said information related to the contents in a list, together with the name of the set.

14. The hardware computer readable medium according to claim 11, wherein said step of displaying further displays said information related to the contents in a list, together with the name of the set.

* * * * *